(12) United States Patent
Muranaka et al.

(10) Patent No.: US 12,474,346 B2
(45) Date of Patent: Nov. 18, 2025

(54) METHODS AND KITS FOR MULTICYCLE ENCODING ASSAY

(71) Applicant: ENCODIA, INC., San Diego, CA (US)

(72) Inventors: Norihito Muranaka, San Diego, CA (US); Yan Su, San Diego, CA (US); Kevin L. Gunderson, San Diego, CA (US)

(*) Notice: Subject to any disclaimer, the term of this patent is extended or adjusted under 35 U.S.C. 154(b) by 630 days.

(21) Appl. No.: 18/045,324

(22) Filed: Oct. 10, 2022

(65) Prior Publication Data

US 2025/0237660 A1 Jul. 24, 2025

Related U.S. Application Data

(60) Provisional application No. 63/276,526, filed on Nov. 5, 2021.

(51) Int. Cl.
*G01N 33/68* (2006.01)
*C12Q 1/6844* (2018.01)
*G01N 33/53* (2006.01)
*G01N 33/553* (2006.01)

(52) U.S. Cl.
CPC ....... *G01N 33/6803* (2013.01); *C12Q 1/6844* (2013.01); *G01N 33/5308* (2013.01); *G01N 33/553* (2013.01)

(58) Field of Classification Search
CPC ........... G01N 33/6803; G01N 33/5308; G01N 33/553; C12Q 1/6844
See application file for complete search history.

(56) References Cited

U.S. PATENT DOCUMENTS

| | | |
|---|---|---|
| 8,921,044 B2 | 12/2014 | Gardner |
| 10,852,305 B2 | 12/2020 | Havranek et al. |
| 11,169,157 B2 | 11/2021 | Gunderson et al. |
| 11,427,814 B2 | 8/2022 | Desai et al. |
| 11,549,942 B2 | 1/2023 | Mallick |
| 11,634,709 B2 | 4/2023 | Chee et al. |
| 11,680,900 B2 | 6/2023 | Groves |
| 11,692,215 B2 | 7/2023 | Filipe et al. |
| 2009/0264300 A1 | 10/2009 | Franch et al. |
| 2014/0102915 A1 | 4/2014 | Hu et al. |
| 2019/0145982 A1* | 5/2019 | Chee ............ G01N 33/6842 435/6.11 |
| 2020/0232994 A1 | 7/2020 | Mitra |
| 2020/0348308 A1 | 11/2020 | Chee et al. |
| 2021/0079445 A1 | 3/2021 | Huynh et al. |
| 2021/0355483 A1 | 11/2021 | Chee et al. |

* cited by examiner

*Primary Examiner* — Jennifer Wecker
(74) *Attorney, Agent, or Firm* — DLA PIPER LLP (US); Dmitry Kryndushkin

(57) ABSTRACT

The present disclosure relates to methods and kits for analyzing a macromolecule analyte in a cyclic manner that incorporate basic steps of the ProteoCode™ protein sequencing assay and in addition incorporate approaches that allow to control template independent nucleotide addition by the DNA polymerase, and thus ensure successful multi-cycling encoding. Three different approaches are proposed herein to prevent heterogeneity in the spacer length of the extended recording tag created during the primer extension reaction. The disclosed methods allow for highly-parallelized, accurate and sensitive macromolecule characterization.

20 Claims, 18 Drawing Sheets

Specification includes a Sequence Listing.

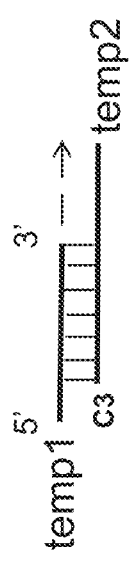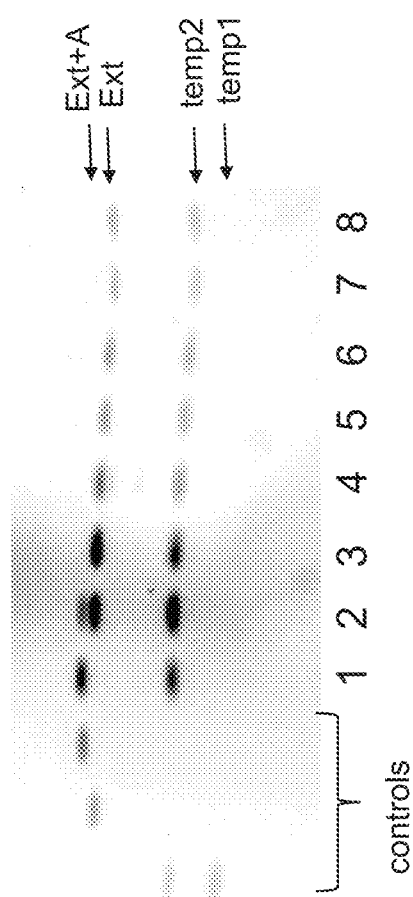
Fig. 2A
Fig. 2B

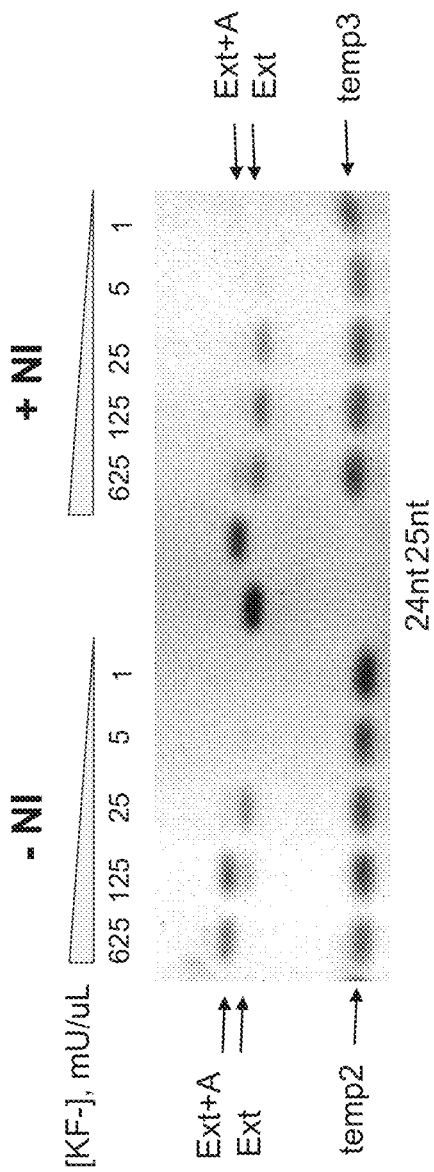
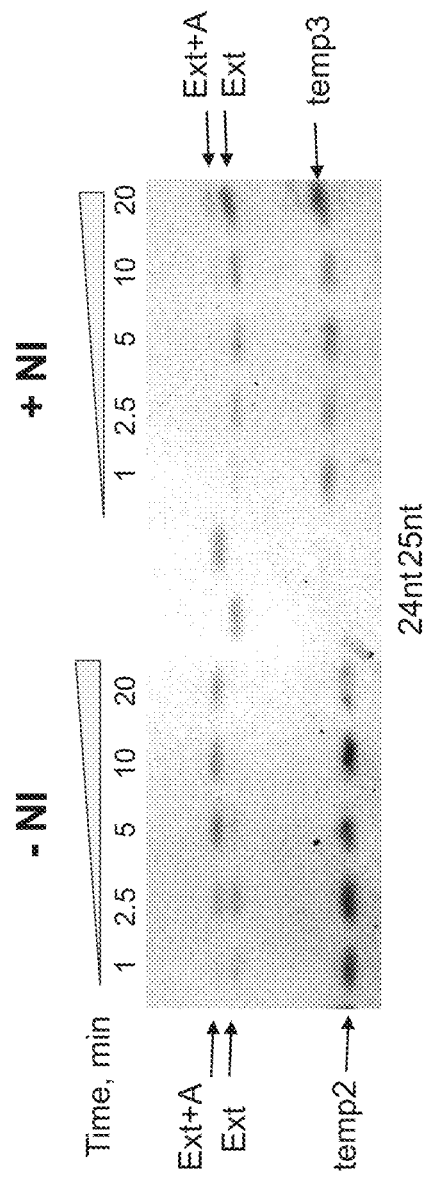
Fig. 6D
Fig. 6E

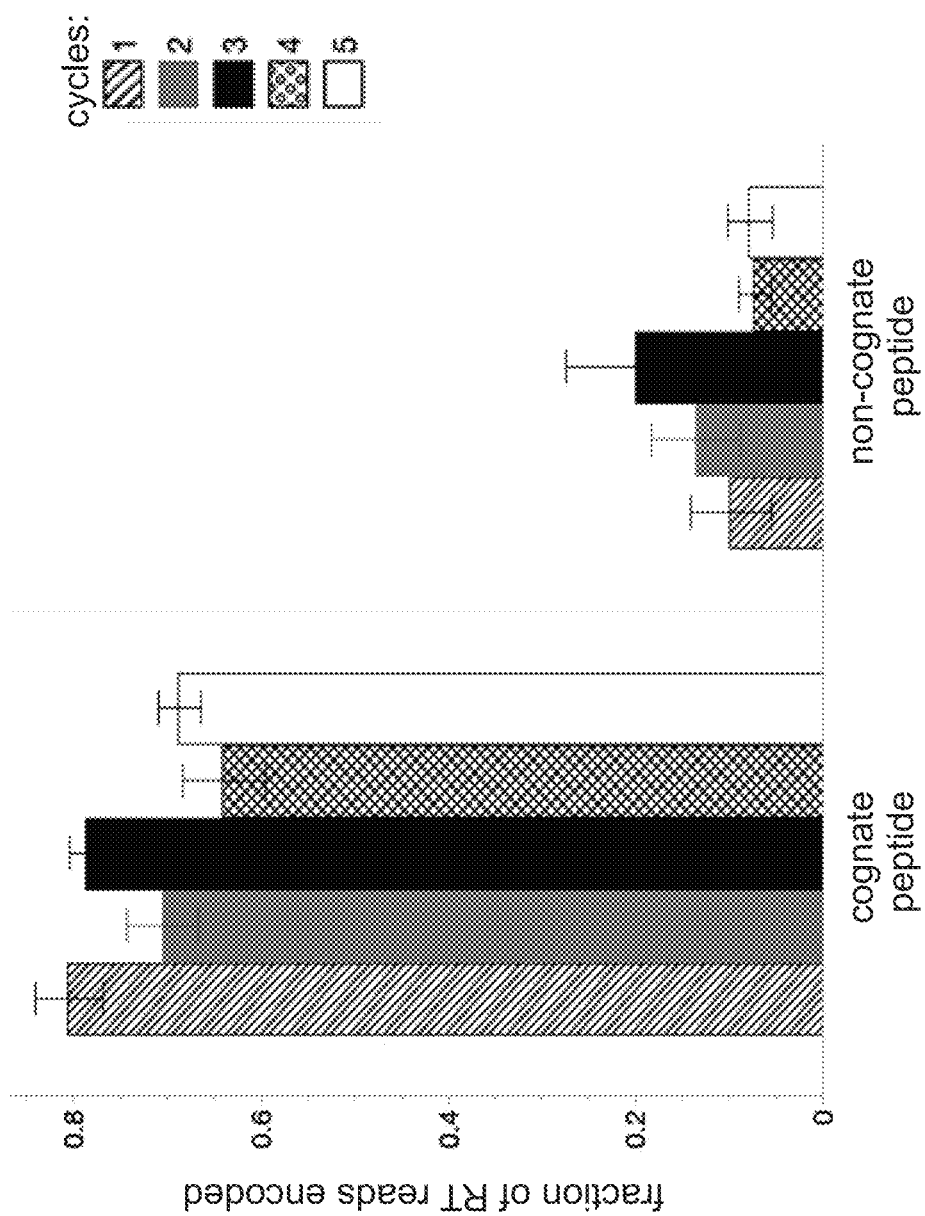

SEQUENCE LISTING

```
Sequence total quantity: 38
SEQ ID NO: 1            moltype = DNA  length = 20
FEATURE                 Location/Qualifiers
misc_feature            1..20
                        note = P5 primer
source                  1..20
                        mol_type = other DNA
                        organism = synthetic construct
SEQUENCE: 1
aatgatacgg cgaccaccga                                                   20

SEQ ID NO: 2            moltype = DNA  length = 24
FEATURE                 Location/Qualifiers
misc_feature            1..24
                        note = P7 primer
source                  1..24
                        mol_type = other DNA
                        organism = synthetic construct
SEQUENCE: 2
```

```
caagcagaag acggcatacg agat                                              24

SEQ ID NO: 3           moltype = DNA   length = 52
FEATURE                Location/Qualifiers
misc_feature           1..52
                       note = Capping oligo
source                 1..52
                       mol_type = other DNA
                       organism = synthetic construct
SEQUENCE: 3
gactggagtt cagacgtgtg ctcttccgat ctttctactc ttctcactca gt               52

SEQ ID NO: 4           moltype = AA    length = 19
FEATURE                Location/Qualifiers
REGION                 1..19
                       note = Test peptide
source                 1..19
                       mol_type = protein
                       organism = synthetic construct
SEQUENCE: 4
FAGVAMPGAE DDVVGSGSK                                                    19

SEQ ID NO: 5           moltype = AA    length = 20
FEATURE                Location/Qualifiers
REGION                 1..20
                       note = Test peptide
source                 1..20
                       mol_type = protein
                       organism = synthetic construct
SEQUENCE: 5
AFAGVAMPGA EDDVVGSGSK                                                   20

SEQ ID NO: 6           moltype = AA    length = 19
FEATURE                Location/Qualifiers
REGION                 1..19
                       note = Test peptide
source                 1..19
                       mol_type = protein
                       organism = synthetic construct
SEQUENCE: 6
AAGVAMPGAE DDVVGSGSK                                                    19

SEQ ID NO: 7           moltype = AA    length = 605
FEATURE                Location/Qualifiers
REGION                 1..605
                       note = Klenow Fragment exo-
source                 1..605
                       mol_type = protein
                       organism = Escherichia coli
SEQUENCE: 7
VISYDNYVTI LDEETLKAWI AKLEKAPVFA FATATDSLDN ISANLVGLSF AIEPGVAAYI       60
PVAHDYLDAP DQISRERALE LLKPLLEDEK ALKVGQNLKY DRGILANYGI ELRGIAFDTM       120
LESYILNSVA GRHDMDSLAE RWLKHKTITF EEIAGKGKNQ LTFNQIALEE AGRYAAEDAD       180
VTLQLHLKMW PDLQKHKGPL NVFENIEMPL VPVLSRIERN GVKIDPKVLH NHSEELTLRL       240
AELEKKAHEI AGEEFNLSST KQLQTILFEK QGIKPLKKTP GGAPSTSEEV LEELALDYPL       300
PKVILEYRGL AKLKSTYTDK LPLMINPKTG RVHTSYHQAV TATGRLSSTD PNLQNIPVRN       360
EEGRRIRQAF IAPEDYVIVS ADYSQIELRI MAHLSRDKGL LTAFAEGKDI HRATAAEVFG       420
LPLETVTSEQ RRSAKAINFG LIYGMSAFGL ARQLNIPRKE AQKYMDLYFE RYPGVLEYME       480
RTRAQAKEQG YVETLDGRRL YLPDIKSSNG ARRAAAERAA INAPMQGTAA DIIKRAMIAV       540
DAWLQAEQPR VRMIMQVHDE LVFEVHKDDV DAVAKQIHQL MENCTRLDVP LLVEVGSGEN       600
WDQAH                                                                   605

SEQ ID NO: 8           moltype = AA    length = 605
FEATURE                Location/Qualifiers
REGION                 1..605
                       note = Klenow Fragment exo- mutant K
source                 1..605
                       mol_type = protein
                       organism = synthetic construct
SEQUENCE: 8
VISYDNYVTI LDEETLKAWI AKLEKAPVFA FATATDSLDN ISANLVGLSF AIEPGVAAYI       60
PVAHDYLDAP DQISRERALE LLKPLLEDEK ALKVGQNLKY DRGILANYGI ELRGIAFDTM       120
LESYILNSVA GRHDMDSLAE RWLKHKTITF EEIAGKGKNQ LTFNQIALEE AGRYAAEDAD       180
VTLQLHLKMW PDLQKHKGPL NVFENIEMPL VPVLSRIERN GVKIDPKVLH NHSEELTLRL       240
AELEKKAHEI AGEEFNLSST KQLQTILFEK QGIKPLKKTP GGAPSTSEEV LEELALDYPL       300
PKVILEYRGL AKLKSTYTDK LPLMINPKTG RVHTSYHQAV TATGRLSSTD PNLQNIPVRN       360
EEGRRIRQAF IAPEDYVIVS ADYSQIELRI MAHLSRDKGL LTAFAEGKDI HRATAAEVFG       420
LPLETVTSEQ KRSAKAINFG LIYGMSAFGL ARQLNIPRKE AQKYMDLYFE RYPGVLEYME       480
RTRAQAKEQG YVETLDGRRL YLPDIKSSNG ARRAAAERAA INAPMQGTAA DIIKRAMIAV       540
```

```
DAWLQAEQPR VRMIMQVHDE LVFEVHKDDV DAVAKQIHQL MENCTRLDVP LLVEVGSGEN   600
WDQAH                                                                605

SEQ ID NO: 9             moltype = AA  length = 605
FEATURE                  Location/Qualifiers
REGION                   1..605
                         note = Klenow Fragment exo- mutant Q
source                   1..605
                         mol_type = protein
                         organism = synthetic construct
SEQUENCE: 9
VISYDNYVTI LDEETLKAWI AKLEKAPVFA FATATDSLDN ISANLVGLSF AIEPGVAAYI    60
PVAHDYLDAP DQISRERALE LLKPLLEDEK ALKVGQNLKY DRGILANYGI ELRGIAFDTM   120
LESYILNSVA GRHDMDSLAE RWLKHKTITF EEIAGKGKNQ LTFNQIALEE AGRYAAEDAD   180
VTLQLHLKMW PDLQKHKGPL NVFENIEMPL VPVLSRIERN GVKIDPKVLH NHSEELTLRL   240
AELEKKAHEI AGEEFNLSST KQLQTILFEK QGIKPLKKTP GGAPSTSEEV LEELALDYPL   300
PKVILEYRGL AKLKSTYTDK LPLMINPKTG RVHTSYHQAV TATGRLSSTD PNLQNIPVRN   360
EEGRRIRQAF IAPEDYVIVS ADYSQIELRI MAHLSRDKGL LTAFAEGKDI HRATAAEVFG   420
LPLETVTSEQ QRSAKAINFG LIYGMSAFGL ARQLNIPRKE AQKYMDLYFE RYPGVLEYME   480
RTRAQAKEQG YVETLDGRRL YLPDIKSSNG ARRAAAERAA INAPMQGTAA DIIKRAMIAV   540
DAWLQAEQPR VRMIMQVHDE LVFEVHKDDV DAVAKQIHQL MENCTRLDVP LLVEVGSGEN   600
WDQAH                                                                605

SEQ ID NO: 10            moltype = AA  length = 605
FEATURE                  Location/Qualifiers
REGION                   1..605
                         note = Klenow Fragment exo- mutant E
source                   1..605
                         mol_type = protein
                         organism = synthetic construct
SEQUENCE: 10
VISYDNYVTI LDEETLKAWI AKLEKAPVFA FATATDSLDN ISANLVGLSF AIEPGVAAYI    60
PVAHDYLDAP DQISRERALE LLKPLLEDEK ALKVGQNLKY DRGILANYGI ELRGIAFDTM   120
LESYILNSVA GRHDMDSLAE RWLKHKTITF EEIAGKGKNQ LTFNQIALEE AGRYAAEDAD   180
VTLQLHLKMW PDLQKHKGPL NVFENIEMPL VPVLSRIERN GVKIDPKVLH NHSEELTLRL   240
AELEKKAHEI AGEEFNLSST KQLQTILFEK QGIKPLKKTP GGAPSTSEEV LEELALDYPL   300
PKVILEYRGL AKLKSTYTDK LPLMINPKTG RVHTSYHQAV TATGRLSSTD PNLQNIPVRN   360
EEGRRIRQAF IAPEDYVIVS ADYSQIELRI MAHLSRDKGL LTAFAEGKDI HRATAAEVFG   420
LPLETVTSEQ ERSAKAINFG LIYGMSAFGL ARQLNIPRKE AQKYMDLYFE RYPGVLEYME   480
RTRAQAKEQG YVETLDGRRL YLPDIKSSNG ARRAAAERAA INAPMQGTAA DIIKRAMIAV   540
DAWLQAEQPR VRMIMQVHDE LVFEVHKDDV DAVAKQIHQL MENCTRLDVP LLVEVGSGEN   600
WDQAH                                                                605

SEQ ID NO: 11            moltype = AA  length = 605
FEATURE                  Location/Qualifiers
REGION                   1..605
                         note = Klenow Fragment exo- mutant A
source                   1..605
                         mol_type = protein
                         organism = synthetic construct
SEQUENCE: 11
VISYDNYVTI LDEETLKAWI AKLEKAPVFA FATATDSLDN ISANLVGLSF AIEPGVAAYI    60
PVAHDYLDAP DQISRERALE LLKPLLEDEK ALKVGQNLKY DRGILANYGI ELRGIAFDTM   120
LESYILNSVA GRHDMDSLAE RWLKHKTITF EEIAGKGKNQ LTFNQIALEE AGRYAAEDAD   180
VTLQLHLKMW PDLQKHKGPL NVFENIEMPL VPVLSRIERN GVKIDPKVLH NHSEELTLRL   240
AELEKKAHEI AGEEFNLSST KQLQTILFEK QGIKPLKKTP GGAPSTSEEV LEELALDYPL   300
PKVILEYRGL AKLKSTYTDK LPLMINPKTG RVHTSYHQAV TATGRLSSTD PNLQNIPVRN   360
EEGRRIRQAF IAPEDYVIVS ADYSQIELRI MAHLSRDKGL LTAFAEGKDI HRATAAEVFG   420
LPLETVTSEQ ARSAKAINFG LIYGMSAFGL ARQLNIPRKE AQKYMDLYFE RYPGVLEYME   480
RTRAQAKEQG YVETLDGRRL YLPDIKSSNG ARRAAAERAA INAPMQGTAA DIIKRAMIAV   540
DAWLQAEQPR VRMIMQVHDE LVFEVHKDDV DAVAKQIHQL MENCTRLDVP LLVEVGSGEN   600
WDQAH                                                                605

SEQ ID NO: 12            moltype = DNA  length = 15
FEATURE                  Location/Qualifiers
misc_feature             1..15
                         note = Temp1
source                   1..15
                         mol_type = other DNA
                         organism = synthetic construct
SEQUENCE: 12
aaatgcgcca tctct                                                     15

SEQ ID NO: 13            moltype = DNA  length = 17
FEATURE                  Location/Qualifiers
misc_feature             1..17
                         note = Temp2
misc_feature             17
                         note = 3' C3 (three carbon) spacer
```

```
source                    1..17
                          mol_type = other DNA
                          organism = synthetic construct
SEQUENCE: 13
gtagtgtgta gagatgg                                                        17

SEQ ID NO: 14             moltype = DNA  length = 24
FEATURE                   Location/Qualifiers
misc_feature              1..24
                          note = oligo Ext
source                    1..24
                          mol_type = other DNA
                          organism = synthetic construct
SEQUENCE: 14
aaatgcgcca tctctacaca ctac                                                24

SEQ ID NO: 15             moltype = DNA  length = 25
FEATURE                   Location/Qualifiers
misc_feature              1..25
                          note = oligo Ext+A
source                    1..25
                          mol_type = other DNA
                          organism = synthetic construct
SEQUENCE: 15
aaatgcgcca tctctacaca ctaca                                               25

SEQ ID NO: 16             moltype = AA  length = 19
FEATURE                   Location/Qualifiers
REGION                    1..19
                          note = Test peptide
SITE                      19
                          note = MISC_FEATURE - an azido substituent on the lysine
                           side chain
source                    1..19
                          mol_type = protein
                          organism = synthetic construct
SEQUENCE: 16
FSGVAMPGAE DDVVGSGSK                                                      19

SEQ ID NO: 17             moltype = AA  length = 20
FEATURE                   Location/Qualifiers
REGION                    1..20
                          note = Test peptide
SITE                      20
                          note = MISC_FEATURE - an azido substituent on the lysine
                           side chain
source                    1..20
                          mol_type = protein
                          organism = synthetic construct
SEQUENCE: 17
AFSGVAMPGA EDDVVGSGSK                                                     20

SEQ ID NO: 18             moltype = DNA  length = 52
FEATURE                   Location/Qualifiers
misc_feature              1..52
                          note = Capture DNA
modified_base             1
                          mod_base = OTHER
                          note = 5'-phosphorylated
modified_base             19
                          mod_base = OTHER
                          note = 5'-amino modifier C6 dT
variation                 19..20
                          note = internal C3 (three carbon) spacer
source                    1..52
                          mol_type = other DNA
                          organism = synthetic construct
SEQUENCE: 18
tgtagggaaa gagtgtttta cactctttcc ctacacgacg ctcttccgat ct                 52

SEQ ID NO: 19             moltype = DNA  length = 90
FEATURE                   Location/Qualifiers
misc_feature              1..90
                          note = Capping oligo
variation                 38..39
                          note = 18-atom hexa-ethyleneglycol spacer
modified_base             90
                          mod_base = OTHER
                          note = 3' C3 (three carbon) spacer
```

```
source                  1..90
                        mol_type = other DNA
                        organism = synthetic construct
SEQUENCE: 19
gaagagtaat tagatcggaa gagcacacgt ctgaactcga ctggagttca gacgtgtgct    60
cttccgatct aattactctt ctagagatgg                                     90

SEQ ID NO: 20           moltype = DNA  length = 90
FEATURE                 Location/Qualifiers
misc_feature            1..90
                        note = Capping oligo
variation               38..39
                        note = 18-atom hexa-ethyleneglycol spacer
modified_base           90
                        mod_base = OTHER
                        note = 3' C3 (three carbon) spacer
source                  1..90
                        mol_type = other DNA
                        organism = synthetic construct
SEQUENCE: 20
gaagagtaat tagatcggaa gagcacacgt ctgaactcga ctggagttca gacgtgtgct    60
cttccgatct aattactctt ctggagttag                                     90

SEQ ID NO: 21           moltype = AA  length = 13
FEATURE                 Location/Qualifiers
REGION                  1..13
                        note = Test peptide
SITE                    13
                        note = MISC_FEATURE - an azido substituent on the lysine
                         side chain
source                  1..13
                        mol_type = protein
                        organism = synthetic construct
SEQUENCE: 21
FSGVARGDVR GGK                                                       13

SEQ ID NO: 22           moltype = AA  length = 18
FEATURE                 Location/Qualifiers
REGION                  1..18
                        note = Test peptide
SITE                    18
                        note = MISC_FEATURE - an azido substituent on the lysine
                         side chain
source                  1..18
                        mol_type = protein
                        organism = synthetic construct
SEQUENCE: 22
LAESAFSGVA RGDVRGGK                                                  18

SEQ ID NO: 23           moltype = DNA  length = 17
FEATURE                 Location/Qualifiers
misc_feature            1..17
                        note = Oligo Temp3
modified_base           1
                        mod_base = OTHER
                        note = 5'-Nitroindole-modified
modified_base           17
                        mod_base = OTHER
                        note = 3' C3 (three carbon) spacer
source                  1..17
                        mol_type = other DNA
                        organism = synthetic construct
SEQUENCE: 23
gtagtgtgta gagatgg                                                   17

SEQ ID NO: 24           moltype = DNA  length = 32
FEATURE                 Location/Qualifiers
misc_feature            1..32
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
```

```
                        organism = synthetic construct
SEQUENCE: 24
cgacgctctt ccgatctnnn ttgtcacact ac                                32

SEQ ID NO: 25           moltype = DNA  length = 32
FEATURE                 Location/Qualifiers
misc_feature            1..32
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
                        organism = synthetic construct
SEQUENCE: 25
cgacgctctt ccgatctnnn aggacacact ac                                32

SEQ ID NO: 26           moltype = DNA  length = 32
FEATURE                 Location/Qualifiers
misc_feature            1..32
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
                        organism = synthetic construct
SEQUENCE: 26
cgacgctctt ccgatctnnn tacacacact ac                                32

SEQ ID NO: 27           moltype = DNA  length = 32
FEATURE                 Location/Qualifiers
misc_feature            1..32
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
                        organism = synthetic construct
SEQUENCE: 27
cgacgctctt ccgatctnnn cttacacact ac                                32

SEQ ID NO: 28           moltype = DNA  length = 32
FEATURE                 Location/Qualifiers
misc_feature            1..32
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
                        organism = synthetic construct
SEQUENCE: 28
cgacgctctt ccgatctnnn tactcttaac ca                                32

SEQ ID NO: 29           moltype = DNA  length = 32
FEATURE                 Location/Qualifiers
misc_feature            1..32
```

```
                        note = Recording tag
modified_base           1
                        mod_base = OTHER
                        note = 5'-phosphorylated
modified_base           10
                        mod_base = OTHER
                        note = 5'-amino modifier C6 dT
misc_difference         18..20
                        note = n is a, c, g, or t
source                  1..32
                        mol_type = other DNA
                        organism = synthetic construct
SEQUENCE: 29
cgacgctctt ccgatctnnn tgcacttaac ca                                     32

SEQ ID NO: 30           moltype = DNA  length = 33
FEATURE                 Location/Qualifiers
misc_feature            1..33
                        note = Coding tag
modified_base           1
                        mod_base = OTHER
                        note = 18-atom hexa-ethyleneglycol spacer and 5'-amino
                         modifier C6 dT
variation               12..13
                        note = 18-atom hexa-ethyleneglycol spacer
source                  1..33
                        mol_type = other DNA
                        organism = synthetic construct
SEQUENCE: 30
gtcgctctta ccggtaagag cgactgtagt gtg                                    33

SEQ ID NO: 31           moltype = DNA  length = 33
FEATURE                 Location/Qualifiers
misc_feature            1..33
                        note = Coding tag
modified_base           1
                        mod_base = OTHER
                        note = 18-atom hexa-ethyleneglycol spacer and 5'-amino
                         modifier C6 dT
variation               12..13
                        note = 18-atom hexa-ethyleneglycol spacer
source                  1..33
                        mol_type = other DNA
                        organism = synthetic construct
SEQUENCE: 31
tcggccatct ctagagatgg ccgatggtaa gag                                    33

SEQ ID NO: 32           moltype = DNA  length = 33
FEATURE                 Location/Qualifiers
misc_feature            1..33
                        note = Coding tag
modified_base           1
                        mod_base = OTHER
                        note = 18-atom hexa-ethyleneglycol spacer and 5'-amino
                         modifier C6 dT
variation               12..13
                        note = 18-atom hexa-ethyleneglycol spacer
source                  1..33
                        mol_type = other DNA
                        organism = synthetic construct
SEQUENCE: 32
cgtgccataa ccggttatgg cacgtagaga tgg                                    33

SEQ ID NO: 33           moltype = DNA  length = 33
FEATURE                 Location/Qualifiers
misc_feature            1..33
                        note = Coding tag
modified_base           1
                        mod_base = OTHER
                        note = 18-atom hexa-ethyleneglycol spacer and 5'-amino
                         modifier C6 dT
variation               12..13
                        note = 18-atom hexa-ethyleneglycol spacer
source                  1..33
                        mol_type = other DNA
                        organism = synthetic construct
SEQUENCE: 33
cgcaacctct acgtagaggt tgcgtggtta tgg                                    33
```

```
SEQ ID NO: 34             moltype = DNA   length = 33
FEATURE                   Location/Qualifiers
misc_feature              1..33
                          note = Coding tag
modified_base             1
                          mod_base = OTHER
                          note = 18-atom hexa-ethyleneglycol spacer and 5'-amino
                           modifier C6 dT
variation                 12..13
                          note = 18-atom hexa-ethyleneglycol spacer
source                    1..33
                          mol_type = other DNA
                          organism = synthetic construct
SEQUENCE: 34
gattctaact ccggagttag aatctgtaga ggt                                  33

SEQ ID NO: 35             moltype = AA   length = 703
FEATURE                   Location/Qualifiers
REGION                    1..703
                          note = DNA polymerase phage T7
source                    1..703
                          mol_type = protein
                          organism = Escherichia virus T7
SEQUENCE: 35
MIVSDIEANA LLESVTKFHC GVIYDYSTAE YVSYRPSDFG AYLDALEAEV ARGGLIVFHN    60
GHKYDVPALT KLAKLQLNRE FHLPRENCID TLVLSRLIHS NLKDTDMGLL RSGKLPGKRF   120
GSHALEAWGY RLGEMKGEYK DDFKRMLEEQ GEEYVDGMEW WNFNEEMMDY NVQDVVVTKA   180
LLEKLLSDKH YFPPEIDFTD VGYTTFWSES LEAVDIEHRA AWLLAKQERN GPFDTKAIE    240
ELYVELAARR SELLRKLTET FGSWYQPKGG TEMFCHPRTG KPLPKYPRIK TPKVGGIFKK   300
PKNKAQREGR EPCELDTREY VAGAPYTPVE HVVFNPSSRD HIQKKLQEAG WVPTKYTDKG   360
AVVDDEVLEG VRVDDPEKQA AIDLIKEYLM IQKRIGQSAE GDKAWLRYVA EDGKIHGSVN   420
PNGAVTGRAT HAFPNLAQIP GVRSPYGEQC RAAFGAEHHL DGITGKPWVQ AGIDASGLEL   480
RCLAHFMARF DNGEYAHEIL NGDIHTKNQI AAELPTRDNA KTFIYGFLYG AGDEKIGQIV   540
GAGKERGKEL KKKFLENTPA IAALRESIQQ TLVESSGQWA GEQQVKWKRR WIKGLDGRKV   600
HVRSPHAALN TLLQSAGALI CKLWIIKTEE MLVEKGLKHG WDGDFAYMAW VHDEIQVGCR   660
TEEEIAQVVIE TAQEAMRWVG DHWNFRCLLD TEGKMGPNWA ICH                    703

SEQ ID NO: 36             moltype = AA   length = 829
FEATURE                   Location/Qualifiers
REGION                    1..829
                          note = DNA polymerase Escherichia virus T5
source                    1..829
                          mol_type = protein
                          organism = Escherichia virus T5
SEQUENCE: 36
MYSICVTRSC PVVCSKKHIT IGTPENPFDP NDYDFVILVG AEPFLYFAGK KGIGDYTGKR    60
VEYNGYANWI ASISPAQLHF KPEMKPVFDA TVENIHDIIN GREKIAKAGD YRPITDPDEA   120
EEYIKMVYNM VIGPVAFDSE TSALYCRDGY LLGVSISHQE YQGVYIDSDC LTEVAVYYLQ   180
KILDSENHTI VFHNLKFDMH FYKYHLGLTF DKAHKERRLH DTMLQHYVLD ERRGTHGLKS   240
LAMKYTDMGD YDFELDKFKD DYCKAHKIKK EDFTYDLIPF DIMWPYAAKD TDATIRLHNF   300
FLPKIEKNEK LCSLYYDVLM PGCVFLQRVE DRGVPISIDR LKEAQYQLTH NLNKAREKLY   360
TYPEVKQLEQ DQNEAFNPNS VKQLRVLLFD YVGLTPTGKL TDTGADSTDA EALNELATQH   420
PIAKTLLEIR KLTKLISTYV EKILLSIDAD GCIRTGFHEH MTTSGRLSSS GKLNLQQLPR   480
DESIIKGCVV APPGYRVIAW DLTTAEVYYA AVLSGDRNMQ QVFINMRNEP DKYPDFHSNI   540
AHMFKLQCE PRDVKKLFPA LRQAAKAITF GILYGSGPAK VAHSVNEALL EQAAKTGEPF   600
VECTVADAKE YIETYFGQFP QLKRWIDKCH DQIKNHGFIY SHFGRKRRLH NIHSEDRGVQ   660
GEEIRSGFNA IIQSASSDSL LLGAVDADNE IISLGLEQEM KIVMLVHDSV VAIVREDLID   720
QYNEILIRNI QKDRGISIPG CPIGIDSDSE AGGSRDYSCG KMKKQHPSIA CIDDDEYTRY   780
VKGVLLDAEF EYKKLAAMDK EHPDHSKYKD DKFIAVCKDL DNVKRILGA              829

SEQ ID NO: 37             moltype = AA   length = 832
FEATURE                   Location/Qualifiers
REGION                    1..832
                          note = DNA polymerase variant
source                    1..832
                          mol_type = protein
                          organism = synthetic construct
SEQUENCE: 37
MEEMLPLFEP KGRVLLVDGH HLAYRTFHAL KGLTTSRGEP VQAVYGFAKS LLKALKEDGD    60
SVIVVFDAKA PSFRHEAYEG YKARRAPTPE DFPRQLALIK ELVDLLGLVR LEVPGYEADD   120
VLASLAKKAE KEGYEVRILT ADKDLYQLLS DRIHVLHPEG YLITPAWLWE KHGLRPDQWA   180
DYRALTGDES DNLPGVKGIG EKTARKLLEE WGSLERLLKN LDRLRPAIRE KILAHMDDLK   240
LSWDLAKVRT DLPLEVDFAK RREPDRERLR AFLERLEFGS LLHEFGLLES PKALEEAPWP   300
PPEGAFVGFV LSRKEPMWAD LLALAAAREG RVHRAPEPYK ALRDLKEARG LLAKDLSVLA   360
LREGLGLPPG DDPMLLAYLL DPSNTTPEGV ARRYGGEWTE EAGERAALSE RLFANLWERL   420
EGEERLLWLY REVERPLSAV LAHMEATGVR LDVAYLRALS LEVAEEIARL EAEVFRLAGH   480
PFNLNSRDQL ERVLFDELGL PAIGKTEKTG KRSTSAAVLE ALREAHPIVE KILQYRELTN   540
LKSTYIDPLP DLIHPRTGRL HTRFNQTATA TGRLSSSDPN LQNIPVRTPL GQRIRRAFIA   600
EEGWLLVALD YSQIELRVLA HLSGDENLIR VFQEGRDIHT ETASWMFGVP REAVDPLMRR   660
```

```
AAKTINFGVL YGMSAHRLSQ ELAIPYEEAQ AFIERYFESF PKVRAWIEKT LEEGRRRGYV    720
ETLFGRRRYV PDLEARVKSV REAAERMAFN MPVQGTAADL MKLAMVKLFP RLEEMGARML    780
LQVHDELVLE APKERAEAVA RLAKEVMEGV YPLAVPLEVE VGIGEDWLSA KE            832

SEQ ID NO: 38           moltype = AA  length = 893
FEATURE                 Location/Qualifiers
REGION                  1..893
                        note = Tne DNA polymerase
source                  1..893
                        mol_type = protein
                        organism = Thermotoga sp.
SEQUENCE: 38
MARLFLFDGT ALAYRAYYAL DRSLSTSTGI PTNAVYGVAR MLVKFIKEHI IPEKDYAAVA    60
FDKKAATFRH KLLVSDKAQR PKTPALLVQQ LPYIKRLIEA LGFKVLELEG YEADDIIATL    120
AVRAARFLMR FSLITGDKDM LQLVNEKIKV WRIVKGISDL ELYDSKKVKE RYGVEPHQIP    180
DLLALTGDDI DNIPGVTGIG EKTAVQLLGK YRNLEYILEH ARELPQRVRK ALLRDREVAI    240
LSKKLATLVT NAPVEVDWEE MKYRGYDKRK LLPILKELEF ASIMKELQLY EEAEPTGYEI    300
VKDHKTFEDL IEKLKEVPSF ALDLETSSLD PFNCEIVGIS VSFKPKTAYY IPLHHRNAQN    360
LDETLVLSKL KEILEDPSSK IVGQNLKYDY KVLMVKGISP VYPHFDTMIA AYLLEPNEKK    420
FNLEDLSLKF LGYKMTSYQE LMSFSSPLFG FSFADVPVDK AANYSCEDAD ITYRLYKILS    480
MKLHEAELEN VFYRIEMPLV NVLARMELNG VYVDTEFLKK LSEEYGKKLE ELAEKIYQIA    540
GEPFNINSPK QVSKILFEKL GIKPRGKTTK TGEYSTRIEV LEEIANEHEI VPLILEYRKI    600
QKLKSTYIDT LPKLVNPKTG RIHASFHQTG TATGRLSSSD PNLQNLPTKS EEGKEIRKAI    660
VPQDPDWWIV SADYSQIELR ILAHLSGDEN LVKAFEEGID VHTLTASRIY NVKPEEVNEE    720
MRRVGKMVNF SIIYGVTPYG LSVRLGIPVK EAEKMIISYF TLYPKVRSYI QQVVAEAKEK    780
GYVRTLFGRK RDIPQLMARD KNTQSEGERI AINTPIQGTA ADIIKLAMID IDEELRKRNM    840
KSRMIIQVHD ELVFEVPDEE KEELVDLVKN KMTNVVKLSV PLEVDISIGK SWS           893
```

METHODS AND KITS FOR MULTICYCLE ENCODING ASSAY

CROSS-REFERENCE TO RELATED APPLICATION

The present application claims priority to U.S. provisional patent application No. 63/276,526, filed on Nov. 5, 2021, the disclosure and content of which are incorporated herein by reference in their entireties for all purposes.

STATEMENT REGARDING FEDERALLY SPONSORED RESEARCH

This invention was made with government support awarded by the National Cancer Institute of the National Institutes of Health under Grant No. R44CA203629. The United States Government has certain rights in this invention pursuant to this grant.

STATEMENT REGARDING SEQUENCE LISTING

The Sequence Listing associated with this application is provided in computer readable XML format (file name: 2004000_SeqList2.xml, recorded: Mar. 24, 2023, size 75,601 bytes), is hereby incorporated by reference into the specification in its entirety. The file is being submitted electronically via EFS-Web.

TECHNICAL FIELD

This disclosure generally relates to analysis of macromolecules, including polypeptides, in a cyclic manner employing barcoding and nucleic acid encoding of molecular recognition events. The present invention also relates to approaches to reduce or prevent template independent nucleotide addition by DNA polymerase during the primer extension reactions. The present invention further relates to polymerases having reduced, substantially reduced or eliminated ability to add one or more non-templated nucleotides to the 3' terminus of a synthesized nucleic acid molecule.

BACKGROUND

Highly parallel macromolecular characterization and recognition of proteins is challenging for several reasons. The use of affinity-based assays is often difficult due to several key challenges. One significant challenge is multiplexing the readout of a collection of affinity agents to a collection of cognate macromolecules; another challenge is minimizing cross-reactivity between the affinity agents and off-target macromolecules; a third challenge is developing an efficient high-throughput read out platform. An example of this problem occurs in proteomics in which one goal is to identify and quantitate most or all the proteins in a sample. Additionally, it is desirable to characterize various post-translational modifications (PTMs) on the proteins at a single molecule level. Currently this is a formidable task to accomplish in a high-throughput way.

Recently, methods for high-throughput macromolecule characterization have been proposed, for example, US 20190145982 A1, US 20200348308 A1, US 20200348307 A1, US 20210208150 A1, that utilize use of nucleic acid-encoded binding agents recognizing particular components of an immobilized macromolecule in a cyclic manner and encoding of binding agent binding history after each binding cycle in a nucleic acid recording tag, thus generating an extended recording tag. After encoding of information regarding binding agents that were bound to a plurality of immobilized macromolecules, the recording tags can be analyzed in parallel by, for example, next-generation sequencing (NGS) methods, and information regarding structures of the macromolecules can be elucidated by decoding the information regarding binding agents that were bound to these macromolecules during each binding cycle. However, a rapid loss of encoding efficiency can be observed when more than one cycle of encoding is performed.

Accordingly, there remains a need for improved techniques relating to macromolecule analysis by performing multiple cycles of encoding of molecular recognition events, with applications to polypeptide or protein sequencing and/or analysis, as well as to products, methods and kits for accomplishing the same. The disclosed methods and kits allow for highly-parallelized, accurate and sensitive macromolecule characterization.

These and other aspects of the invention will be apparent upon reference to the following detailed description. To this end, various references are set forth herein which describe in more detail certain background information, procedures, compounds and/or compositions, and are each hereby incorporated by reference in their entireties.

BRIEF SUMMARY

The summary is not intended to be used to limit the scope of the claimed subject matter. Other features, details, utilities, and advantages of the claimed subject matter will be apparent from the detailed description including those aspects disclosed in the accompanying drawings and in the appended claims.

Several variants of the ProteoCode™ assay that allow for high-throughput macromolecule characterization have been disclosed in US 2019/0145982 A1, US 2020/0348308 A1, US 2020/0348307 A1 and US 2021/0208150 A1. During the assay, an immobilized macromolecule associated with a nucleic acid recording tag is contacted sequentially with binding agents capable of binding to the macromolecule, wherein each binding agent comprises a nucleic acid coding tag with identifying information regarding the binding agent. During each binding cycle, the coding tag and the recording tag are located in a sufficient proximity for interaction, and the information regarding the binding agent that bound to the macromolecule at this cycle is transferred from the coding tag to the recording tag, thus generating an extended recording tag. One efficient way of transferring the information regarding the binding agent is to perform a primer extension reaction after hybridizing complementary spacer regions present in the coding and recording tags. Importantly, a particular spacer length is critical to provide sufficient affinity for the specific coding tag-recording tag interaction during information transfer and at the same time prevent potential unspecific or non-specific interactions with other nucleic acid tags that may be present in a reaction mixture. The longer single stranded spacer is used for the hybridization, the higher background encoding signal is observed, reflecting unspecific or non-specific interactions between the single stranded spacer in the recording tag and single stranded sequences of coding tags of non-cognate binding agents. However, DNA polymerases used in the disclosed methods to perform the primer extension reaction often possess ability to add one or more non-templated nucleotides to the 3' terminus of a synthesized nucleic acid molecule (an extended recording tag). Unexpectedly, it was found that the additional non-templated nucleotide(s) at the 3' terminus of the recording tag effectively increases the spacer length and increases fraction of extended recording tags generated after unspecific or non-specific hybridization and subsequent extension during the second or higher order binding cycles (see FIGS. 5A-B, 7B, 9B). Thus, in order to ensure appropriate signal-to-background ratio during multi-cycle encoding, it is critical to control template independent nucleotide addition by the polymerase during the primer extension reaction.

Provided herein are methods for analyzing a macromolecule in a cyclic manner that incorporate basic steps of the ProteoCode™ assay and in addition incorporate approaches that allow control of template independent nucleotide addition by the polymerase, and thus ensure successful multi-cycling encoding. Three different approaches are disclosed herein to minimize or prevent heterogeneity in the spacer length of the extended recording tag created during the primer extension reaction.

In one embodiment, engineered polymerases are disclosed having reduced, substantially reduced or eliminated ability to add one or more non-templated nucleotides to the 3' terminus of a synthesized extended recording tag. Specifically, the polymerases disclosed herein (e.g., DNA polymerases) have been mutated to reduce, substantially reduce or eliminate such activity in comparison with the unmutated or wild type polymerase, thereby providing a polymerase which synthesizes nucleic acid molecules having little or no non-templated 3' terminal nucleotides. Such polymerases have enhanced or greater ability to produce a double stranded nucleic acid molecule having blunt ended termini during primer extension reaction.

In another embodiment, use of an unnatural nucleotide in the coding tag is disclosed that reduces, substantially reduces or eliminates ability to add one or more non-templated nucleotides to the 3' terminus of a synthesized extended recording tag using the coding tag as a template. In a specific embodiment, use of a universal base analogue, e.g., 5-Nitroindole, is disclosed, wherein the universal base analogue, e.g., 5-Nitroindole, is located at 5' position of a portion of the coding tag followed by a non-DNA spacer region.

In yet another embodiment, the primer extension reaction is performed under conditions to increase efficiency of template independent nucleotide addition by the polymerase during the primer extension reaction. This alternative approach is also able to minimize or prevent heterogeneity in the spacer length of the extended recording tag. By pushing yield of the template independent nucleotide addition close to 100%, the resulting spacer length after extension can be accurately predicted, so the initial spacer length can be reduced by 1 nucleotide (nt) (e.g., from 8 nt spacer to 7 nt spacer).

Provided herein is a method for analyzing a macromolecule analyte, comprising the steps of:
(a) providing the macromolecule analyte and an associated nucleic acid recording tag joined to a solid support;
(b) contacting the macromolecule analyte with a first binding agent capable of binding to the macromolecule analyte, wherein the first binding agent comprises a first nucleic acid coding tag that comprises identifying information regarding the first binding agent;
(c) transferring identifying information regarding the first binding agent from the first nucleic acid coding tag to the nucleic acid recording tag to generate a first order extended nucleic acid recording tag, wherein a process of transferring information comprises a primer extension reaction performed using a DNA polymerase having 5'-to-3' polymerization activity and having substantially reduced 3'-to-5' exonuclease activity, and wherein the primer extension reaction is performed under conditions to reduce or prevent template independent nucleotide addition by the polymerase during the primer extension reaction;
(d) repeating steps (b) and (c) one or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and
(e) analyzing extended nucleic acid recording tag obtained after extension reactions of step (d) by a nucleic acid sequencing method to obtain the identifying information regarding the first binding agent and the identifying information regarding the second or higher order binding agent, thereby analyzing the macromolecule analyte.

Provided herein is also a method for analyzing a macromolecule analyte, comprising the steps of:
(a) providing a macromolecule analyte and an associated nucleic acid recording tag joined to a solid support;
(b) contacting the macromolecule analyte with a first binding agent capable of binding to the macromolecule analyte, wherein the first binding agent comprises a first nucleic acid coding tag that comprises identifying information regarding the first binding agent;
(c) transferring identifying information regarding the first binding agent from the first nucleic acid coding tag to the nucleic acid recording tag to generate a first order extended nucleic acid recording tag, wherein a process of transferring information comprises a primer extension reaction performed by a DNA polymerase having 5'-to-3' polymerization activity and having substantially reduced 3'-to-5' exonuclease activity, and wherein the primer extension reaction is performed under conditions to increase efficiency of template independent nucleotide addition by the polymerase during the primer extension reaction;
(d) repeating steps (b) and (c) two or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and
(e) analyzing extended nucleic acid recording tag obtained after extension reactions of step (d) by nucleic acid sequencing method to obtain the identifying information regarding the first binding agent and the identifying information regarding the second or higher order binding agent, thereby analyzing the macromolecule analyte Provided herein is also a kit for analyzing a macromolecule analyte, comprising:
- (a) a nucleic acid recording tag configured to associate directly or indirectly with a macromolecule analyte;
- (b) one or more binding agents each comprising (i) a binding moiety capable of binding to the macromolecule analyte to be analyzed, and (ii) a nucleic acid coding tag comprising identifying information regarding the binding moiety,
  wherein the recording tag and the coding tag are configured to allow transfer of information between them by a primer extension reaction upon binding of the one or more binding agents to the macromolecule analyte; and
- (c) an engineered DNA polymerase having 5'→3' polymerization activity, substantially reduced 3'→5' exonuclease activity, and a reduced template independent nucleotide addition ability during the primer extension reaction.

BRIEF DESCRIPTION OF THE DRAWINGS

Non-limiting embodiments of the present invention will be described by way of example with reference to the accompanying figures, which are schematic and are not intended to be drawn to scale. For purposes of illustration, not every component is labeled in every figure, nor is every component of each embodiment of the invention shown where illustration is not necessary to allow those of ordinary skill in the art to understand the invention.

FIG. 2A-2B. Exemplary in solution primer extension test for Klenow Fragment exo- DNA polymerase (KF exo-) wild type (WT) and exemplary mutants. FIG. 2A. Two partially complementary oligonucleotides (temp1, SEQ ID NO: 12 and temp2, SEQ ID NO: 13) were mixed to perform a primer extension reaction. C3 terminal addition to temp2 prevents primer extension on the temp1 template. FIG. 2B. Results of gel electrophoresis resolving products of primer extension reactions. Reactions 1, 2, 3, 4, 5, 6, 7, 8 contain correspondingly WT KF exo- enzyme or R754K, R754L, R754Y, R754H, R754Q, R754E, R754A mutants of the KF exo- enzyme. Controls contain oligonucleotides only (no KF exo-).

FIG. 3A. Illustration of the process. Different concentrations of Klenow Fragment exo- wild type enzyme or its R754 mutant were incubated with an end cap oligo (CBC1_ATT) and bead-immobilized recording tag-polypeptide conjugates, wherein the recording tag has spacer Sp1 at the 3' end available for hybridization, at 25° C. for 10 min. Klenow Fragment exo-enzyme extends the recording tag at 3' end and records the CBC1 barcode; however, if the extension fails, then no barcode is recorded. To capture the percentage of unextended recording tags, WT Klenow Fragment exo- (McLab, USA) was used with another end cap oligo with CBC2 (CGG) in the second extension reaction. After sequencing of the extension products, the numbers of recording tag molecules with CBC1 (ATT) and CBC2 (CGG) were compared. FIG. 3B. The ratios of DNA molecules with CBC1 (ATT) and CBC2 (CGG) after two extension reactions are shown.

FIG. 4A. Oligo Sp1'-Sp2' was served as the template for the recording tag extension on a solid support with different concentrations of KF exo- wide type enzyme and its mutants. The A-tailing and non-A-tailing products were generated, and capped with an end cap oligo with N' nucleotide opposite to the template independent nucleotide addition site (in this and the following Figures, N can be any one of A, G, C or T). FIG. 4B. In the control experiment, to evaluate the nucleotide composition for the N' site, the recording tag was directly capped by the end cap oligo.

FIG. 5A. Two cycles encoding. The KF WT enzyme produces a high (about 50% relative to the specific signal) non-specific signal for the 2nd cycle of the encoding on the non-cognate peptide, while the mutants produce much lower non-specific signal for the 2nd cycle of the encoding. FIG. 5B. Five cycles encoding. The KF WT enzyme produces a high (about 50% relative to the specific signal) non-specific signal for the 2nd and the following cycles of the encoding on the non-cognate peptide, while the mutants produce much lower non-specific signal for the 2nd and the following cycles of the encoding.

FIG. 6A-E. Exemplary 5-Nitroindole (5-NI, NI) incorporation at the 5' end of the polymerization template reduces template independent nucleotide addition during primer extension reaction. FIG. 6A. Structure of 5-Nitroindole. FIG. 6B. The primer extension reaction was performed on temp1-temp2 oligo pair using the WT KF exo- enzyme. FIG. 6C. The primer extension reaction was performed on temp1-temp3 oligo pair using the WT KF exo- enzyme. Temp3 has the same sequence as temp2, and additionally contained an incorporated 5-Nitroindole at the 5' end. FIG. 6D. The reactions shown in FIG. 6B-C were performed using different KF exo- enzyme concentrations, and the generated extension products were evaluated on gel electrophoresis. FIG. 6E. The reactions shown in FIG. 6B-C were performed using 125 mU/uL of KF exo- enzyme and different incubation times (from 1 to 20 min); the generated extension products were evaluated on gel electrophoresis.

FIG. 7A.

Two cycles of encoding are shown, and the process can be repeated for 4 or more times (generating, e.g., five cycles encoding). Encoding conditions are provided in Example 9. The binding agent with associated coding tag was used for encoding, and cycle cap oligo was also added to cap recording tags of recording tag-peptide conjugates that failed to be extended during the current encoding cycle. "X" represents either 5-Nitroindole (for the assay with 5-Nitroindole) or none (for the control assay). FIG. 7B. Two cycles encoding data. The assay is shown in FIG. 7A. Two cycles encoding with either the 5-Nitroindole incorporation in the coding tags (right side), or standard conditions (left side). The encoding yields (fractions of RT reads encoded) were about 75% or more for both cycles for the cognate peptide, while non-specific signals for the non-cognate peptide remained low in the assay with the 5-Nitroindole incorporation (fractions of RT reads encoded were below 10%). Standard conditions without the 5-Nitroindole incorporation generated a high non-specific signal for the non-cognate peptide during the second encoding cycle. FIG. 7C. Five cycles encoding with the 5-Nitroindole incorporation in the coding tags. The assay format is shown in FIG. 7A. The encoding yields were 60% or higher on each encoding cycle for the cognate peptide, while non-specific signals for the non-cognate peptide remained low.

FIG. 9A. Two cycles encoding with a shortened spacer region (7 nt) of the recording tags using conditions for high yield A-tailing (the KF exo- concentration of 0.625 U/uL and 10 min cycle cap time). The encoding conditions are described in Example 10. The encoding yields (fractions of RT reads encoded) were about 70% for both cycles for the cognate peptide, while non-specific signals for the non-cognate peptide remained low (fractions of RT reads encoded were below 10%). FIG. 9B. Two cycles encoding using similar conditions, but an extended recording tag spacer region (8 nt) was used, which generated a high non-specific signal for the non-cognate peptide during the second encoding cycle. Reducing the WT KF exo- concentration to 0.125 U/uL did not reduce the observed non-specific signal, since the A-tailing yield was still high (about 70%).

FIG. 10. depicts five cycles encoding with an exemplary shortened spacer region (7 nt) of the recording tags using conditions for high yield A-tailing (the KF exo- concentration of 0.625 U/uL and 10 min cycle cap time). The encoding conditions are described in Example 10. The encoding yields were 65% or higher on each encoding cycle for the cognate peptide, while non-specific signals for the non-cognate peptide remained low.

DETAILED DESCRIPTION

Figure 1:
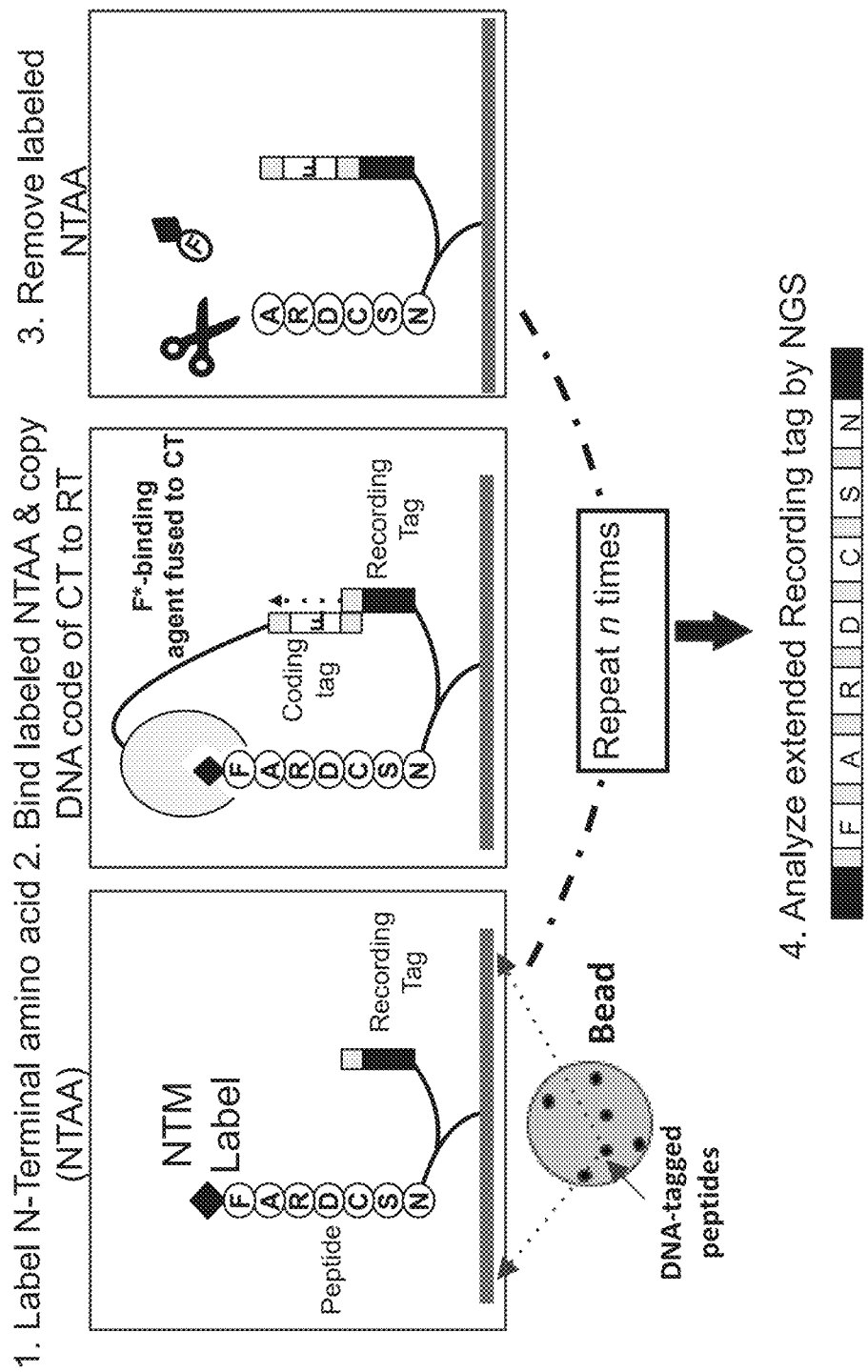
FIG. 1 depicts an exemplary NGPS peptide sequencing assay with N-terminal amino acid (NTAA)-specific binding agents. (1) Peptide molecules are each associated with a DNA recording tag (RT) and attached to beads at a low molecular density, a sparsity that permits only intramolecular information transfer to occur. The peptide N-terminal amino acid (NTAA) residues are labeled with an N-terminal modification (NTM). (2) Next, immobilized and labeled peptides are contacted with binding agents specific for labeled NTAA (labeled F-specific binding agent is shown). Each binding agent comprises a DNA coding tag (CT) that comprises identifying information regarding the binding agent. After binding and washing, the coding tag identifying information is transferred enzymatically to the recording tag (via extension or ligation), generating an extended RT. (3) The labeled NTAA is removed by using mild Edman-like elimination chemistry or by a Cleavase enzyme. The cycle 1-2-3 is repeated n times. After n cycles, the extended RT representing the n amino acids of the peptide sequence is formed and can be sequenced by NGS. A representative structure of the extended RT after 7 cycles is shown.

Efficient encoding with low background is critical for recording macromolecule information in the ProteoCode™ assay. In preferred variants of the ProteoCode™ assay, the information regarding the binding agent bound to the macromolecule is transferred from the coding tag to the recording tag by a primer extension reaction after hybridizing complementary spacer regions present in the coding and recording tags, which results in formation of a duplex used as the polymerase binding site. Typically, for binding agents having affinity to a component of the macromolecule in the range of 10-100 nM, an 8 nucleotides (nt) spacer region is used to create the polymerase binding site. However, most DNA polymerases that have substantially reduced 3'-to-5' exonuclease activity also have template independent nucleotide addition activity (also known as template independent nucleotide addition activity) by adding one extra nucleotide, commonly a "A", at the end of the blunt end. This extra addition of nucleotide leads to either mis-paired substrate, which will not be extended in the next encoding round, or a 9 bp duplex in the next encoding round, which has been proven to introduce a high background (see e.g., FIGS. 5A, 7B, 9B).

This problem is solved herein by the disclosed methods as provided below.

Numerous specific details are set forth in the following description in order to provide a thorough understanding of the present disclosure. These details are provided for the purpose of example and the claimed subject matter may be practiced according to the claims without some or all of these specific details. It is to be understood that other embodiments can be used and structural changes can be made without departing from the scope of the claimed subject matter. It should be understood that the various features and functionality described in one or more of the individual embodiments are not limited in their applicability to the particular embodiment with which they are described. They instead can be applied, alone or in some combination, to one or more of the other embodiments of the disclosure, whether or not such embodiments are described, and whether or not such features are presented as being a part of a described embodiment. For the purpose of clarity, technical material that is known in the technical fields related to the claimed subject matter has not been described in detail so that the claimed subject matter is not unnecessarily obscured.

All publications, including patent documents, scientific articles and databases, referred to in this application are incorporated by reference in their entireties for all purposes to the same extent as if each individual publication were individually incorporated by reference. Citation of the publications or documents is not intended as an admission that any of them is pertinent prior art, nor does it constitute any admission as to the contents or date of these publications or documents.

All headings are for the convenience of the reader and should not be used to limit the meaning of the text that follows the heading, unless so specified.

Definitions

Unless defined otherwise, all technical and scientific terms used herein have the same meaning as is commonly understood by one of ordinary skill in the art to which the present disclosure belongs. If a definition set forth in this section is contrary to or otherwise inconsistent with a definition set forth in the patents, applications, published applications and other publications that are herein incorporated by reference, the definition set forth in this section prevails over the definition that is incorporated herein by reference.

As used herein, the singular forms "a," "an" and "the" include plural referents unless the context clearly dictates otherwise. Thus, for example, reference to "a peptide" includes one or more peptides, or mixtures of peptides. Also, and unless specifically stated or obvious from context, as used herein, the term "or" is understood to be inclusive and covers both "or" and "and".

The term "about" as used herein refers to the usual error range for the respective value readily known to the skilled person in this technical field. Reference to "about" a value or parameter herein includes (and describes) embodiments that are directed to that value or parameter per se. For example, description referring to "about X" includes description of "X.

The term "antibody" herein is used in the broadest sense and includes polyclonal and monoclonal antibodies, including intact antibodies and functional (antigen-binding) antibody fragments, including fragment antigen binding (Fab) fragments, F(ab')2 fragments, Fab' fragments, Fv fragments, recombinant IgG (rIgG) fragments, single chain antibody fragments, including single chain variable fragments (scFv), and single domain antibodies (e.g., sdAb, sdFv, nanobody) fragments. The term encompasses genetically engineered and/or otherwise modified forms of immunoglobulins, such as intrabodies, peptibodies, chimeric antibodies, fully human antibodies, humanized antibodies, and heteroconjugate antibodies, multispecific, e.g., bispecific, antibodies, diabodies, tandem di-scFv, tandem tri-scFv. Unless otherwise stated, the term "antibody" should be understood to encompass functional antibody fragments thereof. The term also encompasses intact or full-length antibodies, including antibodies of any class or sub-class, including IgG and sub-classes thereof, IgM, IgE, IgA, and IgD.

An "individual" or "subject" includes a mammal. Mammals include, but are not limited to, domesticated animals (e.g., cows, sheep, cats, dogs, and horses), primates (e.g., humans and non-human primates such as monkeys), rabbits, and rodents (e.g., mice and rats). An "individual" or "subject" may include birds such as chickens, vertebrates such as fish and mammals such as mice, rats, rabbits, cats, dogs, pigs, cows, ox, sheep, goats, horses, monkeys and other non-human primates. In certain embodiments, the individual or subject is a human.

As used herein, the term "sample" refers to anything which may contain an analyte for which an analyte assay is desired. As used herein, a "sample" can be a solution, a suspension, liquid, powder, a paste, aqueous, non-aqueous or any combination thereof. In some embodiments, the sample is a biological sample. A biological sample of the present disclosure encompasses a sample in the form of a solution, a suspension, a liquid, a powder, a paste, an aqueous sample, or a non-aqueous sample. As used herein, a "biological sample" includes any sample obtained from a living or viral (or prion) source or other source of macromolecules and biomolecules, and includes any cell type or tissue of a subject from which nucleic acid, protein and/or other macromolecule can be obtained. The biological sample can be a sample obtained directly from a biological source or a sample that is processed. For example, isolated nucleic acids that are amplified constitute a biological sample. Biological samples include, but are not limited to, body fluids, such as blood, plasma, serum, cerebrospinal fluid, synovial fluid, urine and sweat, tissue and organ samples from animals and plants and processed samples derived therefrom. In some embodiments, the sample can be derived from a tissue or a body fluid, for example, a connective, epithelium, muscle or nerve tissue; a tissue selected from the group consisting of brain, lung, liver, spleen, bone marrow, thymus, heart, lymph, blood, bone, cartilage, pancreas, kidney, gall bladder, stomach, intestine, testis, ovary, uterus, rectum, nervous system, gland, and internal blood vessels; or a body fluid selected from the group consisting of blood, urine, saliva, bone marrow, sperm, an ascitic fluid, and subfractions thereof, e.g., serum or plasma.

The terms "level" or "levels" are used to refer to the presence and/or amount of a target, e.g., a substance or an organism that is part of the etiology of a disease or disorder, and can be determined qualitatively or quantitatively. A "qualitative" change in the target level refers to the appearance or disappearance of a target that is not detectable or is present in samples obtained from normal controls. A "quantitative" change in the levels of one or more targets refers to a measurable increase or decrease in the target levels when compared to a healthy control.

As used herein, the term "macromolecule" encompasses large molecules composed of smaller subunits. Examples of macromolecules include, but are not limited to peptides, polypeptides, proteins, nucleic acids, carbohydrates, lipids, macrocycles, or a combination or complex thereof. A macromolecule also includes a chimeric macromolecule composed of a combination of two or more types of macromolecules, covalently linked together (e.g., a peptide linked to a nucleic acid). A macromolecule may also include a "macromolecule assembly", which is composed of non-covalent complexes of two or more macromolecules. A macromolecule assembly may be composed of the same type of macromolecule (e.g., protein-protein) or of two or more different types of macromolecules (e.g., protein-DNA).

As used herein, the term "polypeptide" encompasses peptides and proteins, and refers to a molecule comprising a chain of two or more amino acids joined by peptide bonds. In some embodiments, a polypeptide comprises 2 to 50 amino acids. In some embodiments, a polypeptide does not comprise a secondary, tertiary, or higher structure. In some embodiments, the polypeptide is a protein. In some embodiments, a protein comprises 30 or more amino acids. In some embodiments, in addition to a primary structure, a protein comprises a secondary, tertiary, or higher structure. The amino acids of the polypeptides are most typically L-amino acids, but may also be D-amino acids, modified amino acids, amino acid analogs, amino acid mimetics, or any combination thereof. Polypeptides may be naturally occurring, synthetically produced, or recombinantly expressed. Polypeptides may be synthetically produced, isolated, recombinantly expressed, or be produced by a combination of methodologies as described above. Polypeptides may also comprise additional groups modifying the amino acid chain, for example, functional groups added via post-translational modification. The polymer may be linear or branched, it may comprise modified amino acids, and it may be interrupted by non-amino acids. The term also encompasses an amino acid polymer that has been modified naturally or by intervention; for example, disulfide bond formation, glycosylation, lipidation, acetylation, phosphorylation, or any other manipulation or modification, such as conjugation with a labeling component.

As used herein, the term "amino acid" refers to an organic compound comprising an amine group, a carboxylic acid group, and a side-chain specific to each amino acid, which serve as a monomeric subunit of a peptide. An amino acid includes the 20 standard, naturally occurring or canonical amino acids as well as non-standard amino acids. The standard, naturally-occurring (or natural) amino acids include Alanine (A or Ala), Cysteine (C or Cys), Aspartic Acid (D or Asp), Glutamic Acid (E or Glu), Phenylalanine (F or Phe), Glycine (G or Gly), Histidine (H or His), Isoleucine (I or Ile), Lysine (K or Lys), Leucine (L or Leu), Methionine (M or Met), Asparagine (N or Asn), Proline (P or Pro), Glutamine (Q or Gln), Arginine (R or Arg), Serine (S or Ser), Threonine (T or Thr), Valine (V or Val), Tryptophan (W or Trp), and Tyrosine (Y or Tyr). An amino acid may be an L-amino acid or a D-amino acid. Non-standard amino acids may be modified amino acids, amino acid analogs, amino acid mimetics, non-standard proteinogenic amino acids, or non-proteinogenic amino acids that occur naturally or are chemically synthesized. Examples of non-standard amino acids include, but are not limited to, selenocysteine, pyrrolysine, and N-formylmethionine, R-amino acids, Homo-amino acids, Proline and Pyruvic acid derivatives, 3-substituted alanine derivatives, glycine derivatives, ring-substituted phenylalanine and tyrosine derivatives, linear core amino acids, N-methyl amino acids. The term "amino acid residue" refers to an amino acid incorporated into a polypeptide that forms peptide bond(s) with neighboring amino acid(s).

As used herein, the term "post-translational modification" refers to modifications that occur on a peptide after its translation, e.g., translation by ribosomes, is complete. A post-translational modification may be a covalent chemical modification or enzymatic modification. Examples of post-translation modifications include, but are not limited to, acylation, acetylation, alkylation (including methylation), biotinylation, butyrylation, carbamylation, carbonylation, deamidation, deiminiation, diphthamide formation, disulfide bridge formation, eliminylation, flavin attachment, formylation, gamma-carboxylation, glutamylation, glycylation, glycosylation, glypiation, heme C attachment, hydroxylation, hypusine formation, iodination, isoprenylation, lipidation, lipoylation, malonylation, methylation, myristoylation, oxidation, palmitoylation, pegylation, phosphopantetheinylation, phosphorylation, prenylation, propionylation, retinylidene Schiff base formation, S-glutathionylation, S-nitrosylation, S-sulfenylation, selenation, succinylation, sulfination, ubiquitination, and C-terminal amidation. A post-translational modification includes modifications of the amino terminus and/or the carboxyl terminus of a peptide. Modifications of the terminal amino group include, but are not limited to, des-amino, N-lower alkyl, N-di-lower alkyl, and N-acyl modifications. Modifications of the terminal carboxy group include, but are not limited to, amide, lower alkyl amide, dialkyl amide, and lower alkyl ester modifications (e.g., wherein lower alkyl is C1-C4 alkyl). A post-translational modification also includes modifications, such as but not limited to those described above, of amino acids falling between the amino and carboxy termini. The term post-translational modification can also include peptide modifications that include one or more detectable labels.

The term "detectable label" as used herein refers to a substance which can indicate the presence of another substance when associated with it. The detectable label can be a substance that is linked to or incorporated into the substance to be detected. In some embodiments, a detectable label is suitable for allowing for detection and also quantification, for example, a detectable label that emitting a detectable and measurable signal. Examples of detectable labels include a dye, a fluorophore, a chromophore, a fluorescent nanoparticle (e.g. quantum dot), a radiolabel, an enzyme (e.g. alkaline phosphatase, luciferase or horseradish peroxidase), or a chemiluminescent or bioluminescent molecule.

As used herein, the term "binding agent" refers to a nucleic acid molecule, a peptide, a polypeptide, a protein, carbohydrate, or a small molecule that binds to, associates, unites with, recognizes, or combines with a binding target, e.g., a polypeptide or a component or feature of a polypeptide. A binding agent may form a covalent association or non-covalent association with the polypeptide or component or feature of a polypeptide. A binding agent may also be a chimeric binding agent, composed of two or more types of molecules, such as a nucleic acid molecule-peptide chimeric binding agent or a carbohydrate-peptide chimeric binding agent. A binding agent may be a naturally occurring, synthetically produced, or recombinantly expressed molecule. A binding agent may bind to a single monomer or subunit of a polypeptide (e.g., a single amino acid of a polypeptide) or bind to a plurality of linked subunits of a polypeptide (e.g., a di-peptide, tri-peptide, or higher order peptide of a longer peptide, polypeptide, or protein molecule). A binding agent may bind to a linear molecule or a molecule having a three-dimensional structure (also referred to as conformation). For example, an antibody binding agent may bind to linear peptide, polypeptide, or protein, or bind to a conformational peptide, polypeptide, or protein. A binding agent may bind to an N-terminal peptide, a C-terminal peptide, or an intervening peptide of a peptide, polypeptide, or protein molecule. A binding agent may bind to an N-terminal amino acid, C-terminal amino acid, or an intervening amino acid of a peptide molecule. A binding agent may preferably bind to a chemically modified or labeled amino acid (e.g., an amino acid that has been labeled by a chemical reagent) over a non-modified or unlabeled amino acid. For example, a binding agent may preferably bind to an amino acid that has been labeled or modified over an amino acid that is unlabeled or unmodified. A binding agent may bind to a post-translational modification of a peptide molecule. A binding agent may exhibit selective binding to a component or feature of a polypeptide (e.g., a binding agent may selectively bind to one of the 20 possible natural amino acid residues and bind with very low affinity or not at all to the other 19 natural amino acid residues). A binding agent may exhibit less selective binding, where the binding agent is capable of binding or configured to bind to a plurality of components or features of a polypeptide (e.g., a binding agent may bind with similar affinity to two or more different amino acid residues). A binding agent may comprise a coding tag, which may be joined to the binding agent by a linker.

The term "specifically binding" as used herein generally refers to an engineered binder (binding agent) that binds to a cognate target macromolecule analyte (such as polypeptide analyte) or a portion thereof more readily than it would bind to a random, non-cognate macromolecule analyte. The term "specificity" is used herein to qualify the relative affinity by which an engineered binder binds to a cognate target macromolecule analyte. Specific binding typically means that an engineered binder binds to a cognate target macromolecule analyte at least twice more likely that to a random, non-cognate macromolecule analyte (a 2:1 ratio of specific to non-specific binding). Non-specific binding refers to background binding, and is the amount of signal that is produced in a binding assay with an engineered binder when the cognate target macromolecule is not present in the assay. In some embodiments, specific binding will be at least three times the standard deviation of the background signal. In some specific embodiments, specific binding refers to binding between an engineered binder and an N-terminally modified target polypeptide with a dissociation constant (Kd) of 200 nM or less.

Binding agents that are specific for or bind specifically to a target macromolecule analyte avoid binding to a significant percentage of non-target substances, e.g., non-target substances present in a testing sample. In some embodiments, binding agents of the present disclosure avoid binding greater than about 90% of non-target substances, although higher percentages are clearly contemplated and preferred. For example, binding agents of the present disclosure avoid binding about 91%, about 92%, about 93%, about 94%, about 95%, about 96%, about 97%, about 98%, about 99% or more of non-target substances. In other embodiments, binding agents of the present disclosure avoid binding greater than about 10%, 20%, 30%, 40%, 50%, 60%, or 70%, or greater than about 75%, or greater than about 80%, or greater than about 85% of non-target substances.

As used herein, the term "linker" refers to one or more of a nucleotide, a nucleotide analog, an amino acid, a peptide, a polypeptide, a polymer, or a non-nucleotide chemical moiety that is used to join two molecules. A linker may be used to join a binding agent with a coding tag, a recording tag with a polypeptide, a polypeptide with a support, a recording tag with a solid support, etc. In certain embodiments, a linker joins two molecules via enzymatic reaction or chemistry reaction (e.g., a click chemistry reaction). In certain embodiments, the nucleic acid recording tag is associated directly or indirectly to the macromolecule analyte via a non-nucleotide chemical moiety.

The term "ligand" as used herein refers to any molecule or moiety connected to the compounds described herein. "Ligand" may refer to one or more ligands attached to a compound. In some embodiments, the ligand is a pendant group or binding site (e.g., the site to which the binding agent binds).

The terminal amino acid at one end of a peptide or polypeptide chain that has a free amino group is referred to herein as the "N-terminal amino acid" (NTAA). The terminal amino acid at the other end of the chain that has a free carboxyl group is referred to herein as the "C-terminal amino acid" (CTAA). The amino acids making up a peptide may be numbered in order, with the peptide being "n" amino acids in length. As used herein, NTAA is considered the nth amino acid (also referred to herein as the "n NTAA"). Using this nomenclature, the next amino acid is the n-1 amino acid, then the n-2 amino acid, and so on down the length of the peptide from the N-terminal end to C-terminal end. In certain embodiments, an NTAA, CTAA, or both may be modified or labeled with a moiety or a chemical moiety.

As used herein, the term "barcode" refers to a nucleic acid molecule of about 2 to about 30 bases (e.g., 2, 3, 4, 5, 6, 7, 8, 9, 10, 11, 12, 13, 14, 15, 16, 17, 18, 19, 20, 21, 22, 23, 24, 25, 26, 27, 28, 29 or 30 bases) providing a unique identifier tag or origin information for a polypeptide, a binding agent, a set of binding agents from a binding cycle, a sample polypeptides, a set of samples, polypeptides within a compartment (e.g., droplet, bead, or separated location), polypeptides within a set of compartments, a fraction of polypeptides, a set of polypeptide fractions, a spatial region or set of spatial regions, a library of polypeptides, or a library of binding agents. A barcode can be an artificial sequence or a naturally occurring sequence. In certain embodiments, each barcode within a population of barcodes is different. In other embodiments, a portion of barcodes in a population of barcodes is different, e.g., at least about 10%, 15%, 20%, 25%, 30%, 35%, 40%, 45%, 50%, 55%, 60%, 65%, 70%, 75%, 80%, 85%, 90%, 95%, 97%, or 99% of the barcodes in a population of barcodes is different. A population of barcodes may be randomly generated or non-randomly generated. In certain embodiments, a population of barcodes are error-correcting or error-tolerant barcodes. Barcodes can be used to computationally deconvolute the multiplexed sequencing data and identify sequence reads derived from an individual polypeptide, sample, library, etc. A barcode can also be used for deconvolution of a collection of polypeptides that have been distributed into small compartments for enhanced mapping. For example, rather than mapping a peptide back to the proteome, the peptide is mapped back to its originating protein molecule or protein complex.

As used herein, the term "coding tag" refers to a polynucleotide with any suitable length, e.g., a nucleic acid molecule of about 2 bases to about 100 bases, including any integer including 2 and 100 and in between, that comprises identifying information for its associated binding agent. A "coding tag" may also be made from a "sequenceable polymer" (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety). A coding tag may comprise an encoder sequence, which is optionally flanked by one spacer on one side or optionally flanked by a spacer on each side. A coding tag may also be comprised of an optional UMI and/or an optional binding cycle-specific barcode. A coding tag may be single stranded or double stranded. A double stranded coding tag may comprise blunt ends, overhanging ends, or both. A coding tag may refer to the coding tag that is directly attached to a binding agent, to a complementary sequence hybridized to the coding tag directly attached to a binding agent (e.g., for double stranded coding tags), or to coding tag information present in an extended recording tag. In certain embodiments, a coding tag may further comprise a binding cycle specific spacer or barcode, a unique molecular identifier, a universal priming site, or any combination thereof.

As used herein, the term "spacer" (Sp) refers to a nucleic acid molecule of about 1 base to about 20 bases (e.g., 1, 2, 3, 4, 5, 6, 7, 8, 9, 10, 11, 12, 13, 14, 15, 16, 17, 18, 19, or 20 bases) in length that is present on a terminus of a recording tag or coding tag. In certain embodiments, a spacer sequence flanks an encoder sequence of a coding tag on one end or both ends. Following binding of a binding agent to a polypeptide, annealing between complementary spacer sequences on their associated coding tag and recording tag, respectively, allows transfer of binding information through a primer extension reaction or ligation to the recording tag, coding tag, or a di-tag construct. Sp' refers to spacer sequence complementary to Sp. Preferably, spacer sequences within a library of binding agents possess the same number of bases. A common (shared or identical) spacer may be used in a library of binding agents. A spacer sequence may have a "cycle specific" sequence in order to track binding agents used in a particular binding cycle. The spacer sequence (Sp) can be constant across all binding cycles, be specific for a particular class of polypeptides, or be binding cycle number specific. Polypeptide class-specific spacers permit annealing of a cognate binding agent's coding tag information present in an extended recording tag from a completed binding/extension cycle to the coding tag of another binding agent recognizing the same class of polypeptides in a subsequent binding cycle via the class-specific spacers. Only the sequential binding of correct cognate pairs results in interacting spacer elements and effective primer extension. A spacer sequence may comprise sufficient number of bases to anneal to a complementary spacer sequence in a recording tag to initiate a primer extension (also referred to as polymerase extension) reaction, or provide a "splint" for a ligation reaction, or mediate a "sticky end" ligation reaction.

As used herein, the term "recording tag" refers to a moiety, e.g., a chemical coupling moiety, a nucleic acid molecule, or a sequenceable polymer molecule (see, e.g., Niu et al., 2013, Nat. Chem. 5:282-292; Roy et al., 2015, Nat. Commun. 6:7237; Lutz, 2015, Macromolecules 48:4759-4767; each of which are incorporated by reference in its entirety) to which identifying information of a coding tag can be transferred, or from which identifying information about the macromolecule associated with the recording tag can be transferred to the coding tag. Identifying information can comprise any information characterizing a molecule such as information pertaining to sample, fraction, partition, spatial location, interacting neighboring molecule(s), cycle number, etc. Additionally, the presence of UMI can also be classified as identifying information. In certain embodiments, after a binding agent binds to a polypeptide, information from a coding tag linked to a binding agent can be transferred to the recording tag associated with the polypeptide while the binding agent is bound to the polypeptide. In other embodiments, after a binding agent binds to a polypeptide, information from a recording tag associated with the polypeptide can be transferred to the coding tag linked to the binding agent while the binding agent is bound to the polypeptide. A recording tag may be directly linked to a polypeptide, linked to a polypeptide via a multifunctional linker, or associated with a polypeptide by virtue of its proximity (or co-localization) on a support. A recording tag may be linked via its 5' end or 3' end or at an internal site, as long as the linkage is compatible with the method used to transfer coding tag information to the recording tag or vice versa. A recording tag may further comprise other functional components, e.g., a universal priming site, unique molecular identifier, a barcode (e.g., a sample barcode, a fraction barcode, spatial barcode, a compartment tag, etc.), a spacer sequence that is complementary to a spacer sequence of a coding tag, or any combination thereof. The spacer sequence of a recording tag is preferably at the 3'-end of the recording tag in embodiments where polymerase extension is used to transfer coding tag information to the recording tag.

As used herein, the term "unique molecular identifier" or "UMI" refers to a nucleic acid molecule of about 3 to about 40 bases (3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 bases) in length providing a unique identifier tag for each macromolecule, polypeptide or binding agent to which the UMI is linked. A polypeptide UMI can be used to computationally deconvolute sequencing data from a plurality of extended recording tags to identify extended recording tags that originated from an individual polypeptide. A polypeptide UMI can be used to accurately count originating polypeptide molecules by collapsing NGS reads to unique UMIs. A binding agent UMI can be used to identify each individual molecular binding agent that binds to a particular polypeptide. For example, a UMI can be used to identify the number of individual binding events for a binding agent specific for a single amino acid that occurs for a particular peptide molecule. It is understood that when UMI and barcode are both referenced in the context of a binding agent or polypeptide, that the barcode refers to identifying information other that the UMI for the individual binding agent or polypeptide (e.g., sample barcode, compartment barcode, binding cycle barcode).

As used herein, the term "universal priming site" or "universal primer" or "universal priming sequence" refers to a nucleic acid molecule, which may be used for library amplification and/or for sequencing reactions. A universal priming site may include, but is not limited to, a priming site (primer sequence) for PCR amplification, flow cell adaptor sequences that anneal to complementary oligonucleotides on flow cell surfaces enabling bridge amplification in some next generation sequencing platforms, a sequencing priming site, or a combination thereof. Universal priming sites can be used for other types of amplification, including those commonly used in conjunction with next generation digital sequencing. For example, extended recording tag molecules may be circularized and a universal priming site used for rolling circle amplification to form DNA nanoballs that can be used as sequencing templates (Drmanac et al., 2009, Science 327:78-81).

As used herein, the term "extended recording tag" refers to a recording tag to which information of at least one binding agent's coding tag (or its complementary sequence) has been transferred following binding of the binding agent to a polypeptide. Information of the coding tag may be transferred to the recording tag directly (e.g., ligation) or indirectly (e.g., primer extension). Information of a coding tag may be transferred to the recording tag enzymatically or chemically. An extended recording tag may comprise binding agent information of 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, 70, 75, 80, 85, 90, 95, 100, 200 or more coding tags. The base sequence of an extended recording tag may reflect the temporal and sequential order of binding of the binding agents identified by their coding tags, may reflect a partial sequential order of binding of the binding agents identified by the coding tags, or may not reflect any order of binding of the binding agents identified by the coding tags. In certain embodiments, the coding tag information present in the extended recording tag represents with at least 25%, 30%, 35%, 40%4, 45%, 50%, 55%, 60%, 65%, 70%, 75%, 80%, 85%, 90%, 91%, 92%, 93%, 94%, 95%, 96%, 97%, 98%, 99%, or 100% identity the polypeptide sequence being analyzed. In certain embodiments where the extended recording tag does not represent the polypeptide sequence being analyzed with 100% identity, errors may be due to off-target binding by a binding agent, or to a "missed" binding cycle (e.g., because a binding agent fails to bind to a polypeptide during a binding cycle, because of a failed primer extension reaction), or both.

As used herein, the term "solid support", "solid surface", or "solid substrate", or "sequencing substrate", or "substrate" refers to any solid material, including porous and non-porous materials, to which a polypeptide can be associated directly or indirectly, by any means known in the art, including covalent and non-covalent interactions, or any combination thereof. A solid support may be two-dimensional (e.g., planar surface) or three-dimensional (e.g., gel matrix or bead). A solid support can be any support surface including, but not limited to, a bead, a microbead, an array, a glass surface, a silicon surface, a plastic surface, a filter, a membrane, a PTFE membrane, a silicon wafer chip, a flow through chip, a flow cell, a biochip including signal transducing electronics, a channel, a microtiter well, an ELISA plate, a spinning interferometry disc, a nitrocellulose-based polymer surface, a polymer matrix, a nanoparticle, or a microsphere. Materials for a solid support include but are not limited to acrylamide, agarose, cellulose, dextran, nitro-cellulose, glass, gold, quartz, polystyrene, polyethylene vinyl acetate, polypropylene, polyester, polymethacrylate, polyacrylate, polyethylene, polyethylene oxide, polysilicates, polycarbonates, poly vinyl alcohol (PVA), Teflon, fluorocarbons, nylon, silicon rubber, polyanhydrides, polyglycolic acid, polyvinylchloride, polylactic acid, polyorthoesters, functionalized silane, polypropylfumerate, collagen, glycosaminoglycans, polyamino acids, dextran, or any combination thereof. Solid supports further include thin film, membrane, bottles, dishes, fibers, woven fibers, shaped polymers such as tubes, particles, beads, microspheres, microparticles, or any combination thereof. For example, when solid surface is a bead, the bead can include, but is not limited to, a ceramic bead, a polystyrene bead, a polymer bead, a polyacrylate bead, a methylstyrene bead, an agarose bead, a cellulose bead, a dextran bead, an acrylamide bead, a solid core bead, a porous bead, a paramagnetic bead, a glass bead, a controlled pore bead, a silica-based bead, or any combinations thereof. A bead may be spherical or an irregularly shaped. A bead or support may be porous. A bead's size may range from nanometers, e.g., 100 nm, to millimeters, e.g., 1 mm. In certain embodiments, beads range in size from about 0.2 micron to about 200 microns, or from about 0.5 micron to about 5 micron. In some embodiments, beads can be about 1, 1.5, 2, 2.5, 2.8, 3, 3.5, 4, 4.5, 5, 5.5, 6, 6.5, 7, 7.5, 8, 8.5, 9, 9.5, 10, 10.5, 15, or 20 µm in diameter. In certain embodiments, "a bead" solid support may refer to an individual bead or a plurality of beads. In some embodiments, the solid surface is a nanoparticle. In certain embodiments, the nanoparticles range in size from about 1 nm to about 500 nm in diameter, for example, between about 1 nm and about 20 nm, between about 1 nm and about 50 nm, between about 1 nm and about 100 nm, between about 10 nm and about 50 nm, between about 10 nm and about 100 nm, between about 10 nm and about 200 nm, between about 50 nm and about 100 nm, between about 50 nm and about 150, between about 50 nm and about 200 nm, or between about 200 nm and about 500 nm in diameter. In some embodiments, the nanoparticles can be about 10 nm, about 50 nm, about 100 nm, about 150 nm, about 200 nm, about 300 nm, or about 500 nm in diameter. In some embodiments, the nanoparticles are less than about 200 nm in diameter.

As used herein, the term "nucleic acid molecule" or "polynucleotide" refers to a single- or double-stranded polynucleotide containing deoxyribonucleotides or ribonucleotides that are linked by 3'-5' phosphodiester bonds, as well as polynucleotide analogs. A nucleic acid molecule includes, but is not limited to, DNA, RNA, and cDNA. A polynucleotide analog may possess a backbone other than a standard phosphodiester linkage found in natural polynucleotides and, optionally, a modified sugar moiety or moieties other than ribose or deoxyribose. Polynucleotide analogs contain bases capable of hydrogen bonding by Watson-Crick base pairing to standard polynucleotide bases, where the analog backbone presents the bases in a manner to permit such hydrogen bonding in a sequence-specific fashion between the oligonucleotide analog molecule and bases in a standard polynucleotide. Examples of polynucleotide analogs include, but are not limited to xeno nucleic acid (XNA), bridged nucleic acid (BNA), glycol nucleic acid (GNA), peptide nucleic acids (PNAs), morpholino polynucleotides, locked nucleic acids (LNAs), threose nucleic acid (TNA), 2'-O-Methyl polynucleotides, 2-O-alkyl ribosyl substituted polynucleotides, phosphorothioate polynucleotides, and boronophosphate polynucleotides. A polynucleotide analog may possess purine or pyrimidine analogs, including for example, 7-deaza purine analogs, 8-halopurine analogs, 5-halopyrimidine analogs, or universal base analogs that can pair with any base, including hypoxanthine, nitroazoles, isocarbostyril analogues, azole carboxamides, and aromatic triazole analogues, or base analogs with additional functionality, such as a biotin moiety for affinity binding. In some embodiments, the nucleic acid molecule or oligonucleotide is a modified oligonucleotide. In some embodiments, the nucleic acid molecule or oligonucleotide is a DNA with pseudo-complementary bases, a DNA with protected bases, an RNA molecule, a BNA molecule, an XNA molecule, a LNA molecule, a PNA molecule, or a morpholino DNA, or a combination thereof. In some embodiments, the nucleic acid molecule or oligonucleotide is backbone modified, sugar modified, or nucleobase modified. In some embodiments, the nucleic acid molecule or oligonucleotide has nucleobase protecting groups such as Alloc, electrophilic protecting groups such as thiranes, acetyl protecting groups, nitrobenzyl protecting groups, sulfonate protecting groups, or traditional base-labile protecting groups.

As used herein, "nucleic acid sequencing" means the determination of the order of nucleotides in a nucleic acid molecule or a sample of nucleic acid molecules. Similarly, "polypeptide sequencing" means the determination of the identity and order of at least a portion of amino acids in the polypeptide molecule or in a sample of polypeptide molecules.

As used herein, "next generation sequencing" refers to high-throughput sequencing methods that allow the sequencing of millions to billions of molecules in parallel. Examples of next generation sequencing methods include sequencing by synthesis, sequencing by ligation, sequencing by hybridization, polony sequencing, ion semiconductor sequencing, and pyrosequencing. By attaching primers to a solid substrate and a complementary sequence to a nucleic acid molecule, a nucleic acid molecule can be hybridized to the solid substrate via the primer and then multiple copies can be generated in a discrete area on the solid substrate by using polymerase to amplify (these groupings are sometimes referred to as polymerase colonies or polonies). Consequently, during the sequencing process, a nucleotide at a particular position can be sequenced multiple times (e.g., hundreds or thousands of times)—this depth of coverage is referred to as "deep sequencing." Examples of high throughput nucleic acid sequencing technology include platforms provided by Illumina, BGI, Qiagen, Thermo-Fisher, and Roche, including formats such as parallel bead arrays, sequencing by synthesis, sequencing by ligation, capillary electrophoresis, electronic microchips, "biochips," microarrays, parallel microchips, and single-molecule arrays (See e.g., Service, Science (2006) 311:1544-1546).

As used herein, "single molecule sequencing" or "third generation sequencing" refers to next-generation sequencing methods wherein reads from single molecule sequencing instruments are generated by sequencing of a single molecule of DNA. Unlike next generation sequencing methods that rely on amplification to clone many DNA molecules in parallel for sequencing in a phased approach, single molecule sequencing interrogates single molecules of DNA and does not require amplification or synchronization. Examples of single molecule sequencing methods include single molecule real-time sequencing (Pacific Biosciences), nanopore-based sequencing (Oxford Nanopore), duplex interrupted nanopore sequencing, and direct imaging of DNA using advanced microscopy.

As used herein, "analyzing" the polypeptide means to identify, detect, quantify, characterize, distinguish, or a combination thereof, all or a portion of the components of the polypeptide. For example, analyzing a peptide, polypeptide, or protein includes determining all or a portion of the amino acid sequence (contiguous or non-continuous) of the peptide. Analyzing a polypeptide also includes partial identification of a component of the polypeptide. For example, partial identification of amino acids in the polypeptide protein sequence can identify an amino acid in the protein as belonging to a subset of possible amino acids. Analysis typically begins with analysis of the n NTAA, and then proceeds to the next amino acid of the peptide (i.e., n-1, n-2, n-3, and so forth). This is accomplished by elimination of the n NTAA, thereby converting the n-1 amino acid of the peptide to an N-terminal amino acid (referred to herein as the "n-1 NTAA"). Analyzing the peptide may also include determining the presence and frequency of post-translational modifications on the peptide, which may or may not include information regarding the sequential order of the post-translational modifications on the peptide. Analyzing the peptide may also include determining the presence and frequency of epitopes in the peptide, which may or may not include information regarding the sequential order or location of the epitopes within the peptide. Analyzing the peptide may include combining different types of analysis, for example obtaining epitope information, amino acid sequence information, post-translational modification information, or any combination thereof.

The term "sequence identity" is a measure of identity between polypeptides at the amino acid level, and a measure of identity between nucleic acids at nucleotide level. The polypeptide sequence identity may be determined by comparing the amino acid sequence in a given position in each sequence when the sequences are aligned. Similarly, the nucleic acid sequence identity may be determined by comparing the nucleotide sequence in a given position in each sequence when the sequences are aligned. "Sequence identity" means the percentage of identical subunits at corresponding positions in two sequences when the two sequences are aligned to maximize subunit matching, i.e., taking into account gaps and insertions. For example, the BLAST algorithm (NCBI) calculates percent sequence identity and performs a statistical analysis of the similarity and identity between the two sequences. The software for performing BLAST analysis is publicly available through the National Center for Biotechnology Information (NCBI) website.

The term "unmodified" (also "wild-type" or "native") as used herein is used in connection with biological materials such as nucleic acid molecules and proteins (e.g., cleavase), refers to those which are found in nature and not modified by human intervention.

The term "modified" or "engineered" (or "variant", or "mutant") as used in reference to nucleic acid molecules and protein molecules, e.g., an engineered DNA polymerase, implies that such molecules are created by human intervention and/or they are non-naturally occurring. The variant, mutant or engineered DNA polymerase is a polypeptide having an altered amino acid sequence, relative to an unmodified or wild-type protein, such as starting DNA polymerase, or a portion thereof. An engineered enzyme is a polypeptide which differs from a wild-type enzyme scaffold sequence, or a portion thereof, by one or more amino acid substitutions, deletions, additions, or combinations thereof. An engineered DNA polymerase generally exhibits at least 70%, 80%, 85%, 86%, 87%, 88%, 89%, 90%, 91%, 92%, 93%, 94%, 95%, 96%, 97%, 98%, 99% or more sequence identity to a corresponding wild-type starting DNA polymerase scaffold. Non-naturally occurring amino acids as well as naturally occurring amino acids are included within the scope of permissible substitutions or additions. A variant or engineered DNA polymerase denotes a composition and not necessarily a product produced by any given process. A variety of techniques including genetic selection, protein engineering, recombinant methods, chemical synthesis, or combinations thereof, may be employed.

In some embodiments, variants of a DNA polymerase displaying only non-substantial or negligible differences in structure can be generated by making conservative amino acid substitutions in the engineered DNA polymerase. By doing this, further engineered DNA polymerase variants that comprise a sequence having at least 90% (90%, 91%, 92%, 93%, 94%, 95%, 96%, 97%, 98%, and 99%) sequence identity with the initial engineered DNA polymerase sequences can be generated, retaining at least one functional activity of the engineered DNA polymerase, e.g. ability to catalyze primer extension reaction, incorporating nucleotides into growing DNA chain. Examples of conservative amino acid changes are known in the art. Examples of non-conservative amino acid changes that are likely to cause major changes in protein structure are those that cause substitution of (a) a hydrophilic residue, e.g., serine or threonine, for (or by) a hydrophobic residue, e.g., leucine, isoleucine, phenylalanine, valine or alanine; (b) a cysteine or proline for (or by) any other residue; (c) a residue having an electropositive side chain, e.g., lysine, arginine, or histidine, for (or by) an electronegative residue, e.g., glutamic acid or aspartic acid; or (d) a residue having a bulky side chain, e.g., phenylalanine, for (or by) one not having a side chain, e g., glycine. Methods of making targeted amino acid substitutions, deletions, truncations, and insertions are generally known in the art. For example, amino acid sequence variants can be prepared by mutations in the DNA. Methods for polynucleotide alterations are well known in the art, for example, Kunkel et al. (1987) Methods in Enzymol. 154: 367-382; U.S. Pat. No. 4,873,192 and the references cited therein.

The terms "corresponding to position(s)" or "position(s) . . . with reference to position(s)" of or within a polypeptide or a polynucleotide, such as recitation that nucleotides or amino acid positions "correspond to" nucleotides or amino acid positions of a disclosed sequence, such sequence set forth in the Sequence Listing, refers to nucleotides or amino acid positions identified in the polynucleotide or in the polypeptide upon alignment with the disclosed sequence using a standard alignment algorithm, such as the BLAST algorithm (NCBI). By aligning the sequences, one skilled in the art can identify corresponding residues in a given polypeptide, for example, by using conserved and identical amino acid residues in the alignment as guides. Similarly, one skilled in the art can identify any given amino acid residue in a given polypeptide at a position corresponding to a particular position of a reference sequence, such as set forth in the Sequence Listing, by performing alignment of the polypeptide sequence with the reference sequence (for example, by BLASTP publicly available through the NCBI website), matching the corresponding position of the reference sequence with the position in polypeptide sequence and thus identifying the amino acid residue within the polypeptide.

The term "template" as used herein refers to a double-stranded or single-stranded nucleic acid molecule which is to be amplified, synthesized or sequenced. In the case of a double-stranded DNA molecule, denaturation of its strands to form a first and a second strand is performed before these molecules may be amplified, synthesized or sequenced. A primer, complementary to a portion of a template is hybridized under appropriate conditions and the polymerase of the invention may then synthesize a molecule complementary to said template or a portion thereof. Mismatch incorporation or strand slippage during the synthesis or extension of the newly synthesized molecule may result in one or a number of mismatched nucleotide pairs.

As used herein "amplification" refers to any in vitro method for increasing the number of copies of a nucleotide sequence with the use of a DNA polymerase. Nucleic acid amplification results in the incorporation of nucleotides into a DNA molecule or primer thereby forming a new DNA molecule complementary to a DNA template. The formed DNA molecule and its template can be used as templates to synthesize additional DNA molecules.

The terms "hybridization" and "hybridizing" refers to the pairing of two complementary single-stranded nucleic acid molecules (RNA and/or DNA) to give a double-stranded molecule. As used herein, two nucleic acid molecules may be hybridized, although the base pairing is not completely complementary. Accordingly, mismatched bases do not prevent hybridization of two nucleic acid molecules provided that appropriate conditions, well known in the art, are used. In the present invention, the term "hybridization" refers particularly to hybridization of an oligonucleotide to a template molecule.

As used herein, the term "primer extension", also referred to as "polymerase extension", refers to a reaction catalyzed by a nucleic acid polymerase (e.g., DNA polymerase) whereby a nucleic acid molecule (e.g., oligonucleotide primer, spacer sequence) that anneals to a complementary strand is extended by the polymerase, using the complementary strand as template.

The term "3'→5' exonuclease activity" refers to an enzymatic activity associated with nucleic acid polymerase, e.g., DNA polymerases, and is involved in a DNA replication "editing" or correction mechanism during template extension.

A "DNA polymerase substantially reduced in 3'-to-5' (or 3'-5') exonuclease activity" is defined herein as a DNA polymerase having a 3'-5' exonuclease specific activity which is less than about 1 unit/mg protein, or preferably about or less than 0.1 units/mg protein. A unit of activity of 3'-5' exonuclease is defined as the amount of activity that solubilizes 10 nmoles of substrate ends in 60 min at 37° C., assayed as described in the "BRL 1989 Catalogue & Reference Guide", page 5, with HhaI fragments of lambda DNA 3'-end labeled with [$^3$H]dTTP by terminal deoxynucleotidyl transferase (TdT). Non-limiting examples of commercially available DNA polymerases that have substantially reduced 3'→5' exonuclease activity include Taq, Klenow fragment DNA polymerase, Tne(exo-), Tma(exo-), Pfu (exo-) DNA polymerases, and mutants, variants and derivatives thereof. Alternatively, a DNA polymerase with substantially reduced 3'-to-5' exonuclease activity can be obtained by introducing mutation(s) to a DNA polymerase having 3'→5' exonuclease activity, and can be defined as a mutated DNA polymerase that has about or less than 10%, or preferably about or less than 1%, of the 3'-5' exonuclease activity of the corresponding unmutated, wildtype enzyme. For example, wildtype T5 DNA polymerase (T5-DNAP) has a specific activity of about 10 units/mg protein while the specific mutant of the DNA polymerase has a specific activity of about 0.0001 units/mg protein, a $10^5$-fold reduction in specific activity compared to the unmodified enzyme (U.S. Pat. No. 5,270, 179). Other examples of DNA polymerases having substantially reduced 3'-to-5' exonuclease activity and methods for producing them, as well as thermostable DNA polymerases that can be used as starting scaffolds are disclosed in U.S. Pat. Nos. 5,541,099, 5,436,149, 5,614,365, 5,374,553, 5,047,342, 4,889,818 and 7,501,237.

It is understood that aspects and embodiments of the invention described herein include "consisting of" and/or "consisting essentially of" aspects and embodiments.

Throughout this disclosure, various aspects of this invention are presented in a range format. It should be understood that the description in range format is merely for convenience and brevity and should not be construed as an inflexible limitation on the scope of the invention. Accordingly, the description of a range should be considered to have specifically disclosed all the possible sub-ranges as well as individual numerical values within that range. For example, description of a range such as from 1 to 6 should be considered to have specifically disclosed sub-ranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Attachment to the Support.

In some embodiments, the target (e.g., macromolecule) is joined to a support before performing the binding reaction. In some cases, it is desirable to use a support with a large carrying capacity to immobilize a large number of targets (e.g., macromolecules). In some embodiments, it is preferred to immobilize the targets using a three-dimensional support (e.g., a porous matrix or a bead). For example, the preparation of the targets including joining the target to a support is performed prior to performing the binding reaction. In some examples, the preparation of the target including joining the macromolecule to nucleic acid molecule or a oligonucleotide may be performed prior to or after immobilizing the target. In some embodiments, a plurality of targets are attached to a support prior to the binding reaction and contacting with a binding agent.

In some embodiments, the support may comprise any suitable solid material, including porous and non-porous materials, to which a macromolecule, e.g., a polypeptide, can be associated directly or indirectly, by any means known in the art, including covalent and non-covalent interactions, or any combination thereof.

Various reactions may be used to attach the macromolecule analytes to a support (e.g., a solid or a porous support). The macromolecules may be attached directly or indirectly to the support. In some cases, the macromolecules are attached to the support via a nucleic acid. Exemplary reactions include click chemistry reactions, such as the copper catalyzed reaction of an azide and alkyne to form a triazole (Huisgen 1, 3-dipolar cycloaddition), strain-promoted azide alkyne cycloaddition (SPAAC), reaction of a diene and dienophile (Diels-Alder), strain-promoted alkyne-nitrone cycloaddition, reaction of a strained alkene with an azide, tetrazine or tetrazole, alkene and azide [3+2]cycloaddition, alkene and tetrazine inverse electron demand Diels-Alder (IEDDA) reaction (e.g., m-tetrazine (mTet) or phenyl tetrazine (pTet) and trans-cyclooctene (TCO); or pTet and an alkene), alkene and tetrazole photoreaction, Staudinger ligation of azides and phosphines, and various displacement reactions, such as displacement of a leaving group by nucleophilic attack on an electrophilic atom (Horisawa 2014, Knall, Hollauf et al. 2014). Exemplary displacement reactions include reaction of an amine with: an activated ester; an N-hydroxysuccinimide ester; an isocyanate; an isothioscyanate, an aldehyde, an epoxide, or the like. In some embodiments, iEDDA click chemistry is used for immobilizing polypeptides to a support since it is rapid and delivers high yields at low input concentrations. In another embodiment, m-tetrazine rather than tetrazine is used in an iEDDA click chemistry reaction, as m-tetrazine has improved bond stability. In another embodiment, phenyl tetrazine (pTet) is used in an iEDDA click chemistry reaction. In one case, a polypeptide is labeled with a bifunctional click chemistry reagent, such as alkyne-NHS ester (acetylene-PEG-NHS ester) reagent or alkyne-benzophenone to generate an alkyne-labeled polypeptide. In some embodiments, an alkyne can also be a strained alkyne, such as cyclooctynes including Dibenzocyclooctyl (DBCO).

Similar methods (e.g. click chemistry reactions, bioorthogonal reactions) can be used to attach the macromolecule analyte to the associated nucleic acid recording tag, or to attach the binding agent to the associated nucleic acid coding tag. Such attachments can be achieved by introducing reactive moiety or moieties on one or on both attachment partners.

In certain embodiments where multiple targets are immobilized on the same support, the target molecules can be spaced appropriately to accommodate methods of performing the binding reaction and any downstream analysis steps to be used to assess the target. For example, it may be advantageous to space the target molecules that optimally to allow a nucleic acid-based method for assessing and sequencing the proteins to be performed. In some embodiments, the method for assessing and sequencing protein targets involve a binding agent which binds to the target molecules and the binding agent comprises a coding tag with information that is transferred to a nucleic acid attached to the target molecules. In some cases, spacing of the targets on the support is determined based on the consideration that information transfer from a coding tag of a binding agent bound to one target molecule may reach a neighboring molecule.

In some embodiments, the surface of the support is passivated (blocked). A "passivated" surface refers to a surface that has been treated with outer layer of material. Methods of passivating surfaces include standard methods from the fluorescent single molecule analysis literature, including passivating surfaces with polymer like polyethylene glycol (PEG) (Pan et al., 2015, Phys. Biol. 12:045006), polysiloxane (e.g., Pluronic F-127), star polymers (e.g., star PEG) (Groll et al., 2010, Methods Enzymol. 472:1-18), hydrophobic dichlorodimethylsilane (DDS)+self-assembled Tween-20 (Hua et al., 2014, Nat. Methods 11:1233-1236), diamond-like carbon (DLC), DLC+PEG (Stavis et al., 2011, Proc. Natl. Acad. Sci. USA 108:983-988), and zwitterionic moiety (e.g., U.S. Patent Application Publication US 2006/0183863). In addition to covalent surface modifications, a number of passivating agents can be employed as well including surfactants like Tween-20, polysiloxane in solution (Pluronic series), poly vinyl alcohol (PVA), and proteins like BSA and casein. Alternatively, density of macromolecules (e.g., proteins, polypeptide, or peptides) can be titrated on the surface or within the volume of a solid substrate by spiking a competitor or "dummy" reactive molecule when immobilizing the proteins, polypeptides or peptides to the solid substrate.

To control spacing of the immobilized targets on the support, the density of functional coupling groups for attaching the target (e.g., TCO or carboxyl groups (COOH)) may be titrated on the substrate surface. In some embodiments, multiple target molecules (e.g., macromolecules) are spaced apart on the surface or within the volume (e.g., porous supports) of a support such that adjacent molecules are spaced apart at a distance of about 50 nm to about 500 nm, or about 50 nm to about 200 nm, or about 50 nm to about 100 nm. In some embodiments, multiple molecules are spaced apart on the surface of a support with an average distance of at least 50 nm, at least 60 nm, at least 70 nm, at least 80 nm, at least 90 nm, at least 100 nm, at least 200 nm, or at least 500 nm. In some embodiments, multiple molecules are spaced apart on the surface of a support with an average distance of at least 50 nm. In some embodiments, molecules are spaced apart on the surface or within the volume of a support such that, empirically, the relative frequency of inter- to intra-molecular events (e.g. transfer of information) is <1:10; <1:100; <1:1,000; or <1:10,000. In some embodiments, the plurality of target molecules (e.g., macromolecules) is coupled on the support spaced apart at an average distance between two adjacent molecules which ranges from about 50 to 100 nm, from about 50 to 500 nm, from about 50 to 1,000 nm, from about 50 to 2,000 nm, from about 500 to 600 nm, from about 500 to 1,000 nm, from about 500 to 2,000 nm, from about 500 to 5,000 nm, from about 1,000 to 5,000 nm, or from about 3,000 to 5,000 nm.

In some embodiments, appropriate spacing of the target molecules (e.g., macromolecules) on the support is accomplished by titrating the ratio of available attachment molecules on the substrate surface. In some examples, the substrate surface (e.g., bead surface) is functionalized with a carboxyl group (COOH) which is treated with an activating agent (e.g., activating agent is EDC and Sulfo-NHS). In some examples, the substrate surface (e.g., bead surface) comprises NHS moieties. In some embodiments, a mixture of mPEGn-NH2 and NH2-PEGn-mTet is added to the activated beads (wherein n is any number, such as 1-100). The ratio between the mPEG3-NH2 (not available for coupling) and NH2-PEG24-mTet (available for coupling) is titrated to generate an appropriate density of functional moieties available to attach the polypeptides on the substrate surface. In certain embodiments, the mean spacing between coupling moieties (e.g., NH2-PEG4-mTet) on the solid surface is at least 50 nm, at least 100 nm, at least 250 nm, or at least 500 nm. In some specific embodiments, the ratio of NH2-PEGn-mTet to mPEG3-NH2 is about or greater than 1:1000, about or greater than 1:10,000, about or greater than 1:100,000, or about or greater than 1:1,000,000. In some further embodiments, the recording tag attaches to the NH2-PEGn-mTet. In some embodiments, the spacing of the target molecules (e.g., macromolecules) on the support is achieved by controlling the concentration and/or number of available COOH or other functional groups on the support.

Binding Agent.

The methods described herein use a binding agent capable of binding to the target molecules (e.g., macromolecules, polypeptides). The binding reaction may be performed by contacting a single binding agent with a single target, a single binding agent with a plurality of targets, a plurality of binding agents with a single target, or a plurality of binding agents to a plurality of targets. In some embodiments, the plurality of binding agents includes a mixture of binding agents.

A binding agent can be any molecule (e.g., peptide, polypeptide, protein, nucleic acid, carbohydrate, small molecule, and the like) capable of binding to a component or feature of a polypeptide. A binding agent can be a naturally occurring, synthetically produced, or recombinantly expressed molecule. In some embodiments, the scaffold used to engineer a binding agent can be from any species, e.g., human, non-human, transgenic. A binding agent may bind to a portion of a target macromolecule or a motif. A binding agent may bind to a single monomer or subunit of a polypeptide (e.g., a single amino acid) or bind to multiple linked subunits of a polypeptide (e.g., dipeptide, tripeptide, or higher order peptide of a longer polypeptide molecule).

In some examples, the binding agent comprises an antibody, an antigen-binding antibody fragment, a single-domain antibody (sdAb), a recombinant heavy-chain-only antibody (VHH), a single-chain antibody (scFv), a shark-derived variable domain (vNARs), a Fv, a Fab, a Fab', a F(ab')2, a linear antibody, a diabody, an aptamer, a peptide mimetic molecule, a fusion protein, a reactive or non-reactive small molecule, or a synthetic molecule.

In certain embodiments, a binding agent may be designed to bind covalently. Covalent binding can be designed to be conditional or favored upon binding to the correct moiety. For example, an target and its cognate binding agent may each be modified with a reactive group such that once the target-specific binding agent is bound to the target, a coupling reaction is carried out to create a covalent linkage between the two. Non-specific binding of the binding agent to other locations that lack the cognate reactive group would not result in covalent attachment. In some embodiments, the target comprises a ligand that is capable of forming a covalent bond to a binding agent. In some embodiments, the target comprises a ligand group that is capable of covalent binding to a binding agent. Covalent binding between a binding agent and its target may allow for more stringent washing to be used to remove binding agents that are non-specifically bound, thus increasing the specificity of the assay. In some embodiment, the method further includes performing one or more wash steps. In some embodiments, the method includes a wash step after contacting the binding agent to the target to remove non-specifically bound binding agents. In some embodiments, the method includes a wash step after linking the stabilizing reagents and forming the stable complex. The stringency of the wash step may be tuned depending on the affinity of the binding agent to the target and/or the strength and stability of the complex formed.

In some embodiments, the binding reaction involves binding agents configured to provide specificity for binding of the binding agent to the target. A binding agent may bind to an N-terminal peptide, a C-terminal peptide, or an intervening peptide of a peptide, polypeptide, or protein molecule. A binding agent may bind to an N-terminal amino acid, C-terminal amino acid, or an intervening amino acid of a peptide molecule. A binding agent may preferably bind to a chemically modified or labeled amino acid. In certain embodiments, a binding agent may be a selective binding agent. As used herein, selective binding refers to the ability of the binding agent to preferentially bind to a specific ligand (e.g., amino acid or class of amino acids) relative to binding to a different ligand (e.g., amino acid or class of amino acids). Selectivity is commonly referred to as the equilibrium constant for the reaction of displacement of one ligand by another ligand in a complex with a binding agent. Typically, such selectivity is associated with the spatial geometry of the ligand and/or the manner and degree by which the ligand binds to a binding agent, such as by hydrogen bonding, hydrophobic binding, and Van der Waals forces (non-covalent interactions) or by reversible or non-reversible covalent attachment to the binding agent. It should also be understood that selectivity may be relative, and as opposed to absolute, and that different factors can affect the same, including ligand concentration. Thus, in one example, a binding agent selectively binds one of the twenty standard amino acids. In some examples, a binding agent binds to an N-terminal amino acid residue, a C-terminal amino acid residue, or an internal amino acid residue.

In some embodiments, the binding agent is partially specific or selective. In some aspects, the binding agent preferentially binds one or more amino acids. In some examples, a binding agent may bind to or is capable of binding to two or more of the twenty standard amino acids. For example, a binding agent may preferentially bind the amino acids A, C, and G over other amino acids. In some other examples, the binding agent may selectively or specifically bind more than one amino acid. In some aspects, the binding agent may also have a preference for one or more amino acids at the second, third, fourth, fifth, etc. positions from the terminal amino acid. In some cases, the binding agent preferentially binds to a specific terminal amino acid and a penultimate amino acid. For example, a binding agent may preferentially bind AA, AC, and AG or a binding agent may preferentially bind AA, CA, and GA. In some specific examples, binding agents with different specificities can share the same coding tag. In some embodiments, a binding agent may exhibit flexibility and variability in target binding preference in some or all of the positions of the targets. In some examples, a binding agent may have a preference for one or more specific target terminal amino acids and have a flexible preference for a target at the penultimate position. In some other examples, a binding agent may have a preference for one or more specific target amino acids in the penultimate amino acid position and have a flexible preference for a target at the terminal amino acid position. In some embodiments, a binding agent is selective for a target comprising a terminal amino acid and other components of a macromolecule. In some examples, a binding agent is selective for a target comprising a terminal amino acid and at least a portion of the peptide backbone. In some particular examples, a binding agent is selective for a target comprising a terminal amino acid and an amide peptide backbone. In some cases, the peptide backbone comprises a natural peptide backbone or a post-translational modification. In some embodiments, the binding agent exhibits allosteric binding.

In some embodiments, the binding reaction comprises contacting a mixture of binding agents with a mixture of targets and selectively need only be relative to the other binding agents to which the target is exposed. It should also be understood that selectivity of a binding agent need not be absolute to a specific molecule but could be to a portion of a molecule. In some examples, selectivity of a binding agent need not be absolute to a specific amino acid, but could be selective to a class of amino acids, such as amino acids with polar or non-polar side chains, or with electrically (positively or negatively) charged side chains, or with aromatic side chains, or some specific class or size of side chains, and the like. In some embodiments, the ability of a binding agent to selectively bind a feature or component of a macromolecule is characterized by comparing binding abilities of binding agents. For example, the binding ability of a binding agent to the target can be compared to the binding ability of a binding agent which binds to a different target, for example, comparing a binding agent selective for a class of amino acids to a binding agent selective for a different class of amino acids. In some examples, a binding agent selective for non-polar side chains is compared to a binding agent selective for polar side chains. In some embodiments, a binding agent selective for a feature, component of a peptide, or one or more amino acid exhibits at least 1×, at least 2×, at least 5×, at least 10×, at least 50×, at least 100×, or at least 500× more binding compared to a binding agent selective for a different feature, component of a peptide, or one or more amino acid. In certain embodiments, a binding agent may bind to a post-translational modification of an amino acid.

In a particular embodiment, the binding agent has a high affinity (binds specifically) and high selectivity for the macromolecule analyte, e.g., polypeptide analyte, of interest. In particular, a high binding affinity with a low off-rate may be efficacious for information transfer between the coding tag and recording tag. In certain embodiments, a binding agent has a Kd of about <500 nM, <200 nM, <100 nM, <50 nM, <10 nM, <5 nM, <1 nM, <0.5 nM, or <0.1 nM. In a particular embodiment, the binding agent is added to the polypeptide at a concentration >1×, >5×, >10×, >100×, or >1000× its Kd to drive binding to completion. For example, binding kinetics of an antibody to a single protein molecule is described in Chang et al., J Immunol Methods (2012) 378(1-2): 102-115. In a particular embodiment, the provided methods for performing a binding reaction is compatible with a binding agent with medium to low affinity for the target macromolecule.

In some embodiments, a binding agent may bind to a native or unmodified or unlabeled terminal amino acid. Moreover, in some cases, these natural amino acid binders don't recognize N-terminal labels. Directed evolution of aaRS scaffolds can be used to generate higher affinity, higher specificity binding agents that recognized the N-terminal amino acids in the context of an N-terminal label. In another example, Havranak et al. (U.S. Patent Publication No. US 2014/0273004) describes engineering aminoacyl tRNA synthetases (aaRSs) as specific NTAA binders. The amino acid binding pocket of the aaRSs has an intrinsic ability to bind cognate amino acids, but generally exhibits poor binding affinity and specificity. Moreover, these natural amino acid binders don't recognize N-terminal labels. Directed evolution of aaRS scaffolds can be used to generate higher affinity, higher specificity binding agents that recognized the N-terminal amino acids in the context of an N-terminal label.

In certain embodiments, a binding agent may bind to a modified or labeled terminal amino acid (e.g., an NTAA that has been functionalized or modified). In some embodiments, a binding agent may bind to a chemically or enzymatically modified terminal amino acid. A modified or labeled NTAA can be one that is functionalized with phenylisothiocyanate, PITC, 1-fluoro-2,4-dinitrobenzene (Sanger's reagent, DNFB), benzyloxycarbonyl chloride or carbobenzoxy chloride (Cbz-Cl), N-(Benzyloxycarbonyloxy)succinimide (Cbz-OSu or Cbz-O-NHS), dansyl chloride (DNS-Cl, or 1-dimethylaminonaphthalene-5-sulfonyl chloride), 4-sulfonyl-2-nitrofluorobenzene (SNFB), N-Acetyl-Isatoic Anhydride, Isatoic Anhydride, a guanidinylation reagent, a thioacetylation reagent, or a thiobenzylation reagent, or a diheterocyclic methanimine reagent. In some examples, the binding agent binds an amino acid labeled by contacting with a reagent or using a method as described in applications US 20200348307, WO 2020/223133 or WO 2020/198264. In some cases, the binding agent binds an amino acid labeled by an amine modifying reagent.

In certain embodiments, a binding agent can be an aptamer (e.g., peptide aptamer, DNA aptamer, or RNA aptamer), a peptoid, an antibody or a specific binding fragment thereof, an amino acid binding protein or enzyme, an antibody binding fragment, an antibody mimetic, a peptide, a peptidomimetic, a protein, or a polynucleotide (e.g., DNA, RNA, peptide nucleic acid (PNA), a gPNA, bridged nucleic acid (BNA), xeno nucleic acid (XNA), glycerol nucleic acid (GNA), or threose nucleic acid (TNA), or a variant thereof). Detailed descriptions of antibody and/or protein engineering, including relevant protocols, can be found in, among other places, J. Maynard and G. Georgiou, 2000, Ann. Rev. Biomed. Eng. 2:339-76; Antibody Engineering, R. Kontermann and S. Dubel, eds., Springer Lab Manual, Springer Verlag (2001); U.S. Pat. No. 5,831,012; and S. Paul, Antibody Engineering Protocols, Humana Press (1995). As with antibodies, nucleic acid and peptide aptamers that specifically recognize a macromolecule, e.g., polypeptide, can be produced using known methods. Aptamers bind target molecules in a highly specific, conformation-dependent manner, typically with very high affinity, although aptamers with lower binding affinity can be selected if desired. Aptamers have been shown to distinguish between targets based on very small structural differences such as the presence or absence of a methyl or hydroxyl group and certain aptamers can distinguish between D- and L-enantiomers. Aptamers have been shown to retain functional activity after biotinylation, fluorescein labeling, and when attached to glass surfaces and microspheres. (see, e.g., Jayasena, 1999, Clin Chem 45:1628-50; Kusser2000, J. Biotechnol. 74: 27-39; Colas, 2000, Curr Opin Chem Biol 4:54-9). Aptamers which specifically bind arginine and AMP have been described as well (see, Patel and Suri, 2000, J. Biotech. 74:39-60). Oligonucleotide aptamers that bind to a specific amino acid have been disclosed in Gold et al. (1995, Ann. Rev. Biochem. 64:763-97). RNA aptamers that bind amino acids have also been described (Ames and Breaker, 2011, RNA Biol. 8; 82-89; Mannironi et al., 2000, RNA 6:520-27; Famulok, 1994, J. Am. Chem. Soc. 116: 1698-1706).

A binding agent can be made by modifying naturally-occurring or synthetically-produced proteins by genetic engineering to introduce one or more mutations in the amino acid sequence to produce engineered proteins that bind to a specific component or feature of a polypeptide (e.g., NTAA, CTAA, or post-translationally modified amino acid or a peptide). In some embodiments, a binding agent that selectively binds to a labeled or functionalized NTAA can be utilized. For example, exopeptidases (e.g., aminopeptidases, carboxypeptidases), exoproteases, mutated exoproteases, mutated anticalins, mutated ClpSs, antibodies, or tRNA synthetases can be modified to create a binding agent that selectively binds to a particular NTAA. In another example, carboxypeptidases can be modified to create a binding agent that selectively binds to a particular CTAA. Strategies for directed evolution of proteins are known in the art (e.g., Yuan et al., 2005, Microbiol. Mol. Biol. Rev. 69:373-392), and include phage display, ribosomal display, mRNA display, CIS display, CAD display, emulsions, cell surface display method, yeast surface display, bacterial surface display, etc.

In yet another embodiment, a binding agent may be a modified aminopeptidase. In some embodiments, the binding agent may be a modified aminopeptidase that has been engineered to recognize the DNP-labeled NTAA providing cyclic control of aminopeptidase degradation of the peptide. Once the DNP-labeled NTAA is eliminated, another cycle of DNFB derivatization is performed in order to bind and eliminate the newly exposed NTAA. In preferred particular embodiment, the aminopeptidase is a monomeric metalloprotease, such an aminopeptidase activated by zinc (Calcagno et al., Appl Microbiol Biotechnol. (2016) 100(16): 7091-7102). In another example, a binding agent may selectively bind to an NTAA that is modified with sulfonyl nitrophenol (SNP), e.g., by using 4-sulfonyl-2-nitrofluorobenzene (SNFB). Other reagents that may be used to functionalize the NTAA include trifluoroethyl isothiocyanate, allyl isothiocyanate, and dimethylaminoazobenzene isothiocyanate, or a reagent as described in International Patent Publication No. WO 2019/089846. A binding agent may be engineered for high affinity for a modified NTAA, high specificity for a modified NTAA, or both.

In certain embodiments, the binding agent further comprises one or more detectable labels such as fluorescent labels, in addition to the binding moiety. In some embodiments, the binding agent does not comprise a polynucleotide such as a coding tag. Optionally, the binding agent comprises a synthetic or natural antibody. In some embodiments, the binding agent comprises an aptamer. In one embodiment, the detectable label is optically detectable. In some embodiments, the detectable label comprises a fluorescently moiety, a color-coded nanoparticle, a quantum dot or any combination thereof. In one embodiment the label comprises a polystyrene dye encompassing a core dye molecule such as a FluoSphere™, Nile Red, fluorescein, rhodamine, derivatized rhodamine dyes, such as TAMRA, phosphor, polymethadine dye, fluorescent phosphoramidite, TEXAS RED, green fluorescent protein, acridine, cyanine, cyanine 5 dye, cyanine 3 dye, 5-(2'-aminoethyl)-aminonaphthalene-1-sulfonic acid (EDANS), BODIPY, 120 ALEXA or a derivative or modification of any of the foregoing. In one embodiment, the detectable label is resistant to photobleaching while producing lots of signal (such as photons) at a unique and easily detectable wavelength, with high signal-to-noise ratio.

In a particular embodiment, anticalins are engineered for both high affinity and high specificity to labeled NTAAs (e.g. PTC, modified-PTC, Cbz, DNP, SNP, acetyl, guanidinyl, amino guanidinyl, heterocyclic methanimine, etc.). Certain varieties of anticalin scaffolds have suitable shape for binding single amino acids, by virtue of their beta barrel structure. An N-terminal amino acid (either with or without modification) can potentially fit and be recognized in this "beta barrel" bucket. High affinity anticalins with engineered novel binding activities have been described (reviewed by Skerra, 2008, FEBS J. 275: 2677-2683). For example, anticalins with high affinity binding (low nM) to fluorescein and digoxygenin have been engineered (Gebauer et al., 2012, Methods Enzymol 503: 157-188.). Engineering of alternative scaffolds for new binding functions has also been reviewed by Banta et al. (2013, Annu. Rev. Biomed. Eng. 15:93-113).

In some embodiments, the binding agent is derived from a biological, naturally occurring, non-naturally occurring, or synthetic source. In some examples, the binding agent is derived from de novo protein design (Huang et al., (2016) 537(7620):320-327).

In certain embodiments, a macromolecule, e.g., a polypeptide, is also contacted with a non-cognate binding agent. As used herein, a non-cognate binding agent is referring to a binding agent that is selective for a different target (e.g. polypeptide feature or component) than the particular target being considered. For example, if the n NTAA is phenylalanine, and the peptide is contacted with three binding agents selective for phenylalanine, tyrosine, and asparagine, respectively, the binding agent selective for phenylalanine would be first binding agent capable of selectively binding to the nth NTAA (i.e., phenylalanine), while the other two binding agents would be non-cognate binding agents for that peptide (since they are selective for NTAAs other than phenylalanine). The tyrosine and asparagine binding agents may, however, be cognate binding agents for other peptides in the sample. If the n NTAA (phenylalanine) was then cleaved from the peptide, thereby converting the n-1 amino acid of the peptide to the n-1 NTAA (e.g., tyrosine), and the peptide was then contacted with the same three binding agents, the binding agent selective for tyrosine would be second binding agent capable of selectively binding to the n-1 NTAA (i.e., tyrosine), while the other two binding agents would be non-cognate binding agents (since they are selective for NTAAs other than tyrosine).

Thus, it should be understood that whether an agent is a binding agent or a non-cognate binding agent will depend on the nature of the particular polypeptide feature or component currently available for binding. Also, if multiple polypeptides are analyzed in a multiplexed reaction, a binding agent for one polypeptide may be a non-cognate binding agent for another, and vice versa. According, it should be understood that the following description concerning binding agents is applicable to any type of binding agent described herein (i.e., both cognate and non-cognate binding agents).

In certain embodiments, the concentration of the binding agents in a solution is controlled to reduce background and/or false positive results of the assay. In some embodiments, the concentration of a binding agent can be at any suitable concentration, e.g., at about 0.0001 nM, about 0.001 nM, about 0.01 nM, about 0.1 nM, about 1 nM, about 5 nM, about 10 nM, about 50 nM, about 100 nM, about 500 nM, or about 1,000 nM. In some embodiments, the ratio between the soluble binding agent molecules and the immobilized macromolecule, e.g., polypeptides, can be at any suitable range, e.g., at about 0.00001:1, about 0.0001:1, about 0.001:1, about 0.01:1, about 0.1:1, about 1:1, about 2:1, about 5:1, about 10:1, about 50:1, about 100:1, about 104:1, about 105:1, about 106:1, or higher, or any ratio in between the above listed ratios. Higher ratios between the soluble binding agent molecules and the immobilized polypeptide(s) and/or the nucleic acids can be used to drive the binding and/or the coding tag information transfer to completion. This may be particularly useful for detecting and/or analyzing low abundance polypeptides in a sample.

Methods of Assaying Macromolecules

In some aspects or embodiments, the macromolecule analysis assay includes contacting the macromolecule with a binding agent capable of binding to the macromolecule, wherein the binding agent comprises a coding tag with identifying information regarding the binding agent; and transferring the information of the coding tag to a recording tag (associated with the target macromolecule) to generate an extended recording tag. In some further embodiments, transferring the information of the coding tag to the recording tag to extend the recording tag may be repeated one or more times. In some embodiments, the macromolecule analysis assay is a next generation protein assay (NGPA) using multiple binding agents and enzymatically-mediated sequential information transfer. In some cases, the analysis assay is performed on immobilized target molecules bound a cognate binding agent (e.g., antibody) and forming a stable complex, then transferring information from the coding tags of bound antibodies to the recording tag associated with the target. In some cases, the analysis assay is performed on immobilized target molecules bound by two or more cognate binding agents (e.g., antibodies). After a cognate antibody binding event, a combined primer extension and DNA nicking step is used to transfer information from the coding tags of bound antibodies to the recording tag. In some cases, polyclonal antibodies (or mixed population of monoclonal antibody) to multivalent epitopes on a protein can be used for the assay (see e.g., application WO 2017/192633). In some embodiments, the sequence (or a portion of the sequence thereof) and/or the identity of a target protein is determined using a polypeptide analysis assay. In some examples, the polypeptide analysis assay includes assessing at least a partial sequence or identity of the polypeptide using suitable techniques or procedures. For example, at least a partial sequence of the polypeptide can be assessed by N-terminal amino acid analysis or C-terminal amino acid analysis. In some embodiments, at least a partial sequence of the polypeptide can be assessed using a ProteoCode™ assay. In some examples, at least a partial sequence of the polypeptide can be assessed by the techniques or procedures disclosed and/or claimed in the published applications US 2019/0145982 A1, US 2020/0348308 A1 and US 2020/0348307 A1. In some embodiments, the method includes treating the target peptide with a reagent for modifying a terminal amino acid of the peptide. In some embodiments, the target peptide is contacted with the reagent for modifying a terminal amino acid before removing the terminal amino acid. In some embodiments, the method further includes removing the binding agent after transferring information from the coding tag to the recording tag. In some aspects or embodiments, removing the binding agent is performed after transferring information from the coding tag associated with the binding agent to the recording tag associated with the target. In some embodiments, the method further comprises transferring information of a coding tag associated with the binding agent to the recording tag associated with the target to generate an extended recording tag, thereby generating an extended recording tag. Methods of transferring information of a coding tag associated with the binding agent to the recording tag are disclosed in applications US 2019/0145982 A1, US 2020/0348308 A1, US 2020/0348307 A1, the contents of which are incorporated herein.

The polypeptide analysis may include one or more cycles of binding with additional binding agents to the terminal amino acid, transferring information from the additional binding agents to the extended nucleic acid thereby generating a higher order or a further extended recording tag containing information from two or more coding tags, and eliminating the terminal amino acid in a cyclic manner. Additional binding, transfer, labeling, and removal, can occur as described above up to n amino acids to generate an nth order extended nucleic acid, which collectively represent the peptide. In some embodiments, steps including the NTAA in the described exemplary approach can be performed instead with a C terminal amino acid (CTAA). In some embodiments, the order of the steps in the process for a degradation-based peptide or polypeptide sequencing assay can be reversed or be performed in various orders. For example, in some embodiments, the terminal amino acid labeling can be conducted before and/or after the polypeptide is bound to the binding agent. In some embodiments, contacting of the first binding agent and second binding agent to the target, and optionally any further binding agents (e.g., third binding agent, fourth binding agent, fifth binding agent, and so on), are performed at the same time. In a example, the first binding agent and second binding agent, and optionally any further order binding agents, can be first pooled together and added to the polypeptide, or can be added simultaneously to the polypeptide without prior pooling. In other embodiments, the first binding agent and second binding agent, and optionally any further order binding agents, are each contacted with the polypeptide in separate binding cycles, added in sequential order. In certain embodiments, multiple binding agents are used at the same time in parallel. This parallel approach saves time and reduces non-specific binding by non-cognate binding agents to a site that is bound by a cognate binding agent (because the binding agents are in competition).

The extended nucleic acid (e.g., recording tag) is any nucleic acid molecule or sequenceable polymer molecule (see, e.g., Niu et al., 2013, Nat. Chem. 5:282-292; Roy et al., 2015, Nat. Commun. 6:7237) that comprises identifying information for a macromolecule, e.g., a polypeptide. An extended nucleic acid associated with the macromolecule, e.g., polypeptide, with identifying information from the coding tag may comprise information from a binding agent's coding tag representing each binding cycle performed. However, in some cases, an extended nucleic acid may also experience a "missed" binding cycle, e.g., if a binding agent fails to bind to the polypeptide, because the coding tag was missing, damaged, or defective, because the primer extension reaction failed. Even if a binding event occurs, transfer of information from the coding tag may be incomplete or less than 100% accurate, e.g., because a coding tag was damaged or defective, because errors were introduced in the primer extension reaction). Thus, an extended nucleic acid may represent 100%, or up to 95%, 90%, 75%, 50%, 30%, or any subrange thereof, of binding events that have occurred on its associated polypeptide. Moreover, the coding tag information present in the extended nucleic acid may have at least 30%, 50%, 75%, 90%, 95%, or 100% identity the corresponding coding tags. In certain embodiments, an extended recording tag associated with the immobilized peptide may comprise information from multiple coding tags representing multiple, successive binding events. In these embodiments, a single, concatenated extended recording tag associated with the immobilized peptide can be representative of a single polypeptide. As referred to herein, transfer of coding tag information to the recording tag associated with the immobilized peptide also includes transfer to an extended recording tag as would occur in methods involving multiple, successive binding events.

Coding tag information associated with a specific binding agent may be transferred to a recording tag using a variety of methods. In certain embodiments, information of a coding tag is transferred to a recording tag via primer extension (Chan et al. (2015) Curr Opin Chem Biol 26: 55-61). A spacer sequence on the 3'-terminus of a recording tag or an extended recording tag anneals with complementary spacer sequence on the 3' terminus of a coding tag and a polymerase (e.g., strand-displacing polymerase) extends the recording tag sequence, using the annealed coding tag as a template. In some embodiments, oligonucleotides complementary to coding tag encoder sequence and 5' spacer can be pre-annealed to the coding tags to prevent hybridization of the coding tag to internal encoder and spacer sequences present in an extended recording tag. The 3' terminal spacer, on the coding tag, remaining single stranded, preferably binds to the terminal 3' spacer on the recording tag. In other embodiments, a nascent recording tag can be coated with a single stranded binding protein to prevent annealing of the coding tag to internal sites.

In some embodiments, a DNA polymerase that is used for primer extension possesses strand-displacement activity and has limited or is devoid of 3'-5 exonuclease activity. Several of many examples of such polymerases include Klenow exo- (Klenow fragment of DNA Pol 1), T4 DNA polymerase exo-, T7 DNA polymerase exo (Sequenase 2.0), Pfu exo-, Vent exo-, Deep Vent exo-, Bst DNA polymerase large fragment exo-, Bca Pol, 9° N Pol, and Phi29 Pol exo-. In a preferred embodiment, the DNA polymerase is active at room temperature and up to 45° C. In another embodiment, a "warm start" version of a thermophilic polymerase is employed such that the polymerase is activated and is used at about 40° C.-50° C. An exemplary warm start polymerase is Bst 2.0 Warm Start DNA Polymerase (New England Biolabs).

Mis-priming or self-priming events, such as when the terminal spacer sequence of the recording tag primes extension self-extension may be minimized by inclusion of single stranded binding proteins (T4 gene 32, *E. coli* SSB, etc.), DMSO (1-10%), formamide (1-10%), BSA(10-100 µg/ml), TMACl (1-5 mM), ammonium sulfate (10-50 mM), betaine (1-3 M), glycerol (5-40%), or ethylene glycol (5-40%), in the primer extension reaction.

Most type A polymerases are devoid of 3' exonuclease activity (endogenous or engineered removal), such as Klenow exo-, T7 DNA polymerase exo- (Sequenase 2.0), and Taq polymerase catalyzes non-templated addition of a nucleotide, preferably an adenosine base (to lesser degree a G base, dependent on sequence context) to the 3' blunt end of a duplex amplification product. For Taq polymerase, a 3' pyrimidine (C>T) minimizes non-templated adenosine addition, whereas a 3' purine nucleotide (G>A) favours non-templated adenosine addition. In some embodiments, using Taq polymerase for primer extension, placement of a thymidine base in the coding tag between the spacer sequence distal from the binding agent and the adjacent barcode sequence (e.g., encoder sequence or cycle specific sequence) accommodates the sporadic inclusion of a non-templated adenosine nucleotide on the 3' terminus of the spacer sequence of the recording tag. In this manner, the extended recording tag associated with the immobilized peptide (with or without a non-templated adenosine base) can anneal to the coding tag and undergo primer extension.

In some embodiments, polymerase extension buffers are comprised of 40-120 mM buffering agent such as Tris-Acetate, Tris-HCl or HEPES at a pH of 6-9.

In some embodiments, to minimize non-specific interaction of the coding tag labeled binding agents in solution with the nucleic acids of immobilized proteins, competitor (also referred to as blocking) oligonucleotides complementary to nucleic acids containing spacer sequences (e.g., on the recording tag) can be added to binding reactions to minimize non-specific interactions. In some embodiments, the blocking oligonucleotides contain a sequence that is complementary to the coding tag or a portion thereof attached to the binding agent. In some embodiments, blocking oligonucleotides are relatively short. Excess competitor oligonucleotides are washed from the binding reaction prior to primer extension, which effectively dissociates the annealed competitor oligonucleotides from the nucleic acids on the recording tag, especially when exposed to slightly elevated temperatures (e.g., 30-50° C.). Blocking oligonucleotides may comprise a terminator nucleotide at its 3' end to prevent primer extension.

In some embodiments, the transfer of identifying information (e.g., from a coding tag to a recording tag) can be accomplished by ligation (e.g., an enzymatic or chemical ligation, a splint ligation, a sticky end ligation, a single-strand (ss) ligation such as a ssDNA ligation, or any combination thereof), a polymerase-mediated reaction (e.g., primer extension of single-stranded nucleic acid or double-stranded nucleic acid), or any combination thereof. Examples of ligases include, but are not limited to CV DNA ligase, T4 DNA ligase, T7 DNA ligase, T3 DNA ligase, Taq DNA ligase, *E. coli* DNA ligase, 9° N DNA ligase, Electroligase® (See e.g., U.S. Patent Publication No. US20140378315). Alternatively, a ligation may be a chemical ligation reaction, such as chemical ligation using standard chemical ligation or "click chemistry" (Gunderson et al., Genome Res (1998) 8(11): 1142-1153; El-Sagheeret al., Proc Natl Acad Sci USA (2011) 108(28): 11338-11343; Sharma et al., Anal Chem (2012) 84(14): 6104-6109; Roloff et al., Methods Mol Biol (2014) 1050:131-141).

In another embodiment, transfer of PNAs can be accomplished with chemical ligation using published techniques. The structure of PNA is such that it has a 5' N-terminal amine group and an unreactive 3' C-terminal amide. Chemical ligation of PNA requires that the termini be modified to be chemically active. This is typically done by derivatizing the 5' N-terminus with a cysteinyl moiety and the 3' C-terminus with a thioester moiety. Such modified PNAs easily couple using standard native chemical ligation conditions (Roloff et al., (2013) Bioorgan. Med. Chem. 21:3458-3464).

In some embodiments, coding tag information can be transferred using topoisomerase. Topoisomerase can be used be used to ligate a topo-charged 3' phosphate on the recording tag (or extensions thereof or any nucleic acids attached) to the 5' end of the coding tag, or complement thereof (Shuman et al., 1994, J. Biol. Chem. 269:32678-32684).

In some examples, the final extended recording tag containing information from one or more binding agents is optionally flanked by universal priming sites to facilitate downstream amplification and/or DNA sequencing. The forward universal priming site (e.g., Illumina's P5-S1 sequence) can be part of the original design of the recording tag and the reverse universal priming site (e.g., Illumina's P7-S2' sequence) can be added as a final step in the extension of the nucleic acid. In some embodiments, the addition of forward and reverse priming sites can be done independently of a binding agent.

Recording Tag and Immobilization Methods

In some embodiments, the target macromolecule (e.g., protein or polypeptide) may be labeled with a nucleic acid molecule or a oligonucleotide (e.g., recording tag). In some aspects, a plurality of target macromolecules in the sample is provided with recording tags. The recording tags may be associated or attached, directly or indirectly to the target macromolecules using any suitable means. In some embodiments, a macromolecule may be associated with one or more recording tags. In some aspects, the recording tag may be any suitable sequenceable moiety to which identifying information can be transferred (e.g., information from one or more coding tags). In some embodiments, at least one recording tag is associated or co-localized directly or indirectly with the target macromolecule (e.g., polypeptide). In another embodiment, multiple recording tags are attached to the polypeptide, such as to the lysine residues or peptide backbone. In some embodiments, a polypeptide labeled with multiple recording tags is fragmented or digested into smaller peptides, with each peptide labeled on average with one recording tag. A recording tag may comprise DNA, RNA, or polynucleotide analogs including PNA, gPNA, GNA, HNA, BNA, XNA, TNA, or a combination thereof. A recording tag may be single stranded, or partially or completely double stranded. A recording tag may have a blunt end or overhanging end. In other embodiments, a subset of macromolecules within a sample are labeled with recording tags. In some embodiments, the recording tag may comprise a unique molecular identifier, a compartment tag, a partition barcode, sample barcode, a fraction barcode, a spacer sequence, a universal priming site, or any combination thereof. In some embodiments, the recording tag may comprise a blocking group, such as at the 3'-terminus of the recording tag. In some cases, the 3'-terminus of the recording tag is blocked to prevent extension of the recording tag by a polymerase.

In some embodiments, the recording tag can include a sample identifying barcode. A sample barcode is useful in the multiplexed analysis of a set of samples in a single reaction vessel or immobilized to a single solid substrate or collection of solid substrates. For example, macromolecules from many different samples can be labeled with recording tags with sample-specific barcodes, and then all the samples pooled together prior to immobilization to a support, cyclic binding of the binding agent, and recording tag analysis.

In certain embodiments, a recording tag comprises an optional unique molecular identifier (UMI), which provides a unique identifier tag for each macromolecules (e.g., polypeptide) to which the UMI is associated with. A UMI can be about 3 to about 40 bases, about 3 to about 20 bases, or about 3 to about 10 bases, or about 3 to about 8 bases in length. A UMI can be used to de-convolute sequencing data from a plurality of extended recording tags to identify sequence reads from individual macromolecules. In some embodiments, within a library of macromolecules, each macromolecule is associated with a single recording tag, with each recording tag comprising a unique UMI. In other embodiments, multiple copies of a recording tag are associated with a single macromolecule, with each copy of the recording tag comprising the same UMI.

In certain embodiments, a recording tag comprises a universal priming site, e.g., a forward or 5' universal priming site. A universal priming site is a nucleic acid sequence that may be used for priming a library amplification reaction and/or for sequencing. A universal priming site may include, but is not limited to, a priming site for PCR amplification, flow cell adaptor sequences that anneal to complementary oligonucleotides on flow cell surfaces (e.g., Illumina next generation sequencing), a sequencing priming site, or a combination thereof. A universal priming site can be about 10 bases to about 60 bases. In some embodiments, a universal priming site comprises an Illumina P5 primer (5'-AATGATACGGCGACCACCGA-3'—SEQ ID NO:1) or an Illumina P7 primer (5'-CAAGCAGAAGACGGCATACGAGAT—3'—SEQ ID NO:2).

In certain embodiments, a recording tag comprises a compartment tag. In some embodiments, the compartment tag is a component within a recording tag. In some embodiments, the recording tag can also include a barcode which represents a compartment tag in which a compartment, such as a droplet, microwell, physical region on a support, etc. is assigned a unique barcode. The association of a compartment with a specific barcode can be achieved in any number of ways such as by encapsulating a single barcoded bead in a compartment, e.g., by direct merging or adding a barcoded droplet to a compartment, by directly printing or injecting a barcode reagents to a compartment, etc. Applied to protein molecules partitioned into compartments, compartment-specific barcodes can be used to map analyzed peptides back to their originating protein molecules in the compartment.

In certain embodiments, a polypeptide macromolecule can be immobilized to a support by an affinity capture reagent (and optionally covalently crosslinked), wherein the recording tag is associated with the affinity capture reagent directly, or alternatively, the macromolecule can be directly immobilized to the support with a recording tag. In one embodiment, the macromolecule is attached to a bait nucleic acid which hybridizes to a capture nucleic acid and is ligated to a capture nucleic acid which comprises a reactive coupling moiety for attaching to the support. In some examples, the bait or capture nucleic acid may serve as a recording tag to which information regarding the polypeptide can be transferred. In some embodiments, the macromolecule is attached to a bait nucleic acid to form a nucleic acid-macromolecule chimera. In some embodiments, the immobilization methods comprise bringing the nucleic acid-macromolecule chimera into proximity with a support by hybridizing the bait nucleic acid to a capture nucleic acid attached to the support, and covalently coupling the nucleic acid-macromolecule chimera to the solid support. In some cases, the nucleic acid-macromolecule chimera is coupled indirectly to the solid support, such as via a linker. In some embodiments, a plurality of the nucleic acid-macromolecule chimeras is coupled on the solid support and any adjacently coupled nucleic acid-macromolecule chimeras are spaced apart from each other at an average distance of about 50 nm or greater.

In some embodiments, the density or number of macromolecules provided with a recording tag is controlled or titrated. In some examples, the desired spacing, density, and/or amount of recording tags in the sample may be titrated by providing a diluted or controlled number of recording tags. In some examples, the desired spacing, density, and/or amount of recording tags may be achieved by spiking a competitor or "dummy" competitor molecule when providing, associating, and/or attaching the recording tags. In some cases, the "dummy" competitor molecule reacts in the same way as a recording tag being associated or attached to a macromolecule in the sample but the competitor molecule does not function as a recording tag. In some specific examples, if a desired density is 1 functional recording tag per 1,000 available sites for attachment in the sample, then spiking in 1 functional recording tag for every 1,000 "dummy" competitor molecules is used to achieve the desired spacing. In some examples, the ratio of functional recording tags is adjusted based on the reaction rate of the functional recording tags compared to the reaction rate of the competitor molecules.

In some examples, the labeling of the macromolecule with a recording tag is performed using standard amine coupling chemistries. In a particular embodiment, the recording tag can comprise a reactive moiety (e.g., for conjugation to a solid surface, a multifunctional linker, or a macromolecule), a linker, a universal priming sequence, a barcode, an optional UMI, and a spacer (Sp) sequence for facilitating information transfer to/from a coding tag. In another embodiment, the protein is labeled with a universal DNA tag prior to proteinase digestion into peptides. The universal DNA tags on the labeled peptides from the digest can then be converted into an informative and effective recording tag. A universal DNA tag comprises a short sequence of nucleotides that are used to label a polypeptide macromolecule and can be used as point of attachment. For example, a recording tag may comprise at its terminus a sequence complementary to the universal DNA tag. In certain embodiments, a universal DNA tag is a universal priming sequence. Upon hybridization of the universal DNA tags on the labeled protein to complementary sequence in recording tags (e.g., bound to beads), the annealed universal DNA tag may be extended via primer extension, transferring the recording tag information to the DNA tagged protein.

The recording tags may comprise a reactive moiety for a cognate reactive moiety present on the target macromolecule, e.g., the target protein, (e.g., click chemistry labeling, photoaffinity labeling). For example, recording tags may comprise an azide moiety for interacting with alkyne-derivatized proteins, or recording tags may comprise a benzophenone for interacting with native proteins, etc. Upon binding of the target protein by the target protein specific binding agent, the recording tag and target protein are coupled via their corresponding reactive moieties. After the target protein is labeled with the recording tag, the target-protein specific binding agent may be removed by digestion of the DNA capture probe linked to the target-protein specific binding agent. For example, the DNA capture probe may be designed to contain uracil bases, which are then targeted for digestion with a uracil-specific excision reagent (e.g., USER™), and the target-protein specific binding agent may be dissociated from the target protein. In some embodiments, other types of linkages besides hybridization can be used to link the recording tag to a macromolecule. A suitable linker can be attached to various positions of the recording tag, such as the 3' end, at an internal position, or within the linker attached to the 5' end of the recording tag.

Coding Tag.

The coding tag associated with the binding agent is or comprises a polynucleotide with any suitable length, e.g., a nucleic acid molecule of about 3 bases to about 100 bases, that comprises identifying information for its associated binding agent. A coding tag may be composed of DNA, RNA, polynucleotide analogs, or a combination thereof. Polynucleotide analogs include PNA, gPNA, BNA, GNA, TNA, LNA, morpholino polynucleotides, 2'-O-Methyl polynucleotides, alkyl ribosyl substituted polynucleotides, phosphorothioate polynucleotides, and 7-deaza purine analogs. A coding tag may also be made from a "sequenceable polymer" (see, e.g., Niu et al., 2013, Nat. Chem. 5:282-292; Roy et al., 2015, Nat. Commun. 6:7237; Lutz, 2015, Macromolecules 48:4759-4767). A coding tag may comprise an encoder sequence or a sequence with identifying information, which is optionally flanked by one spacer on one side or optionally flanked by a spacer on each side. A coding tag may also be comprised of an optional UMI and/or an optional binding cycle-specific barcode. A coding tag may refer to the coding tag that is directly attached to a binding agent, or to a complementary sequence hybridized to the coding tag directly attached to a binding agent (e.g., for double stranded coding tags). In certain embodiments, a coding tag may further comprise a binding cycle specific spacer or barcode, a unique molecular identifier, a universal priming site, or any combination thereof. A coding tag may be a single stranded molecule, a double stranded molecule, or a partially double stranded. A coding tag may comprise blunt ends, overhanging ends, or one of each. In some embodiments, the coding tag may comprise a hairpin. In certain embodiments, the hairpin comprises mutually complementary nucleic acid regions are connected through a nucleic acid strand. In some embodiments, the nucleic acid hairpin can also further comprise 3' and/or 5' single-stranded region(s) extending from the double-stranded stem segment. In some examples, the hairpin comprises a single strand of nucleic acid.

In some embodiments, each unique binding agent within a library of binding agents has a unique encoder sequence. For example, 20 unique encoder sequences may be used for a library of 20 binding agents that bind to the 20 standard amino acids. In another example, 30 unique encoder sequences may be used for a library of 30 binding agents that bind to the 20 standard amino acids and 10 post-translational modified amino acids (e.g., phosphorylated amino acids, acetylated amino acids, methylated amino acids). In other embodiments, two or more different binding agents may share the same encoder sequence. For example, two binding agents that each bind to a different standard amino acid may share the same encoder sequence.

In certain embodiments, a coding tag further comprises a spacer sequence at one end or both ends. In certain embodiments, the spacer is binding agent-specific so that a spacer from a previous binding cycle only interacts with a spacer from the appropriate binding agent in a current binding cycle. An example would be pairs of cognate antibodies containing spacer sequences that only allow information transfer if both antibodies sequentially bind to the polypeptide. A spacer sequence may be used as the primer annealing site for a primer extension reaction, or a splint or sticky end in a ligation reaction. In other embodiments, the coding tags within a library of binding agents do not have a binding cycle-specific spacer sequence. A cycle-specific spacer sequence can also be used to concatenate information of coding tags onto a single recording tag when a population of recording tags is associated with a polypeptide. The first binding cycle transfers information from the coding tag to a randomly-chosen recording tag, and subsequent binding cycles can prime only the extended recording tag using cycle-dependent spacer sequences.

A coding tag may include a terminator nucleotide incorporated at the 3' end of the 3' spacer sequence. After a binding agent binds to a polypeptide and their corresponding coding tag and recording tags anneal via complementary spacer sequences, it is possible for primer extension to transfer information from the coding tag to the recording tag, or to transfer information from the recording tag to the coding tag. Addition of a terminator nucleotide on the 3' end of the coding tag prevents transfer of recording tag information to the coding tag. It is understood that for embodiments described herein involving generation of extended coding tags, it may be preferable to include a terminator nucleotide at the 3' end of the recording tag to prevent transfer of coding tag information to the recording tag.

In some embodiments, the coding tag sequence can be optimized for the particular sequencing analysis platform. In a particular embodiment, the sequencing platform is nanopore sequencing. In some embodiments, the sequencing platform has a per base error rate of >1%, >5%, >10%, >15%, >20%, >25%, or >30%. For example, if the extended nucleic acid is to be analyzed using a nanopore sequencing instrument, the barcode sequences (e.g., sequences comprising identifying information from the coding tag) can be designed to be optimally electrically distinguishable in transit through a nanopore.

A coding tag can be joined to a binding agent directly or indirectly, by any means known in the art, including covalent and non-covalent interactions. In some embodiments, a coding tag may be joined to binding agent enzymatically or chemically. In some embodiments, a coding tag may be joined to a binding agent via ligation. In some cases, a coding tag may be joined to a binding agent to an unnatural amino acid, such as via a covalent interaction with an unnatural amino acid. In some embodiments, a binding agent is joined to a coding tag via SpyCatcher-SpyTag interaction. The SpyTag peptide forms an irreversible covalent bond to the SpyCatcher protein via a spontaneous isopeptide linkage, thereby offering a genetically encoded way to create peptide interactions that resist force and harsh conditions (Zakeri et al., 2012, Proc. Natl. Acad. Sci. 109: E690-697; Li et al., 2014, J. Mol. Biol. 426:309-317). A binding agent may be expressed as a fusion protein comprising the SpyCatcher protein.

In other embodiments, a binding agent is joined to a coding tag via SnoopTag-SnoopCatcher peptide-protein interaction. The SnoopTag peptide forms an isopeptide bond with the SnoopCatcher protein (Veggiani et al., Proc. Natl. Acad. Sci. USA, 2016, 113:1202-1207). A binding agent may be expressed as a fusion protein comprising the Snoop-Catcher protein. In yet other embodiments, a binding agent is joined to a coding tag via the HaloTag® protein fusion tag and its chemical ligand. HaloTag is a modified haloalkane dehalogenase designed to covalently bind to synthetic ligands (HaloTag ligands) (Los et al., 2008, ACS Chem. Biol. 3:373-382). The synthetic ligands comprise a chloroalkane linker attached to a variety of useful molecules. A covalent bond forms between the HaloTag and the chloroalkane linker that is highly specific, occurs rapidly under physiological conditions, and is essentially irreversible.

In some embodiments, a binding agent is joined to a coding tag using a cysteine bioconjugation method. In some embodiments, a binding agent is joined to a coding tag using π-clamp-mediated cysteine bioconjugation (See e.g., Zhang et al., Nat Chem. (2016) 8(2):120-128). In some cases, a binding agent is joined to a coding tag using 3-arylpropiolonitriles (APN)-mediated tagging (e.g. Koniev et al., Bioconjug Chem. 2014; 25(2):202-206).

In certain embodiments, a coding tag may further comprise a unique molecular identifier for the binding agent to which the coding tag is linked. A UMI for the binding agent may be useful in embodiments utilizing extended coding tags for sequencing readouts, which in combination with the encoder sequence provides information regarding the identity of the binding agent and number of unique binding events for a polypeptide.

Amino Acid Cleavage

In embodiments relating to methods of analyzing target peptides or polypeptides using a degradation based approach, following contacting and binding of a first binding agent to an n NTAA of a peptide of n amino acids, and transferring of the first binding agent's coding tag information to a nucleic acid associated with the peptide, thereby generating a first order extended nucleic acid (e.g., on the recording tag), the n NTAA is removed. Removal of the n labeled NTAA by contacting with an enzyme or chemical reagents converts the n-1 amino acid of the peptide to an N-terminal amino acid, which is referred to herein as an n-1 NTAA. A second binding agent is contacted with the peptide and binds to the n-1 NTAA, and the second binding agent's coding tag information is transferred to the first order extended nucleic acid thereby generating a second order extended nucleic acid (e.g., for generating a concatenated nth order extended nucleic acid representing the peptide). Removal of the n-1 labeled NTAA converts the n-2 amino acid of the peptide to an N-terminal amino acid, which is referred to herein as n-2 NTAA. Additional binding, transfer, labeling, and removal, can occur as described above up to n amino acids to generate an nth order extended nucleic acid or n separate extended nucleic acids, which collectively represent the peptide. As used herein, an n "order" when used in reference to a binding agent, coding tag, or extended nucleic acid, refers to the n binding cycle, wherein the binding agent and its associated coding tag is used or the n binding cycle where the extended nucleic acid is created (e.g. on recording tag). In some embodiments, steps including the NTAA in the described exemplary approach can be performed instead with a C terminal amino acid (CTAA).

In certain embodiments relating to analyzing peptides, following binding of a terminal amino acid (N-terminal or C-terminal) by a binding agent and transfer of coding tag information, the terminal amino acid is removed or cleaved from the peptide to expose a new terminal amino acid. In some embodiments, the terminal amino acid is an NTAA. In other embodiments, the terminal amino acid is a CTAA. Cleavage of a terminal amino acid can be accomplished by any number of known techniques, including chemical cleavage and enzymatic cleavage. In some embodiments, an engineered enzyme that catalyzes or reagent that promotes the removal of the PITC-derivatized or other labeled N-terminal amino acid is used. In some embodiments, the terminal amino acid is removed or cleaved using mild Edman-like methods described, for example in US 20200348307 A1 or WO 2020223133 A1. Alternatively, the terminal amino acid of the polypeptide is cleaved off enzymatically by engineered cleavases described, for example in WO 2020198264 A1. In some embodiments, cleavage of a terminal amino uses a carboxypeptidase, an aminopeptidase, a dipeptidyl peptidase, a dipeptidyl aminopeptidase or a variant, mutant, or modified protein thereof; a hydrolase or a variant, mutant, or modified protein thereof; a mild Edman degradation reagent; an Edmanase enzyme; anhydrous TFA, a base; or any combination thereof. In some embodiments, the mild Edman degradation uses a dichloro or monochloro acid; the mild Edman degradation uses TFA, TCA, or DCA; or the mild Edman degradation uses triethylamine, triethanolamine, or triethylammonium acetate (Et3NHOAc).

In some cases, the reagent for removing the amino acid comprises a base. In some embodiments, the base is a hydroxide, an alkylated amine, a cyclic amine, a carbonate buffer, trisodium phosphate buffer, or a metal salt. In some examples, the hydroxide is sodium hydroxide; the alkylated amine is selected from methylamine, ethylamine, propylamine, dimethylamine, diethylamine, dipropylamine, trimethylamine, triethylamine, tripropylamine, cyclohexylamine, benzylamine, aniline, diphenylamine, N,N-Diisopropylethylamine (DIPEA), and lithium diisopropylamide (LDA); the cyclic amine is selected from pyridine, pyrimidine, imidazole, pyrrole, indole, piperidine, prolidine, 1,8-diazabicyclo[5.4.0]undec-7-ene (DBU), and 1,5-diazabicyclo[4.3.0]non-5-ene (DBN); the metal salt comprises silver; or the metal salt is AgClO4.

Enzymatic cleavage of a NTAA may be accomplished by an aminopeptidase or other peptidases. Natural aminopeptidases have very limited specificity, and generically cleave N-terminal amino acids in a processive manner, cleaving one amino acid off after another. For the methods described here, aminopeptidases (e.g., metalloenzymatic aminopeptidase) may be engineered to possess specific binding or catalytic activity to the NTAA only when modified with an N-terminal label. For example, an aminopeptidase may be engineered such than it only cleaves an N-terminal amino acid if it is modified by a group such as PTC, modified-PTC, Cbz, DNP, SNP, acetyl, guanidinyl, diheterocyclic methanimine, etc. In this way, the aminopeptidase cleaves only a single amino acid at a time from the N-terminus, and allows control of the degradation cycle. In some embodiments, the modified aminopeptidase is non-selective as to amino acid residue identity while being selective for the N-terminal label. In other embodiments, the modified aminopeptidase is selective for both amino acid residue identity and the N-terminal label. Engineered aminopeptidase mutants that bind to and cleave individual or small groups of labelled (biotinylated) NTAAs have been described (see, PCT Publication No. WO2010/065322). In certain embodiments, the aminopeptidase may be engineered to be non-specific, such that it does not selectively recognize one particular amino acid over another, but rather just recognizes the labeled N-terminus. In yet another embodiment, cyclic cleavage is attained by using an engineered acylpeptide hydrolase (APH) to cleave an acetylated NTAA. In yet another embodiment, amidination (guanidinylation) of the NTAA is employed to enable mild cleavage of the labeled NTAA using NaOH (Hamada, (2016) Bioorg Med Chem Lett 26(7): 1690-1695).

In some embodiments, the method further comprises contacting the polypeptide with a proline aminopeptidase under conditions suitable to cleave an N-terminal proline before step (b). In some examples, a proline aminopeptidase (PAP) is an enzyme that is capable of specifically cleaving an N-terminal proline from a polypeptide. PAP enzymes that cleave N-terminal prolines are also referred to as proline iminopeptidases (PIPs). Known monomeric PAPs include family members from *B. coagulans, L. delbrueckii, N. gonorrhoeae, F. meningosepticum, S. marcescens, T. acidophilum, L. plantarum* (MEROPS 533.001) Nakajima et al., J Bacteriol. (2006) 188(4):1599-606; Kitazono et al., Bacteriol (1992) 174(24):7919-7925). Known multimeric PAPs including *D. hansenii* (Bolumar et al., (2003) 86(1-2):141-151) and similar homologues from other species (Basten et al., Mol Genet Genomics (2005) 272(6):673-679). Either native or engineered variants/mutants of PAPs may be employed.

For embodiments relating to CTAA binding agents, methods of cleaving CTAA from peptides are also known in the art. For example, U.S. Pat. No. 6,046,053 discloses a method of reacting the peptide or protein with an alkyl acid anhydride to convert the carboxy-terminal into oxazolone, liberating the C-terminal amino acid by reaction with acid and alcohol or with ester. Enzymatic cleavage of a CTAA may also be accomplished by a carboxypeptidase. Several carboxypeptidases exhibit amino acid preferences, e.g., carboxypeptidase B preferentially cleaves at basic amino acids, such as arginine and lysine. As described above, carboxypeptidases may also be modified in the same fashion as aminopeptidases to engineer carboxypeptidases that specifically bind to CTAAs having a C-terminal label. In this way, the carboxypeptidase cleaves only a single amino acid at a time from the C-terminus, and allows control of the degradation cycle. In some embodiments, the modified carboxypeptidase is non-selective as to amino acid residue identity while being selective for the C-terminal label. In other embodiments, the modified carboxypeptidase is selective for both amino acid residue identity and the C-terminal label.

Analysis after Information Transfer.

In some embodiments, the extended recording tag generated from performing the provided methods comprises information transferred from one or more coding tags. In some embodiments, the extended recording tags further comprise identifying information from one or more coding tags. In some embodiments, the extended recording tags are amplified (or a portion thereof) prior to determining at least the sequence of the coding tag(s) in the extended recording tag. In some embodiments, the extended recording tags (or a portion thereof) are released prior to determining at least the sequence of the coding tag(s) in the extended recording tag.

The length of the final extended recording tag generated by the methods described herein is dependent upon multiple factors, including the length of the coding tag(s) (e.g., barcode and spacer), and optionally including any unique molecular identifier, spacer, universal priming site, barcode, or combinations thereof. After transfer of the final tag information to the extended nucleic acid (e.g., from any coding tags), the tag can be capped by addition of a universal reverse priming site via ligation, primer extension or other methods known in the art. In some embodiments, the universal forward priming site in the nucleic acid (e.g., on the recording tag) is compatible with the universal reverse priming site that is appended to the final extended nucleic acid. In some embodiments, a universal reverse priming site is an Illumina P7 primer (5'-CAAGCAGAAGACGGCATACGAGAT—3'—SEQ ID NO:2) or an Illumina P5 primer (5'-AATGATACGGCGACCACCGA-3'—SEQ ID NO:1). The sense or antisense P7 may be appended, depending on strand sense of the nucleic acid to which the identifying information from the coding tag is transferred to. An extended nucleic acid library can be cleaved or amplified directly from the support (e.g., beads) and used in traditional next generation sequencing assays and protocols.

In some embodiments, a primer extension reaction is performed on a library of single stranded extended nucleic acids (e.g., extended on the recording tag) to copy complementary strands thereof. In some embodiments, the peptide sequencing assay (e.g., ProteoCode™ assay), comprises several chemical and enzymatic steps in a cyclical progression.

Extended nucleic acids recording tags can be processed and analysed using a variety of nucleic acid sequencing methods. In some embodiments, extended recording tags containing the information from one or more coding tags and any other nucleic acid components are processed and analysed. In some embodiments, the collection of extended recording tags can be concatenated. In some embodiments, the extended recording tag can be amplified prior to determining the sequence.

Examples of sequencing methods include, but are not limited to, chain termination sequencing (Sanger sequencing); next generation sequencing methods, such as sequencing by synthesis, sequencing by ligation, sequencing by hybridization, polony sequencing, ion semiconductor sequencing, and pyrosequencing; and third generation sequencing methods, such as single molecule real time sequencing, nanopore-based sequencing, duplex interrupted sequencing, and direct imaging of DNA using advanced microscopy.

Suitable sequencing methods for use in the invention include, but are not limited to, sequencing by hybridization, sequencing by synthesis technology (e.g., HiSeq™ and Solexa™, Illumina), SMRT™ (Single Molecule Real Time) technology (Pacific Biosciences), true single molecule sequencing (e.g., HeliScope™, Helicos Biosciences), massively parallel next generation sequencing (e.g., SOLiD™, Applied Biosciences; Solexa and HiSeq™, Illumina), massively parallel semiconductor sequencing (e.g., Ion Torrent), pyrosequencing technology (e.g., GS FLX and GS Junior Systems, Roche/454), nanopore sequence (e.g., Oxford Nanopore Technologies).

A library of nucleic acids (e.g., extended nucleic acids) may be amplified in a variety of ways. A library of nucleic acids (e.g., recording tags comprising information from one or more coding tags) undergo exponential amplification, e.g., via PCR or emulsion PCR. Emulsion PCR is known to produce more uniform amplification (Hori, Fukano et al., Biochem Biophys Res Commun (2007) 352(2): 323-328). Alternatively, a library of nucleic acids (e.g., extended nucleic acids) may undergo linear amplification, e.g., via in vitro transcription of template DNA using T7 RNA polymerase. The library of nucleic acids (e.g., extended nucleic acids) can be amplified using primers compatible with the universal forward priming site and universal reverse priming site contained therein. A library of nucleic acids (e.g., the recording tag) can also be amplified using tailed primers to add sequence to either the 5'-end, 3'-end or both ends of the extended nucleic acids. Sequences that can be added to the termini of the extended nucleic acids include library specific index sequences to allow multiplexing of multiple libraries in a single sequencing run, adaptor sequences, read primer sequences, or any other sequences for making the library of extended nucleic acids compatible for a sequencing platform. An example of a library amplification in preparation for next generation sequencing is as follows: a 20 µl PCR reaction volume is set up using an extended nucleic acid library eluted from ~1 mg of beads (~10 ng), 200 µM dNTP, 1 µM of each forward and reverse amplification primers, 0.5 µl (1 U) of Phusion Hot Start enzyme (New England Biolabs) and subjected to the following cycling conditions: 98° C. for 30 sec followed by 20 cycles of 98° C. for 10 sec, 60° C. for 30 sec, 72° C. for 30 sec, followed by 72° C. for 7 min, then hold at 4° C.

In certain embodiments, either before, during or following amplification, the library of nucleic acids (e.g., extended nucleic acids) can undergo target enrichment. In some embodiments, target enrichment can be used to selectively capture or amplify extended nucleic acids representing macromolecules (e.g., polypeptides) of interest from a library of extended nucleic acids before sequencing. Methods of targeted enrichment are known in the art, and include hybrid capture assays, PCR-based assays such as TruSeq custom Amplicon (Illumina), padlock probes, and the like (see, Mamanova et al., (2010) Nature Methods 7: 111-118; Bodi et al., J. Biomol. Tech. (2013) 24:73-86; Ballester et al., (2016) Expert Review of Molecular Diagnostics 357-372). In another embodiment, primer extension and ligation-based mediated amplification enrichment (AmpliSeq, PCR, TruSeq TSCA, etc.) can be used to select and module fraction enriched of library elements representing a subset of polypeptides. Competing oligonucleotides can also be employed to tune the degree of primer extension, ligation, or amplification. Targeted enrichment methods can also be used in a negative selection mode to selectively remove extended nucleic acids from a library before sequencing. Examples of undesirable extended nucleic acids that can be removed are those representing over abundant polypeptide species, e.g., for proteins, albumin, immunoglobulins, etc. Additionally, any combination of fractionation, enrichment, and subtraction methods, of the polypeptides before attachment to the support and/or of the resulting extended nucleic acid library can economize sequencing reads and improve measurement of low abundance species.

In some embodiments, a library of nucleic acids (e.g., extended nucleic acids) is concatenated by ligation or end-complementary PCR to create a long DNA molecule comprising multiple different extended recorder tags or extended coding tags, respectively (Du et al., (2003) BioTechniques 35:66-72; Muecke et al., (2008) Structure 16:837-841; U.S. Pat. No. 5,834,252). This embodiment is preferable for nanopore sequencing in which long strands of DNA are analyzed by the nanopore sequencing device. In some embodiments, direct single molecule analysis is performed on the nucleic acids (e.g., extended nucleic acids) (see, e.g., Harris et al., (2008) Science 320:106-109). The nucleic acids (e.g., extended nucleic acids) can be analysed directly on the support, such as a flow cell or beads that are compatible for loading onto a flow cell surface (optionally microcell patterned), wherein the flow cell or beads can integrate with a single molecule sequencer or a single molecule decoding instrument. For single molecule decoding, hybridization of several rounds of pooled fluorescently-labelled decoding oligonucleotides (Gunderson et al., (2004) Genome Res. 14:970-7) can be used to ascertain both the identity and order of the coding tags within the extended nucleic acids (e.g., on the recording tag). Following sequencing of the nucleic acid libraries (e.g., of extended nucleic acids), the resulting sequences can be collapsed by their UMIs if used and then associated to their corresponding polypeptides and aligned to the totality of the proteome. Resulting sequences can also be collapsed by their compartment tags and associated to their corresponding compartmental proteome, which in a particular embodiment contains only a single or a very limited number of protein molecules. Both protein identification and quantification can easily be derived from this digital peptide information.

The methods disclosed herein can be used for analysis, including detection, quantitation and/or sequencing, of a plurality of macromolecules simultaneously (multiplexing). Multiplexing as used herein refers to analysis of a plurality of macromolecules (e.g. polypeptides) in the same assay. The plurality of macromolecules can be derived from the same sample or different samples. The plurality of macromolecules can be derived from the same subject or different subjects. The plurality of macromolecules that are analyzed can be different macromolecules, or the same macromolecule derived from different samples. A plurality of macromolecules includes 2 or more macromolecules, 10 or more macromolecules, 50 or more macromolecules, 100 or more macromolecules, 1,000 or more macromolecules, 5,000 or more macromolecules, 10,000 or more macromolecules, 100,000 or more macromolecules, or 1,000,000 or more macromolecules.

Methods for Analyzing a Macromolecule Analyte.

Provided herein is a method for analyzing a macromolecule, comprising the steps of: (a) providing a macromolecule and an associated nucleic acid recording tag joined to a solid support; (b) contacting the macromolecule with a first binding agent capable of binding to the macromolecule, wherein the first binding agent comprises a first nucleic acid coding tag with identifying information regarding the first binding agent;

(c) transferring identifying information regarding the first binding agent from the first nucleic acid coding tag to the nucleic acid recording tag to generate a first order extended nucleic acid recording tag, wherein a process of transferring information comprises a primer extension reaction performed using a DNA polymerase having 5'-to-3' polymerization activity and having substantially reduced 3'-to-5' exonuclease activity, and wherein the primer extension reaction is performed under conditions to reduce or prevent template independent nucleotide addition by the polymerase during the primer extension reaction;

(d) repeating steps (b) and (c) one or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and (e) analyzing extended nucleic acid recording tag obtained after extension reactions of step (d) by a nucleic acid sequencing method to obtain the identifying information regarding the first binding agent and the identifying information regarding the second or higher order binding agent, thereby analyzing the macromolecule analyte.

In preferred embodiments of the provided methods, contacting the macromolecule with the first, second, third or higher order binding agent results in binding of the binding agent to a component of the macromolecule. The cognate binding agent can bind specifically to either unmodified component of the macromolecule or modified component of the macromolecule. For example, a component of the macromolecule is modified with a modifier agent, and the cognate binding agent has binding affinity to the modified component of the macromolecule.

In the present invention, the nucleic acid recording tag associated with the macromolecule is an element of the disclosed analytical assay and is not a component of the macromolecule. Thus, binding agents of the present invention do not bind to the nucleic acid recording tag(s).

In preferred embodiments, providing a macromolecule and an associated nucleic acid recording tag joined to a solid support includes providing the nucleic acid recording tag joined to the solid support and associated with the macromolecule. Various configurations of association between the nucleic acid recording tag and the macromolecule are possible and permitted, including, without limitation, direct association (direct attachment), indirect association (attachment through a linker), special co-localization which permits information transfer to the associated nucleic acid recording tag upon binding of a binding agent to the macromolecule. Likewise, various configurations of joining to the solid support are possible and permitted, including, without limitation, direct and indirect attachment.

In some embodiments of the method, the transfer of identifying information (step (c)) comprises steps of: (c1) generating a double stranded extended recording tag by (i) joining at least one end of the recording tag to an end of the coding tag by a nucleic acid joining reagent, and (ii) extending the recording tag using the coding tag as a template by a DNA polymerase having 5'-to-3' polymerization activity and having substantially reduced 3'-to-5' exonuclease activity; and (c2) cleaving the double stranded extended recording tag with a double strand nucleic acid cleaving reagent to generate a truncated extended recording tag (first order extended nucleic acid recording tag).

In some embodiments of the method, the double stranded extended recording tag comprises a recognition sequence capable of being recognized by the double strand nucleic acid cleaving reagent. In some embodiments, cleaving the double stranded extended recording tag with the double strand nucleic acid cleaving reagent generates a 3' overhang in the extended recording tag. The 3' overhang of the first order extended nucleic acid recording tag generated by the double strand nucleic acid cleaving reagent is available to hybridize with a second coding tag when the binding step is repeated. In some embodiments, the double strand nucleic acid cleaving reagent is a type IIS restriction enzyme.

Provided herein is also a method for analyzing a macromolecule analyte, comprising the steps of:
(a) providing the macromolecule analyte and an associated nucleic acid recording tag joined to a solid support;
(b) contacting the macromolecule analyte with a first binding agent capable of binding to the macromolecule analyte, wherein the first binding agent comprises or is configured to be associated with a first nucleic acid coding tag that comprises identifying information regarding the first binding agent, to allow binding between the macromolecule analyte and the first binding agent;
(c) generating a double stranded extended recording tag associated with the macromolecule analyte by (i) joining at least one end of the nucleic acid recording tag to an end of the first nucleic acid coding tag by a nucleic acid joining reagent, and (ii) extending the nucleic acid recording tag using the first nucleic acid coding tag as a template by a DNA polymerase by a primer extension reaction, and cleaving the double stranded extended recording tag with a double strand nucleic acid cleaving reagent to generate a first order truncated extended recording tag, wherein the DNA polymerase has a 5'-to-3' polymerization activity and has a substantially reduced 3'-to-5' exonuclease activity, and wherein the primer extension reaction is performed under conditions to reduce or prevent template independent nucleotide addition by the DNA polymerase during the primer extension reaction;
whereby the identifying information regarding the first binding agent is transferred from the first nucleic acid coding tag to the first order truncated extended recording tag, and is present in the first order truncated extended recording tag;
(d) repeating steps (b) and (c) one or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; by generating a second or higher order double stranded extended recording tag, and by cleaving the second or higher order double stranded extended recording tag to generate a second or higher order truncated extended recording tag; and
(e) analyzing the second or higher order truncated extended recording tag obtained after extension reactions of step (d) by a nucleic acid sequencing method to obtain the identifying information regarding the first binding agent and the identifying information regarding the second or higher order binding agent, thereby analyzing the macromolecule analyte.

In some embodiments of the disclosed methods, step (a) comprises providing a plurality of macromolecules and associated nucleic acid recording tags joined to the solid support; and each of steps (b) and (d) comprises contacting the plurality of macromolecules with a first or higher order plurality of binding agents capable of binding to the macromolecules, wherein the first or higher order plurality of binding agents comprise a first or higher order nucleic acid coding tag(s) with identifying information regarding the first or higher order plurality of binding agents.

In some embodiments of the disclosed methods, providing the macromolecule and an associated recording tag joined to a solid support comprises the following steps: attaching the macromolecule to the recording tag to generate a nucleic acid-macromolecule conjugate; bringing the nucleic acid-macromolecule conjugate into proximity with a solid support by hybridizing the recording tag in the nucleic acid-macromolecule conjugate to a capture nucleic acid attached to the solid support; and covalently coupling the nucleic acid-macromolecule conjugate to the solid support.

In some embodiments of the disclosed methods, providing the macromolecule and an associated recording tag joined to a solid support further comprises attaching the macromolecule analyte to the nucleic acid recording tag optionally joined to the solid support.

In some embodiments of the method, the plurality of macromolecules are spaced apart on the solid support at an average distance >50 nm, e.g., the adjacent macromolecules are spaced apart on the solid support at an average distance >50 nm.

In some embodiments of the disclosed methods, during step (d) steps (b) and (c) are repeated two or more times. In some embodiments of the method, during step (d) steps (b) and (c) are repeated three or more times. In some embodiments of the method, during step (d) steps (b) and (c) are repeated four times or more. In some embodiments of the method, during step (d) steps (b) and (c) are repeated four or more times. In some embodiments of the method, during step (d) steps (b) and (c) are repeated nine or more times.

In some embodiments of the disclosed methods, the macromolecule is a polypeptide. In some preferred embodiments, the method further comprises modifying the N-terminal amino acid (NTAA) of the polypeptide with a chemical moiety to produce a modified NTAA.

In some embodiments of the disclosed methods, the first or higher order binding agent is capable of binding to the modified NTAA.

In some embodiments, the methods further comprise removing the modified NTAA to expose a new NTAA of the polypeptide.

In some embodiments of the disclosed methods, the extended nucleic acid recording tag obtained after extension reactions of step (d) is amplified prior to analysis.

In some embodiments of the disclosed methods, the DNA polymerase is an engineered DNA polymerase having a reduced template independent nucleotide addition ability during the primer extension reaction. Some examples of such engineered DNA polymerases are disclosed in U.S. Pat. No. 7,501,237 B2.

In some embodiments of the disclosed methods, the engineered DNA polymerase comprises an amino acid sequence having at least 90% sequence identity to the amino acid sequence of SEQ ID NO: 7, and having a substitution in amino acid residue corresponding to position R754 of SEQ ID NO: 7, and wherein the engineered DNA polymerase has a template independent nucleotide addition ability reduced by at least 50% in comparison with a DNA polymerase having an amino acid sequence set forth in SEQ ID NO: 7. In preferred embodiments, yield of template independent nucleotide addition of this engineered DNA polymerase is 10% or less.

In some embodiments of the disclosed methods, the engineered DNA polymerase comprises an amino acid sequence having at least 90% sequence identity to the amino acid sequence of SEQ ID NO: 35, and having a substitution in amino acid residue corresponding to position R518 of SEQ ID NO: 35, and wherein the engineered DNA polymerase has a template independent nucleotide addition ability reduced by at least 50% in comparison with a DNA polymerase having an amino acid sequence set forth in SEQ ID NO: 35. In preferred embodiments, yield of template independent nucleotide addition of this engineered DNA polymerase is 10% or less.

In some embodiments of the disclosed methods, the engineered DNA polymerase comprises an amino acid sequence having at least 90% sequence identity to the amino acid sequence of SEQ ID NO: 36, and having a substitution in amino acid residue corresponding to position R562 of SEQ ID NO: 36, and wherein the engineered DNA polymerase has a template independent nucleotide addition ability reduced by at least 50% in comparison with a DNA polymerase having an amino acid sequence set forth in SEQ ID NO: 36. In preferred embodiments, yield of template independent nucleotide addition of this engineered DNA polymerase is 10% or less.

In some embodiments of the disclosed methods, the engineered DNA polymerase comprises an amino acid sequence having at least 90% sequence identity to the amino acid sequence of SEQ ID NO: 37, and having a substitution in amino acid residue corresponding to position R659 of SEQ ID NO: 37, and wherein the engineered DNA polymerase has a template independent nucleotide addition ability reduced by at least 50% in comparison with a DNA polymerase having an amino acid sequence set forth in SEQ ID NO: 37. In preferred embodiments, yield of template independent nucleotide addition of this engineered DNA polymerase is 10% or less.

In some embodiments of the disclosed methods, the engineered DNA polymerase comprises an amino acid sequence having at least 90% sequence identity to the amino acid sequence of SEQ ID NO: 38, and having a substitution in amino acid residue corresponding to position R722 of SEQ ID NO: 38, and wherein the engineered DNA polymerase has a template independent nucleotide addition ability reduced by at least 50% in comparison with a DNA polymerase having an amino acid sequence set forth in SEQ ID NO: 38. In preferred embodiments, yield of template independent nucleotide addition of this engineered DNA polymerase is 10% or less.

In some embodiments of the disclosed methods, each of the first and higher order nucleic acid coding tags comprise an incorporated nucleic acid base analogue to reduce template independent nucleotide addition during primer extension reactions. In some preferred embodiments, the incorporated nucleic acid base analogue is one selected from the list consisting of: 5-Nitroindole, 4-methylindole, ortho-Twisted intercalating nucleic acid (oTINA) 5-nitrobenzimidazole, 6-nitrobenziimidazole and Pyrene. Previous research has established that these nucleic acid base analogues can reduce template independent nucleotide addition during primer extension reactions (Guixens-Gallardo, P., Hocek, M. and Perlikova, P., *Bioorg. Med. Chem. Lett.* 2016; Moran S, et al., Non-hydrogen bonding 'terminator' nucleosides increase the 3'-end homogeneity of enzymatic RNA and DNA synthesis. Nucleic Acids Res. 1996 Jun. 1; 24(11): 2044-52; Chiaramonte M, et al., Facile polymerization of dNTPs bearing unnatural base analogues by DNA polymerase alpha and Klenow fragment (DNA polymerase I). Biochemistry. 2003 Sep. 9; 42(35):10472-81; Zhang X, et al., Replication of a universal nucleobase provides unique insight into the role of entropy during DNA polymerization and pyrophosphorolysis. Biochemistry. 2010 Apr. 13; 49(14):3009-23).

In some embodiments of the disclosed methods, template independent nucleotide addition during primer extension reactions is reduced by at least 50% compared to a standard condition. In one example, special conditions during the primer extension reaction include using the first and higher order nucleic acid coding tags with an incorporated nucleic acid base analogue to reduce template independent nucleotide addition, and the standard condition includes using the first and higher order nucleic acid coding tags without an incorporated nucleic acid base analogue.

In some embodiments of the disclosed methods, the primer extension reaction performed during information transfer step is performed under conditions to reduce or prevent template independent nucleotide addition by the polymerase during the primer extension reaction. In some embodiments, the conditions of the primer extension reaction performed during information transfer step decrease yield of template independent nucleotide addition to 10% or less. In some embodiments, the yield of template independent nucleotide addition during the primer extension reaction is below 10%. In some embodiments, the yield of template independent nucleotide addition during the primer extension reaction is below 5%. In some embodiments, the yield of template independent nucleotide addition during the primer extension reaction is below 1%.

In other embodiments of the disclosed methods, the primer extension reaction performed during information transfer step is performed under conditions to increase efficiency of template independent nucleotide addition by the polymerase during the primer extension reaction. In some embodiments, the conditions of the primer extension reaction performed during information transfer step increase yield of template independent nucleotide addition to 80% or more. In some embodiments, the yield of template independent nucleotide addition during the primer extension reaction is above 80%. In some embodiments, the yield of template independent nucleotide addition during the primer extension reaction is above 85%. In some embodiments, the yield of template independent nucleotide addition during the primer extension reaction is above 90%. In some embodiments, the yield of template independent nucleotide addition during the primer extension reaction is above 95%.

Provided herein is also a method for analyzing a macromolecule, comprising the steps of: (a) providing a macromolecule and an associated nucleic acid recording tag joined to a solid support; (b) contacting the macromolecule with a first binding agent capable of binding to the macromolecule, wherein the first binding agent comprises a first nucleic acid coding tag with identifying information regarding the first binding agent;

(c) transferring information from the first nucleic acid coding tag to the nucleic acid recording tag to generate a first order extended nucleic acid recording tag, wherein a process of transferring information comprises a primer extension reaction performed by a DNA polymerase having 5'-to-3' polymerization activity and having substantially reduced 3'-to-5' exonuclease activity, and wherein the primer extension reaction is performed under conditions to increase efficiency of template independent nucleotide addition by the polymerase during the primer extension reaction;

(d) repeating steps (b) and (c) two or more times by replacing the first binding agent with a second or higher order binding agent capable of binding to the macromolecule, wherein the second or higher order binding agent comprises a second or higher order nucleic acid coding tag with identifying information regarding the second or higher order binding agent; and by transferring information of the second or higher order nucleic acid coding tag to the first or higher order extended nucleic acid recording tag to generate a second or higher order extended nucleic acid recording tag; and (e) analyzing extended nucleic acid recording tag obtained after extension reactions of step (d) by nucleic acid sequencing method, wherein analyzing the macromolecule comprises characterizing, identifying or quantifying all or a portion of components of the macromolecule.

In some embodiments of the method, the macromolecule analyte is a polypeptide.

In some embodiments of the method, during step (d) steps (b) and (c) are repeated four times or more.

In some embodiments of the method, the conditions of the primer extension reaction increase yield of template independent nucleotide addition to 80% or higher.

In some embodiments, providing the macromolecule and an associated recording tag joined to a solid support comprises the following steps: attaching the macromolecule to the recording tag to generate a nucleic acid-macromolecule conjugate; bringing the nucleic acid-macromolecule conjugate into proximity with a solid support by hybridizing the recording tag in the nucleic acid-macromolecule conjugate to a capture nucleic acid attached to the solid support; and covalently coupling the nucleic acid-macromolecule conjugate to the solid support.

In some embodiments, providing the macromolecule and an associated recording tag joined to a solid support further comprises attaching the macromolecule analyte to the nucleic acid recording tag optionally joined to the solid support.

In some embodiments, the nucleic acid recording tag is associated directly or indirectly to the macromolecule analyte via a non-nucleotide chemical moiety.

In some embodiments, before providing the macromolecule analyte and the associated nucleic acid recording tag joined to the solid support, the provided methods further comprise attaching the macromolecule analyte to the nucleic acid recording tag optionally joined to the solid support. Various alternatives can be used during the attachment step. For example, the macromolecule analyte can first be attached to the nucleic acid recording tag forming a conjugate, and then the conjugate is attached to the solid support. Alternatively, the nucleic acid recording tag can be attached (immobilized) to the solid support, and then the macromolecule analyte is attached to the immobilized nucleic acid recording tag.

In some embodiments, when a plurality of the nucleic acid-macromolecule conjugates is coupled on the solid support, any adjacently coupled nucleic acid-macromolecule conjugates are spaced apart from each other at an average distance of about 50 nm or greater.

In some embodiments, the macromolecule is attached to the 3' end of the recording tag. In other embodiments, the macromolecule is attached to the 5' end of the recording tag. In yet other embodiments, the macromolecule is attached to an internal position of the recording tag.

In some embodiments, a barcode is attached to the nucleic acid-macromolecule conjugate, wherein the barcode comprises a compartment barcode, a partition barcode, a sample barcode, a fraction barcode, or any combination thereof.

In some embodiments of the method, the transfer of identifying information (step (c)) comprises steps of: (c1) generating a double stranded extended recording tag by (i) joining at least one end of the recording tag to an end of the coding tag by a nucleic acid joining reagent, and (ii) extending the recording tag using the coding tag as a template by a DNA polymerase having 5'-to-3' polymerization activity and having substantially reduced 3'-to-5' exonuclease activity; and (c2) cleaving the double stranded extended recording tag with a double strand nucleic acid cleaving reagent to generate a truncated extended recording tag (first order extended nucleic acid recording tag).

In some embodiments of the method, the double stranded extended recording tag comprises a recognition sequence capable of being recognized by the double strand nucleic acid cleaving reagent. In some embodiments, cleaving the double stranded extended recording tag with the double strand nucleic acid cleaving reagent generates a 3' overhang in the extended recording tag. The 3' overhang of the first order extended nucleic acid recording tag generated by the double strand nucleic acid cleaving reagent is available to hybridize with a second coding tag when the binding step is repeated. In some embodiments, the double strand nucleic acid cleaving reagent is a type IIS restriction enzyme.

In some embodiments, the recording tag is covalently attached to the macromolecule to generate the nucleic acid-macromolecule conjugate. In some embodiments, the recording tag and/or capture nucleic acid further comprises a universal priming site, wherein the universal priming site comprises a priming site for amplification, sequencing, or both.

In some embodiments, the capture nucleic acid is derivatized or comprises a moiety (e.g., a reactive coupling moiety) to allow binding to a solid support. In some embodiments, the capture nucleic acid comprises a moiety (e.g., a reactive coupling moiety) to allow binding to the recording tag. In some other embodiments, the recording tag is derivatized or comprises a moiety (e.g., a reactive coupling moiety) to allow binding to a solid support. Methods of derivatizing a nucleic acid for binding to a solid support and reagents for accomplishing the same are known in the art. For this purpose, any reaction which is preferably rapid and substantially irreversible can be used to attach nucleic acids to the solid support. The capture nucleic acid may be bound to a solid support through covalent or non-covalent bonds. In a preferred embodiment, the capture nucleic acid is covalently bound to biotin to form a biotinylated conjugate. The biotinylated conjugate is then bound to a solid surface, for example, by binding to a solid, insoluble support derivatized with avidin or streptavidin. The capture nucleic acid can be derivatized for binding to a solid support by incorporating modified nucleic acids in the loop region. In other embodiments, the capture moiety is derivatized in a region other than the loop region.

Exemplary bioorthogonal reactions that can be used for binding to a solid support or for generating nucleic acid-macromolecule conjugates include the copper catalyzed reaction of an azide and alkyne to form a triazole (Huisgen 1, 3-dipolar cycloaddition), strain-promoted azide alkyne cycloaddition (SPAAC), reaction of a diene and dienophile (Diels-Alder), strain-promoted alkyne-nitrone cycloaddition, reaction of a strained alkene with an azide, tetrazine or tetrazole, alkene and azide [3+2]cycloaddition, alkene and tetrazine inverse electron demand Diels-Alder (IEDDA) reaction (e.g., m-tetrazine (mTet) or phenyl tetrazine (pTet) and trans-cyclooctene (TCO); or pTet and an alkene), alkene and tetrazole photoreaction, Staudinger ligation of azides and phosphines, and various displacement reactions, such as displacement of a leaving group by nucleophilic attack on an electrophilic atom (Horisawa 2014, Knall, Hollauf et al. 2014). Exemplary displacement reactions include reaction of an amine with: an activated ester; an N-hydroxysuccinimide ester; an isocyanate; an isothioscyanate, an aldehyde, an epoxide, or the like. In some embodiments, iEDDA click chemistry is used for immobilizing macromolecules to a solid support or for generating nucleic acid-macromolecule conjugates since it is rapid and delivers high yields at low input concentrations. In another embodiment, m-tetrazine rather than tetrazine is used in an iEDDA click chemistry reaction, as m-tetrazine has improved bond stability. In another embodiment, phenyl tetrazine (pTet) is used in an iEDDA click chemistry reaction.

In some embodiments, a plurality of capture nucleic acids are coupled to the solid support. In some cases, the sequence region that is complementary to the recording tag on the capture nucleic acids is the same among the plurality of capture nucleic acids. In some cases, the recording tag attached to various macromolecules comprises the same complementary sequence to the capture nucleic acid.

In some embodiments, the surface of the solid support is passivated (blocked). A "passivated" surface refers to a surface that has been treated with outer layer of material. Methods of passivating surfaces include standard methods from the fluorescent single molecule analysis literature, including passivating surfaces with polymer like polyethylene glycol (PEG) (Pan et al., 2015, Phys. Biol. 12:045006), polysiloxane (e.g., Pluronic F-127), star polymers (e.g., star PEG) (Groll et al., 2010, Methods Enzymol. 472:1-18), hydrophobic dichlorodimethylsilane (DDS)+self-assembled Tween-20 (Hua et al., 2014, Nat. Methods 11:1233-1236), diamond-like carbon (DLC), DLC+PEG (Stavis et al., 2011, Proc. Natl. Acad. Sci. USA 108:983-988), and zwitterionic moieties (e.g., U.S. Patent Application Publication US 2006/0183863). In addition to covalent surface modifications, a number of passivating agents can be employed as well including surfactants like Tween-20, polysiloxane in solution (Pluronic series), poly vinyl alcohol (PVA), and proteins like BSA and casein. Alternatively, density of macromolecules (e.g., proteins, polypeptide, or peptides) can be titrated on the surface or within the volume of a solid substrate by spiking a competitor or "dummy" reactive molecule when immobilizing the proteins, polypeptides or peptides to the solid substrate. In some embodiments, PEGs of various molecular weights can also be used for passivation from molecular weights of about 300 Da to 50 kDa or more.

In certain embodiments where multiple nucleic acid-macromolecule conjugates are immobilized on the same solid support, the nucleic acid-macromolecule conjugates can be spaced appropriately to accommodate methods of identification to be used. For example, it may be advantageous to space the nucleic acid-macromolecule conjugates that optimally to allow a nucleic acid-based method for identifying the macromolecules to be performed. In some embodiments, the method for analyzing macromolecules involve transferring information of the nucleic acid coding tag attached to a binding agent to the nucleic acid recording tag to generate an extended nucleic acid recording tag, and information transfer from the coding tag may reach a neighboring recording tag.

To control macromolecule spacing or nucleic acid-macromolecule conjugate spacing on the solid support, the density of functional coupling groups (e.g., TCO) may be titrated on the substrate surface. In some embodiments, adjacently coupled macromolecules or nucleic acid-macromolecule conjugates are spaced apart from each other on the surface or within the volume (e.g., porous supports) of a solid support at an average distance of about 50 nm to about 500 nm, or about 50 nm to about 400 nm, or about 50 nm to about 300 nm, or about 50 nm to about 200 nm, or about 50 nm to about 100 nm. In some embodiments, adjacently coupled macromolecules or nucleic acid-macromolecule conjugates are spaced apart from each other on the surface of a solid support with an average distance of at least 50 nm or at least 100 nm. In some embodiments, adjacently coupled macromolecules or nucleic acid-macromolecule conjugates are spaced apart from each other on the surface or within the volume of a solid support such that, empirically, the relative frequency of inter- to intra-molecular events (e.g. transferring information from the complementary coding tag to a neighboring recording tag vs. the cognate recording tag is <1:10; <1:100; <1:1,000; or <1:10, 000. In some embodiments, the plurality of nucleic acid-macromolecule conjugate is coupled on the solid support such that any adjacently coupled nucleic acid-macromolecule conjugates are spaced apart from each other at an average distance which ranges from about 50 to 500 nm, from about 50 to 1000 nm, from about 50 to 1500 nm, from about 50 to 2000 nm.

In some embodiments, the spacing of the macromolecule on the solid support is achieved by controlling the concentration and/or number of capture nucleic acids on the solid support. In some embodiments, any adjacently coupled capture nucleic acids are spaced apart from each other on the surface or within the volume (e.g., porous supports) of a solid support at a distance of about 50 nm, about 100 nm, or about 200 nm. In some embodiments, any adjacently coupled capture nucleic acids are spaced apart from each other on the surface of a solid support with an average distance of at least 50 nm. In some embodiments, any adjacently coupled capture nucleic acids are spaced apart from each other on the surface or within the volume of a solid support such that, empirically, the relative frequency of inter- to intra-molecular events (e.g. transfer of information) is <1:10; <1:100; <1:1,000; or <1:10,000.

A suitable spacing frequency can be determined empirically using a functional assay and can be accomplished by dilution and/or by spiking a "dummy" spacer molecule that competes for attachments sites on the substrate surface. For example, PEG-5000 (MW ~5000) is used to block the interstitial space between peptides on the substrate surface (e.g., bead surface). In addition, the peptide is coupled to a functional moiety that is also attached to a PEG-5000 molecule. In some embodiments, the functional moiety is an aldehyde, an azide/alkyne, or a malemide/thiol, or an epoxide/nucleophile, or an inverse electron demand Diels-Alder (iEDDA) group, or a moiety for a Staudinger reaction. In some embodiments, the functional moiety is an aldehyde group. In a preferred embodiment, this is accomplished by coupling a mixture of NHS-PEG-5000-TCO+NHS-PEG-5000-Methyl to amine-derivatized beads. The stoichiometric ratio between the two PEGs (TCO vs. methyl) is titrated to generate an appropriate density of functional coupling moieties (TCO groups) on the substrate surface; the methyl-PEG is inert to coupling. The effective spacing between TCO groups can be calculated by measuring the density of TCO groups on the surface. In certain embodiments, the mean spacing between coupling moieties (e.g., TCO) on the solid surface is at least 50 nm, at least 100 nm, at least 250 nm, or at least 500 nm. After PEG5000-TCO/methyl derivatization of the beads, the excess $NH_2$ groups on the surface are quenched with a reactive anhydride (e.g. acetic or succinic anhydride).

In some embodiments, the spacing is accomplished by titrating the ratio of available attachment molecules on the substrate surface. In some examples, the substrate surface (e.g., bead surface) is functionalized with a carboxyl group (COOH) which is treated with an activating agent (e.g., activating agent is EDC and Sulfo-NHS). In some examples, the substrate surface (e.g., bead surface) comprises NHS moieties. In some embodiments, a mixture of $mPEG_n$-$NH_2$ and $NH_2$-$PEG_n$-mTet is added to the activated beads (wherein n is any number, e.g., any number from n=1 to n=100 or more). In one example, the ratio between the $mPEG_3$-$NH_2$ (not available for coupling) and $NH_2$-$PEG_4$-mTet (available for coupling) is titrated to generate an appropriate density of functional moieties available to attach the macromolecule on the substrate surface. In certain embodiments, the mean spacing between coupling moieties (e.g., $NH_2$-$PEG_4$-mTet) on the solid surface is at least 50 nm, at least 100 nm, at least 250 nm, or at least 500 nm. In some specific embodiments, the ratio of $NH_2$-$PEG_n$-mTet to $mPEG_n$-$NH_2$ is about or greater than 1:1000, about or greater than 1:10,000, about or greater than 1:100,000, or about or greater than 1:1,000,000. In some further embodiments, the capture nucleic acid attaches to the $NH_2$-$PEG_n$-mTet.

In some embodiments, the DNA polymerase used for primer extension reaction is an engineered DNA polymerase having a reduced template independent nucleotide addition ability during the primer extension reaction.

In some embodiments, the DNA polymerase comprises an amino acid sequence having at least 90% sequence identity to the amino acid sequence of SEQ ID NO: 7, and having a substitution in amino acid residue corresponding to position 754 of SEQ ID NO: 7, and wherein the engineered DNA polymerase has a template independent nucleotide addition ability reduced by at least 50% in comparison with a DNA polymerase having an amino acid sequence set forth in SEQ ID NO: 7.

In the method of the invention, the analysis step may comprise, for example, sizing or sequencing the amplified DNA molecule and optionally comparing the size and/or sequence of the amplified DNA molecule to a different DNA sample which has been amplified according to the invention. In preferred embodiments of the present invention, the thermostable DNA polymerase is a Klenow Fragment exo-DNA polymerase from E. coli.

Mutant or modified polymerases of particular interest in the invention include Taq DNA polymerase, Tne DNA polymerase, Tma DNA polymerase, Pfu DNA polymerase, Tfl DNA polymerase, Tth DNA polymerase, Tbr DNA polymerase, Pwo DNA polymerase, Bst DNA polymerase, Bca DNA polymerase, VENT™ DNA polymerase, DEEP VENT™ DNA polymerase, T7 DNA polymerase, T5 DNA polymerase, DNA polymerase III, Klenow fragment DNA polymerase, Stoffel fragment DNA polymerase, and mutants, fragments or derivatives thereof.

In accordance with the invention, other functional changes (or combinations thereof) may be made to the polymerases having reduced ability to add non-templated nucleotides to the 3' terminus of a synthesized nucleic acid molecule. For example, the polymerase may also be modified to reduce, substantially reduce or eliminate 5' exonuclease activity, and/or 3' exonuclease activity. Thus, the invention relates to mutant or modified DNA polymerases having reduced ability to add non-templated nucleotides which are modified in at least one way selected from the group consisting of:
  (a) to reduce or eliminate the 3'-5' exonuclease activity of the polymerase; and/or
  (b) to reduce or eliminate the 5'-3' exonuclease activity of the polymerase.

The present invention is also directed to nucleic acid molecules (preferably vectors) containing a gene encoding the mutant or modified polymerases of the present invention and to host cells containing such molecules. Any number of hosts may be used to express the gene of interest, including prokaryotic and eukaryotic cells. Preferably, prokaryotic cells are used to express the polymerases of the invention. The preferred prokaryotic host according to the present invention is E. coli.

The invention also relates to a method of producing the polymerases of the invention, said method comprising: (a) culturing the host cell comprising a gene encoding a polymerase of the invention; (b) expressing said gene; and (c) isolating said polymerase from said host cell.

In a preferred aspect of the invention, polymerases and the modified polymerases used in the disclosed methods are made by recombinant techniques. A number of cloned polymerase genes are available or may be obtained using standard recombinant techniques, such as disclosed in Sambrook et al., In: Molecular Cloning A Laboratory Manual (2d ed.) Cold Spring Harbor Laboratory Press, Cold Spring Harbor, N.Y. (1989).

It will be understood, however, that other thermostable DNA polymerases or mutants thereof, any of which are reduced, substantially reduced, or eliminated in the ability to add a non-templated 3' terminal nucleotide to the growing strand, may be used in the methods of the present invention equivalently. The DNA polymerases are used in the methods of the present invention at a concentration of about 0.0001 units/ml to about 10 units/ml, preferably at a concentration of about 0.001 units/ml to about 5 units/ml, more preferably at a concentration of about 0.004 units/ml to about 1 unit/ml, or any subrange thereof.

Provided herein is also a kit for analyzing a macromolecule analyte, comprising:
(a) a nucleic acid recording tag configured to associate directly or indirectly with a macromolecule analyte;
(b) one or more binding agents each comprising (i) a binding moiety capable of binding to the macromolecule analyte to be analyzed, and (ii) a nucleic acid coding tag comprising identifying information regarding the binding moiety, wherein the recording tag and the coding tag are configured to allow transfer of information between them by a primer extension reaction upon binding of the one or more binding agents to the macromolecule analyte; and
(c) an engineered DNA polymerase having 5'→3' polymerization activity, substantially reduced 3'→5' exonuclease activity, and a reduced template independent nucleotide addition ability during the primer extension reaction.

In some embodiments, the kit comprises a plurality of binding agents, wherein each binding agent comprises a nucleic acid coding tag that comprises identifying information regarding the binding agent.

In some embodiments, the macromolecule analyte comprises a polypeptide, and the kit further comprises (d) a functionalizing reagent capable of modifying an N-terminal amino acid (NTAA) of the polypeptide to generate a functionalized NTAA, wherein the binding moiety is capable of binding to the functionalized NTAA.

In some embodiments, the kit further comprises an eliminating reagent for removing by chemical or enzymatic cleavage the functionalized NTAA to expose the immediately adjacent amino acid residue as a new NTAA.

In some embodiments, the nucleic acid coding tag of the binding agent from the kit comprises an incorporated nucleic acid base analogue, e.g., 5-Nitroindole, to reduce template independent nucleotide addition during primer extension reactions.

In some embodiments, the components of the kit are designed to support performance of the disclosed multi-cycle encoding assays. For example, in some embodiments, one or more binding agents of the kit each comprises a nucleic acid coding tag having a cycle-specific barcode comprising identifying information regarding the binding moiety of the binding agent. Thus, after each encoding cycle, the identifying information transferred from the coding tag to the recording tag can be traced back and identity of binding agent that binds to the macromolecule analyte at each cycle can be discovered and used for analysis of the macromolecule analyte. Further, if a binding agent is designed to bind to a specific component of the macromolecule analyte, then identity of the specific component of the macromolecule analyte can also be discovered.

Any of the above-mentioned kit component(s), and any molecule(s), molecular complex(es) or conjugate(s), reagent(s), structure(s) (e.g., support(s), surface(s), particle(s), or bead(s)), reaction intermediate(s), reaction product(s), binding complex(es), or any other article(s) of manufacture disclosed and/or used in the exemplary kits and methods, may be provided separately or in any suitable combination in order to form a kit. The kit may optionally comprise an instruction for use, for example, in highly-parallel, high throughput digital analysis (such as polypeptide analysis or sequencing).

Exemplary Embodiments

Among the provided embodiments are:
1. A method for analyzing a macromolecule analyte, comprising the steps of:
(a) providing the macromolecule analyte and an associated nucleic acid recording tag joined to a solid support;
(b) contacting the macromolecule analyte with a first binding agent capable of binding to the macromolecule analyte, wherein the first binding agent comprises a first nucleic acid coding tag that comprises identifying information regarding the first binding agent;
(c) transferring identifying information regarding the first binding agent from the first nucleic acid coding tag to the nucleic acid recording tag to generate a first order extended nucleic acid recording tag, wherein a process of transferring information comprises a primer extension reaction performed using a DNA polymerase having 5'-to-3' polymerization activity and having substantially reduced 3'-to-5' exonuclease activity, and wherein the primer extension reaction is performed under conditions to reduce or prevent template independent nucleotide addition by the polymerase during the primer extension reaction;
(d) repeating steps (b) and (c) one or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and
(e) analyzing extended nucleic acid recording tag obtained after extension reactions of step (d) by a nucleic acid sequencing method to obtain the identifying information regarding the first binding agent and the identifying information regarding the second or higher order binding agent, thereby analyzing the macromolecule analyte.
2. The method of Embodiment 1, wherein step (a) comprises providing a plurality of macromolecule analytes and associated nucleic acid recording tags joined to the solid support; and each of steps (b) and (d) comprises contacting the plurality of macromolecule analytes with a first or higher order plurality of binding agents capable of binding to the macromolecule analytes, wherein the first or higher order plurality of binding agents comprise a first or higher order nucleic acid coding tag(s) that comprise(s) identifying information regarding the first or higher order plurality of binding agents.

3. The method of Embodiment 1 or 2, wherein the macromolecule analyte is a polypeptide.

4. The method of any one of Embodiments 1-3, wherein during step (d) steps (b) and (c) are repeated four times or more.

5. The method of Embodiment 3 or 4, further comprising modifying the N-terminal amino acid (NTAA) of the polypeptide with a chemical moiety to produce a modified NTAA.

6. The method of Embodiment 5, wherein the first or higher order binding agent is capable of binding to the modified NTAA.

7. The method of Embodiment 5 or 6, further comprising removing the modified NTAA to expose a new NTAA of the polypeptide.

8. The method of any one of Embodiments 2-7, wherein the plurality of macromolecule analytes are spaced apart on the solid support at an average distance >50 nm.

9. The method of any one of Embodiments 1-8, wherein the transfer of identifying information (step (c)) comprises steps of: (c1) generating a double stranded extended recording tag by (i) joining at least one end of the recording tag to an end of the coding tag by a nucleic acid joining reagent, and (ii) extending the recording tag using the coding tag as a template by the DNA polymerase having 5'-to-3' polymerization activity and having substantially reduced 3'-to-5' exonuclease activity; and (c2) cleaving the double stranded extended recording tag with a double strand nucleic acid cleaving reagent to generate a truncated extended recording tag (first order extended nucleic acid recording tag).

10. The method of Embodiment 1, wherein the DNA polymerase is an engineered DNA polymerase having a reduced template independent nucleotide addition ability during the primer extension reaction.

11. The method of Embodiment 10, wherein the engineered DNA polymerase comprises: an amino acid sequence having at least 90% sequence identity to the amino acid sequence of SEQ ID NO: 7, and having a substitution(s) in amino acid residue(s) corresponding to position 754 of SEQ ID NO: 7, and wherein the engineered DNA polymerase has a template independent nucleotide addition ability reduced by at least 50% in comparison with a DNA polymerase having an amino acid sequence set forth in SEQ ID NO: 7; an amino acid sequence having at least 90% sequence identity to the amino acid sequence of SEQ ID NO: 35, and having a substitution in amino acid residue corresponding to position R518 of SEQ ID NO: 35, and wherein the engineered DNA polymerase has a template independent nucleotide addition ability reduced by at least 50% in comparison with a DNA polymerase having an amino acid sequence set forth in SEQ ID NO: 35; an amino acid sequence having at least 90% sequence identity to the amino acid sequence of SEQ ID NO: 36, and having a substitution in amino acid residue corresponding to position R562 of SEQ ID NO: 36, and wherein the engineered DNA polymerase has a template independent nucleotide addition ability reduced by at least 50% in comparison with a DNA polymerase having an amino acid sequence set forth in SEQ ID NO: 36; an amino acid sequence having at least 90% sequence identity to the amino acid sequence of SEQ ID NO: 37, and having a substitution in amino acid residue corresponding to position R659 of SEQ ID NO: 37, and wherein the engineered DNA polymerase has a template independent nucleotide addition ability reduced by at least 50% in comparison with a DNA polymerase having an amino acid sequence set forth in SEQ ID NO: 37; or an amino acid sequence having at least 90% sequence identity to the amino acid sequence of SEQ ID NO: 38, and having a substitution in amino acid residue corresponding to position R722 of SEQ ID NO: 38, and wherein the engineered DNA polymerase has a template independent nucleotide addition ability reduced by at least 50% in comparison with a DNA polymerase having an amino acid sequence set forth in SEQ ID NO: 38. Preferably, yield of template independent nucleotide addition of this engineered DNA polymerase is 10% or less.

12. The method of Embodiment 1, wherein the first or higher order nucleic acid coding tags comprise an incorporated nucleic acid base analogue, e.g., 5-Nitroindole, to reduce template independent nucleotide addition during primer extension reactions.

13. The method of any one of Embodiments 1-12, wherein template independent nucleotide addition during primer extension reactions is reduced by at least 50% compared to a standard condition.

14. The method of any one of Embodiments 1-13, wherein the conditions of the primer extension reaction decrease yield of template independent nucleotide addition to 10% or less.

15. The method of any one of Embodiments 1-14, wherein the nucleic acid recording tag is associated directly or indirectly to the macromolecule analyte via a non-nucleotide chemical moiety.

16. The method of any one of Embodiments 1-15, further comprising attaching the macromolecule analyte to the nucleic acid recording tag optionally joined to the solid support before step (a).

17. A method for analyzing a macromolecule analyte, comprising the steps of:
(a) providing a macromolecule analyte and an associated nucleic acid recording tag joined to a solid support;
(b) contacting the macromolecule analyte with a first binding agent capable of binding to the macromolecule analyte, wherein the first binding agent comprises a first nucleic acid coding tag that comprises identifying information regarding the first binding agent;
(c) transferring identifying information regarding the first binding agent from the first nucleic acid coding tag to the nucleic acid recording tag to generate a first order extended nucleic acid recording tag, wherein a process of transferring information comprises a primer extension reaction performed by a DNA polymerase having 5'-to-3' polymerization activity and having substantially reduced 3'-to-5' exonuclease activity, and wherein the primer extension reaction is performed under conditions to increase efficiency of template independent nucleotide addition by the polymerase during the primer extension reaction;
(d) repeating steps (b) and (c) two or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and (e) analyzing extended nucleic acid recording tag obtained after extension reactions of step (d) by nucleic acid sequencing method to obtain the identifying information regarding the first binding agent and the identifying information regarding the second or higher order binding agent, thereby analyzing the macromolecule analyte.

18. The method of Embodiment 17, wherein the macromolecule analyte is a polypeptide.

19. The method of Embodiment 17 or 18, wherein during step (d) steps (b) and (c) are repeated four times or more.

20. The method of any one of Embodiments 17-18, wherein the conditions of the primer extension reaction increase yield of template independent nucleotide addition to 80% or higher.

21. The method of any one of Embodiments 17-20, wherein the transfer of identifying information (step (c)) comprises steps of: (c1) generating a double stranded extended recording tag by (i) joining at least one end of the recording tag to an end of the coding tag by a nucleic acid joining reagent, and (ii) extending the recording tag using the coding tag as a template by the DNA polymerase having 5'-to-3' polymerization activity and having substantially reduced 3'-to-5' exonuclease activity; and (c2) cleaving the double stranded extended recording tag with a double strand nucleic acid cleaving reagent to generate a truncated extended recording tag (first order extended nucleic acid recording tag).

22. A kit for analyzing a macromolecule analyte, comprising:

(a) a nucleic acid recording tag configured to associate directly or indirectly with a macromolecule analyte;

(b) one or more binding agents each comprising (i) a binding moiety capable of binding to the macromolecule analyte to be analyzed, and (ii) a nucleic acid coding tag comprising identifying information regarding the binding moiety, wherein the recording tag and the coding tag are configured to allow transfer of information between them by a primer extension reaction upon binding of the one or more binding agents to the macromolecule analyte; and (c) an engineered DNA polymerase having 5'→3' polymerization activity, substantially reduced 3'→5' exonuclease activity, and a reduced template independent nucleotide addition ability during the primer extension reaction.

23. The kit of Embodiment 22, comprising a plurality of binding agents, wherein each binding agent comprises a nucleic acid coding tag that comprises identifying information regarding the binding agent.

24. The kit of Embodiment 22 or 23, wherein the macromolecule analyte comprises a polypeptide, and the kit further comprises (d) a functionalizing reagent capable of modifying an N-terminal amino acid (NTAA) of the polypeptide to generate a functionalized NTAA, wherein the binding moiety is capable of binding to the functionalized NTAA.

25. The kit of Embodiment 24, wherein further comprising an eliminating reagent for removing by chemical or enzymatic cleavage the functionalized NTAA to expose the immediately adjacent amino acid residue as a new NTAA.

26. The kit of any one of Embodiments 22-25, wherein the nucleic acid coding tag comprises an incorporated nucleic acid base analogue, e.g., 5-Nitroindole, to reduce template independent nucleotide addition during primer extension reactions.

27. The kit of any one of Embodiments 22-26, further comprising a double strand nucleic acid cleaving reagent, such as a type IIS restriction enzyme.

I. EXAMPLES

The following examples are offered to illustrate but not to limit the methods, compositions, and uses provided herein. Certain aspects of the present invention, including, but not limited to, embodiments for the Proteocode™ polypeptide sequencing assay, information transfer between coding tags and recording tags, methods of making nucleotide-polypeptide conjugates, methods for attachment of nucleotide-polypeptide conjugates to a support, methods of generating barcodes, methods of generating specific binders recognizing an N-terminal amino acid of a polypeptide, reagents and methods for modifying and/or removing an N-terminal amino acid from a polypeptide, methods for analyzing extended recording tags were disclosed in earlier published application US 2019/0145982 A1, US 2020/0348308 A1, US 2020/0348307 A1, US 2021/0208150 A1, WO 2020/223000 A1, the contents of which are incorporated herein by reference in their entireties.

Example 1. Immobilization of Recording Tag-Labeled Polypeptides to a Solid Support Recording tag-labeled polypeptides are immobilized on a substrate via an IEDDA click chemistry reaction using an mTet group on the recording tag and a TCO group on the surface of activated beads (solid support). 200 ng of M-270 TCO beads are resuspended in 100 ul phosphate coupling buffer. 5 pmol of DNA recording tag labeled peptides comprising an mTet moiety on the recording tag is added to the beads for a final concentration of 50 nM. The reaction is incubated for 1 hr at room temperature. After immobilization, unreacted TCO groups on the substrate are quenched with 1 mM methyl tetrazine acid in phosphate coupling buffer for 1 hr at room temperature.

Magnetic beads suitable for click-chemistry immobilization are created by converting M-270 amine magnetic Dynabeads (Thermo Fisher, USA) to either azide or TCO-derivatized beads capable of coupling to alkyne or methyl Tetrazine-labeled oligo-peptide conjugates, respectively (see also Examples 20-21 of US 20190145982 A1). Namely, 10 mg of M-270 beads are washed and resuspended in 500 ul borate buffer (100 mM sodium borate, pH 8.5). A mixture of TCO-PEG (12-120)-NHS (Nanocs) and methyl-PEG (12-120)-NHS is resuspended at 1 mM in DMSO and incubated with M-270 amine beads at room temperature overnight. The ratio of the Methyl to TCO PEG is titrated to adjust the final TCO surface density on the beads such that there is <100 TCO moieties/um2. Unreacted amine groups are capped with a mixture of 0.1M acetic anhydride and 0.1M DIEA in DMF (500 ul for 10 mg of beads) at room temperature for 2 hrs. After capping and washing 3× in DMF, the beads are resuspended in phosphate coupling buffer at 10 mg/ml.

Example 2. Polypeptide Immobilization Using Nucleic Acid Hybridization and Joining to a Solid Support This example describes exemplary methods for joining (immobilizing) nucleic acid-polypeptide conjugates, such as conjugates of a polypeptide with recording tag, to a solid support. In a hybridization based method of immobilization, nucleic acid-polypeptide conjugates were hybridized and ligated to short hairpin capture DNAs that were chemically immobilized on beads (NHS-Activated Sepharose High Performance, Cytiva, USA). The capture DNAs were conjugated to the beads using trans-cyclooctene (TCO) and methyltetrazine (mTet)-based click chemistry. TCO-modified short hairpin capture DNAs (16 basepair stem, 4 base loop, 17 base 5' overhang) were reacted with mTet-coated beads. Phosphorylated nucleic acid-polypeptide conjugates (20 nM) were annealed to the hairpin DNAs attached to beads in 0.5 M NaCl, 50 mM sodium citrate, 0.02% SDS, pH 7.0, and incubated for 30 minutes at 37° C. The beads were washed once with PBST (1× phosphate buffer, 0.1% Tween 20) and resuspended in 1× Quick ligation solution (New England Biolabs, USA) with T4 DNA ligase. After a 30 min incubation at 25° C., the beads were washed once with PBST, three times with 0.1 M NaOH, 0.1% Tween 20, three times with 1× phosphate buffer, 0.1% Tween 20, and resuspended in 50 µL of PBST. The total immobilized nucleic acid-polypeptide conjugates including amino FA-terminal peptides (FAGVAMPGAEDDVVGSGSK; SEQ ID NO: 4), amino AFA-terminal peptides (AFAGVAMPGAEDDVVGSGSK; SEQ ID NO: 5), and an amino AA-terminal peptides (AAGVAMPGAEDDVVGSGSK; SEQ ID NO: 6) were quantified by qPCR using specific primer sets. For comparison, peptides were immobilized onto beads using a non-hybridization based method that did not involve a ligation step. The non-hybridization based method was performed by incubating 30 µM TCO-modified DNA-tagged peptides including amino FA-terminal peptides, amino AFA-terminal peptides, and amino AA-terminal peptides, with mTet-coated magnetic beads overnight at 25° C.

As shown in Table 1, similar Ct values were observed in the non-hybridization preparation method with 1:100,000 grafting density and the hybridization based preparation method with 1:10,000 grafting density. Loading amount of DNA-tagged peptides for the hybridization based preparation method was 1/3000 compared to that for the non-hybridization preparation method. In general, it was observed that less starting material was needed for the hybridization based immobilization method.

TABLE 1

Comparison of loading hybridization and non-hybridization immobilization methods.

| Grafting:Passivation | Non-hybridization based immobilization method (−Ligation) | Hybridization based immobilization method (+Ligation) |
|---|---|---|
| 1:100,000 | 19.4 | 25.4 |
| 1:10,000 | — | 21.1 |

Example 3. Protein Expression and Purification

Plasmids containing pET28a vector and Klenow Fragment exo- gene (*E. coli* polA (D355A, E357A) gene starting at codon 324) with the different mutations at R754 were directly ordered from Twist Bioscience, USA. R754 amino acid residue of the KF exo- enzyme has been independently mutated to K, L, Y, H, Q, E, and A residues. The wild type and mutated proteins were expressed in BL21(DE3) cells by the induction of 0.4 mM IPTG for about 16 hours at 15° C., and have been purified using Ni-NTA affinity chromatography.

Example 4. The in Solution Primer Extension Test for Klenow Fragment Exo-DNA Polymerase (KF Exo-) Wild Type (WT) and Exemplary Mutants Two partially complementary oligonucleotides (temp1, SEQ ID NO: 12 and temp2, SEQ ID NO: 13) with 1:1 ratio were annealed by heating to 95° C. and slowly cooling down to perform a primer extension reaction. The temp2 oligo has a C3 terminal addition to prevent primer extension on the temp1 template (FIG. 2A). 0.5 uM of annealed dsDNA substrate were incubated with 125 nM of Klenow Fragment exo- wide type or mutants at 25° C. for 20 min in presence of dNTP mixture (125 uM of each dNTP), 50 mM Tris-HCl (pH, 7.5), 2 mM $MgSO_4$, 50 mM NaCl, 1 mM DTT, 0.1% Tween 20, and 0.1 mg/mL BSA. The reactions were stopped by 90% formamide and 10 mM EDTA, and the samples were loaded in to 15% TBE-Urea gel for separation. FIG. 2B shows the results of gel electrophoresis resolving products of primer extension reactions. Reactions 1, 2, 3, 4, 5, 6, 7, 8 contain correspondingly WT KF exo- or R754K, R754L, R754Y, R754H, R754Q, R754E, R754A mutants of the KF exo-. Under conditions tested, the wild type enzyme shows almost 100% template independent nucleotide addition, creating an extended product (Ext+A, SEQ ID NO: 15); the mutant enzyme with the R754K mutation shows a moderate template independent nucleotide addition, while template independent nucleotide additions were practically not observed for the other mutated enzymes, generating only the Ext product (SEQ ID NO: 14).

Figure 3A:
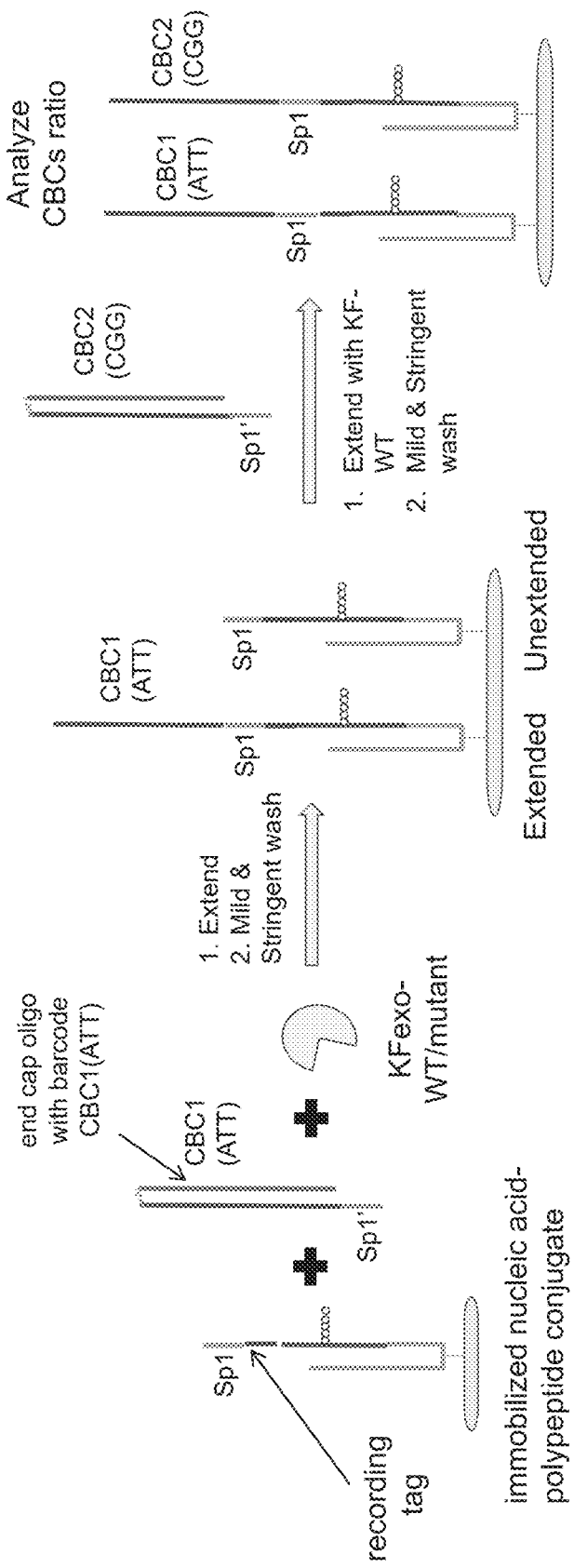
FIG. 3A-B. Exemplary processivity test for Klenow Fragment exo- wild type and mutants.
Figure 3B:
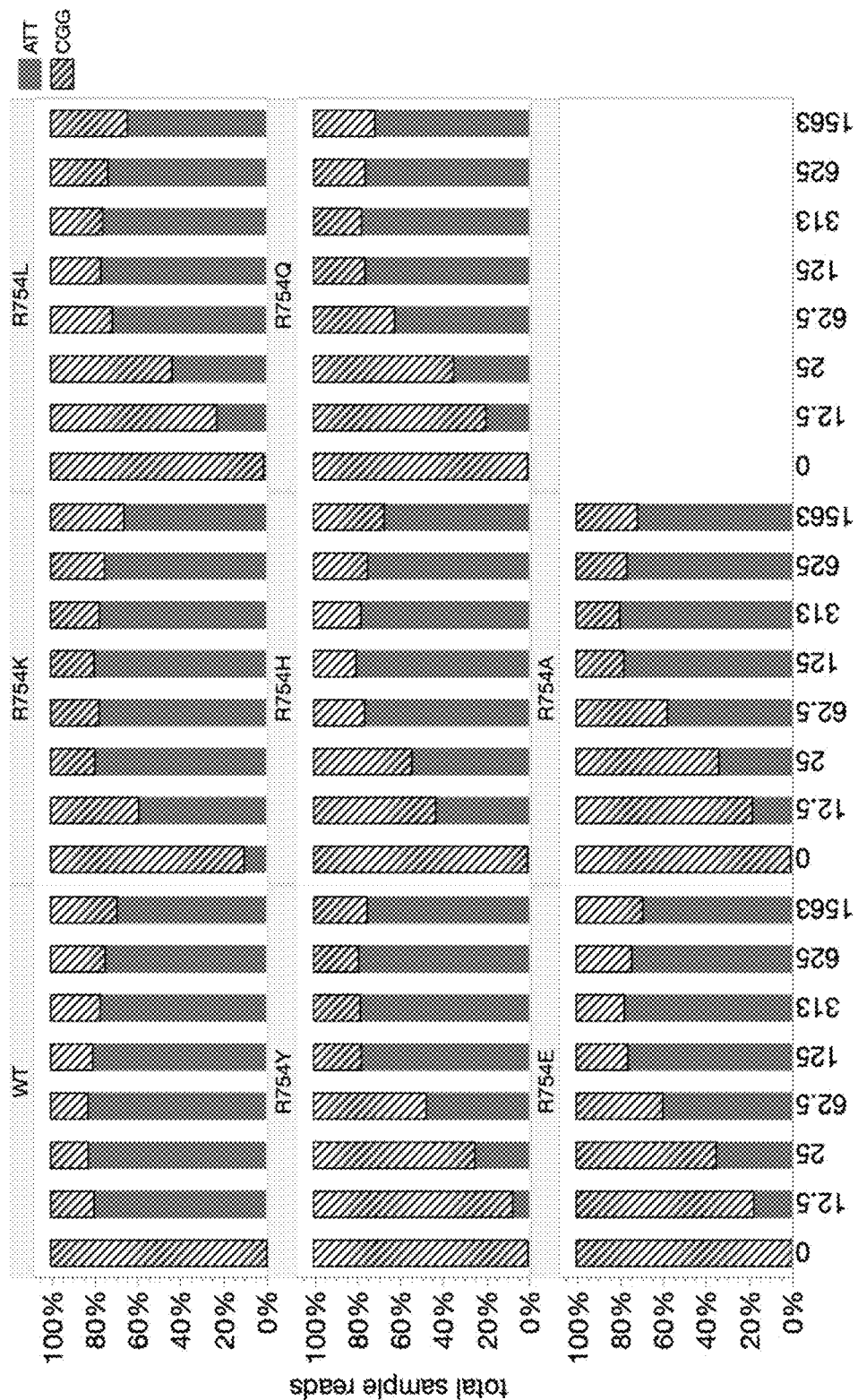

Example 5. Processivity Test of Klenow Fragment Exo- Wild Type Enzyme and the Mutants on the Solid Support The recording tag-polypeptide conjugates were immobilized on a solid support as described in Example 2. The recording tag has spacer Sp1 at the 3' end available for hybridization (FIG. 3A). Different concentrations of Klenow Fragment exo- (KF exo-) wild type enzyme or its R754 mutant were incubated with 400 nM of the end cap oligo with barcode CBC1 (ATT) and complementary spacer Sp1' at 25° C. for 10 min in presence of dNTP mixture (125 uM of each dNTP), 50 mM Tris-HCl (pH, 7.5), 2 mM $MgSO_4$, 50 mM NaCl, 1 mM DTT, 0.1% Tween-20, and 0.1 mg/mL BSA. After wash with PBST, 0.1 M NaOH+0.1% Tween-20, and PBST, the samples were incubated with 0.125 U/uL of Klenow fragment (3'→5' exo-) (MCLAB, USA), 400 nM of another end cap oligo with barcode CBC2 (CGG) and dNTP mixture (125 uM of each dNTP) at 25° C. for 10 min in presence of the same buffer condition (FIG. 3A). Klenow Fragment exo- enzyme extends the recording tag at 3' end and records the CBC1 barcode; however, if the extension fails, then no barcode is recorded. The ratio for CBC1 (ATT) and CBC2 (CGG) barcodes present in the extended recording tag after two primer extension reactions were calculated (FIG. 3B). FIG. 3B shows that the ratio of CBC1 and CBC2 was increased in general along with the concentration used for Klenow Fragment exo- mutants, while the wild type was almost saturated at the lowest used concentration at 12.5 nM, indicating that the mutants have lower processivity compared to the wild type enzyme. Optimal working concentrations for particular mutant enzymes can be calculated based on these data.

Figure 4A:
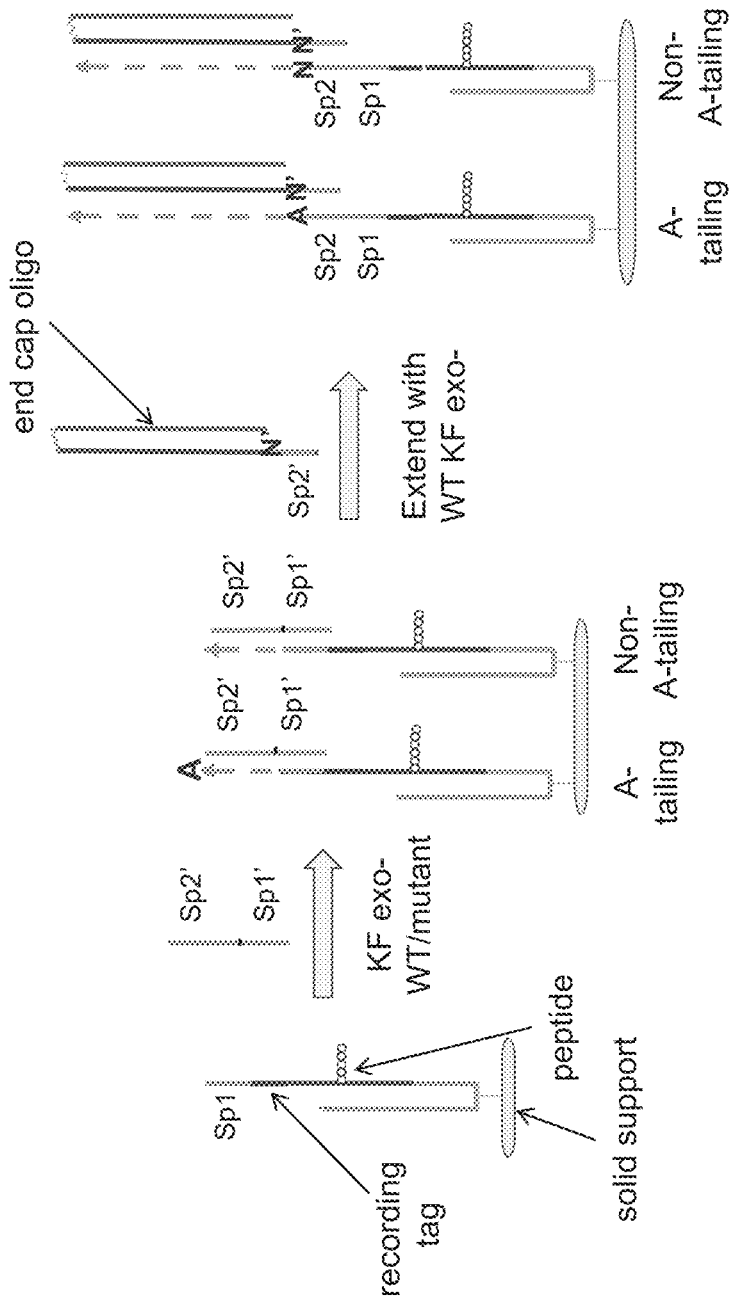
FIG. 4A-B. Exemplary quantification of the template independent nucleotide addition on a solid support. The mark (') in this and the following Figures designates a complementary oligonucleotide or nucleotide.

Example 6. Quantification of Template Independent Nucleotide Addition Activity for Klenow Fragment Exo- Wild Type Enzyme and its R754 Mutants on a Solid Support The recording tag-polypeptide conjugates were immobilized on a solid support as described in Example 2. The oligo Sp1'-Sp2' (400 nM) were served as a template for the primer extension reaction on the solid support. Different concentrations of Klenow Fragment exo- wild type or mutants were used for extension in presence of dNTP mixture (125 uM of each dNTP), 50 mM Tris-HCl (pH, 7.5), 2 mM MgSO$_4$, 50 mM NaCl, 1 mM DTT, 0.1% Tween 20, and 0.1 mg/mL BSA, followed by washes with PBST, 0.1 M NaOH+0.1% Tween-20, and PBST. After the extension, two population of products were generated: with template independent nucleotide addition (A-tailing) or without template independent nucleotide addition (no A-tailing). Since Klenow Fragment exo- enzyme mainly inserts "A" nucleotide as the template independent nucleotide addition, A-tailing and non-A-tailing are used in FIG. 4A to represent these two populations. An end cap oligo (400 nM) with primer binding site for PCR and NGS contains a random nucleotide at the position opposite to the template independent nucleotide addition site. The end cap oligo was incubated with the extended samples in presence of Klenow fragment (3'→5' exo-) (WT, MCLAB, USA), dNTP mixture (125 uM of each dNTP) at 25° C. for 10 min in presence of the same extension buffer condition (FIG. 4A). As a result, the A-tailing samples were with "A" at the fixed template independent nucleotide addition site, while the non-A-tailing sample copied the N' nucleotide at that site (FIG. 4A).

Figure 4B:
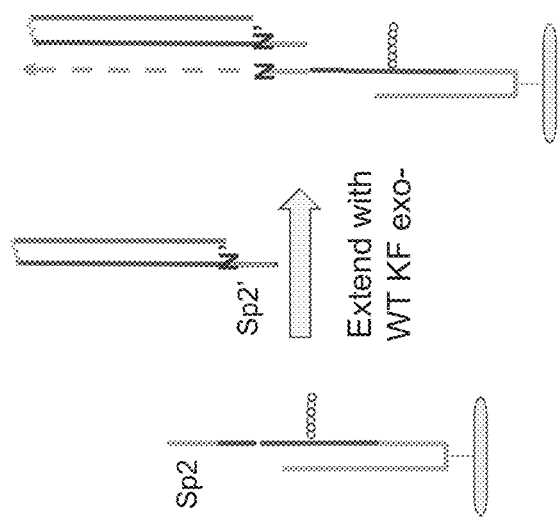

In the control experiment, to understand the nucleotide composition of the N' nucleotide, DNA with recording tags attached to the same solid surface was designed to be extendable without the previous extension (FIG. 4B). The DNA were extended in presence of 0.125 U/uL Klenow fragment (3'→5' exo-) (WT, MCLAB, USA), dNTP mixture (125 uM of each dNTP) at 25° C. for 10 min with the same extension buffer condition.

To calculate the A-tailing yield, the following function has been used: Y=(X−C)/(1−C). Y represent A-tailing yield, X is the fraction of "A" base among the 4 bases at the terminal position after the first extension reaction, and C is the fraction of "A" at the terminal position in the control experiment (see FIG. 4B). One assumption in the calculation was that template independent nucleotide addition only insert "A", but no other nucleotides. The results of the measurements are summarized in Table 2. Wild type generated high yield of A-tailing (>47%), while less than 3% A-tailing yield has been observed for L, Y, H, Q, E, and A mutants. The A-tailing ability of R754K mutant was between the wild type and the other mutants, which was consistent with in-solution data in FIG. 2B.

TABLE 2

The yields of A-tailing during primer extension reaction for KF exo- WT and mutant enzymes as determined by the function: Y = (X − C)/(1 − C).

| Enzyme | conc, nM | | | |
|---|---|---|---|---|
| | 62.5 | 125 | 313 | 625 |
| WT | 47.1% | n.d. | 84.6% | 85.2% |
| R754K | 6.7% | 20.3% | 26.9% | 29.5% |
| R754L | 0.7% | 0.7% | 0.7% | 1.2% |
| R754Y | n.d. | 0.1% | 1.2% | 1.4% |
| R754H | 1.6% | 1.5% | 2.9% | 1.5% |
| R754Q | n.d. | 0.1% | 0.4% | 0.4% |
| R754E | n.d. | 0.0% | 0.8% | 0.7% |
| R754A | n.d. | 0.1% | 0.5% | 0.5% | n.d.—not determined.

Example 7. Exemplary Multicycle Encoding Assay with KF Exo- WT and Mutants

In this example, were immobilized on a solid support as in Example 2. For the encoding assay described in this Example, a cognate test peptide, FSGVAMPGAE-DDVVGSGSK(azide) (SEQ ID NO: 16), and a non-cognate test peptide, AFSGVAMPGAEDDVVGSGSK(azide) (SEQ ID NO: 17), conjugated to DNA recording tags (/5Phos/CGACGCTCT/iAmMC6T/CCGATCTNNNTTGT-CACACTAC, SEQ ID NO: 24, and /5Phos/CGACGCTCT/iAmMC6T/CCGATCTNNNAGGACACACTAC, SEQ ID NO: 25, respectively) were used. The recording tag-polypeptide conjugates were joined to immobilized bead-attached capture DNA (SEQ ID NO: 18) essentially as described in Example 2. DNA-polypeptide conjugates (20 nM) were annealed to the capture DNAs attached to beads in 5×SSC, 0.02% SDS, and incubated for 30 minutes at 37° C. The beads were washed once with PBST and resuspended in 1× Quick ligation solution (New England Biolabs, USA) with T4 DNA ligase. After a 30-minute incubation at 25° C., and the beads were washed with PBST, two times of 0.1M NaOH+0.1% Tween 20 and twice of PBST.

The exemplary binding agent, an engineered F-binder which has affinity specifically to N-terminal phenylalanine residues of polypeptides, was used in this example to recognize the target conjugates. The F-binder was engineered from ClpS2 (obtained by Phage display library screening as disclosed in US 2021/0208150 A1). The F-binder was expressed as a fusion with SpyCatcher protein, and the fusion was reacted to SpyTag-coding tag fusion (the coding tag was attached to SpyTag via a PEG linker, as described in US 2021/0208150 A1) leading to the F-binder-coding tag conjugate, used further during the encoding assay. The coding tags used in the assay comprised barcodes containing identifying information for the F-binder, and coding tags were different for each cycle of the assay.

Each encoding cycle of the encoding assay described in this example consists of contacting the immobilized peptides with the F-binder-coding tag conjugate, followed by transferring information of the coding tag to the recording tags associated with the peptides by a primer extension reaction after partial hybridization between the coding tag and the recording tag through a shared spacer region using a DNA polymerase having 5'-to-3' polymerization activity and having substantially reduced 3'-to-5' exonuclease activity. After the recording tag extension, the F-binder-coding tag conjugate is washed away, and the immobilized peptides with associated extended recording tags are ready for the next cycle of encoding. In the encoding assays of this and the following Examples, the same F-binder is used in each encoding cycle, but conjugated with cycle-specific coding tags, so a different binder coding tag conjugate is used in each encoding cycle. The cycle-specific coding tags allow to evaluate efficiency of encoding (information transfer) during each encoding cycle by analyzing extended recording tag sequences.

In this Example, multicycle encoding reactions were carried out using either Klenow Fragment exo- wild type enzyme or one of its mutants to perform the primer extension reaction. The efficiencies of the encoding reactions were evaluated based on yield (based on fractions of recording tag reads encoded) and background signal (fractions of recording tag reads encoded generated on the non-cognate peptide). Under optimal conditions, the coding tag and the recording tag form hybridization complex via hybridization of the corresponding spacer regions mostly when the F-binder binds to the cognate peptide (which has F at the N-terminus). During each cycle the recording tag incorporates the coding tag barcode if the extension reaction occurs. Sequencing of recording tags after each cycle is used to estimate the fraction of recording tags being extended (encoded). If the spacer region length is longer than optimal, hybridization between the coding tag and the recording tag of a non-cognate peptide can occur even without the binding of the F-binder to the peptide, thus creating a non-specific signal and making essentially impossible to identify the component of the peptide to which the binding agent has affinity. In this experiment, both specific (generated from the cognate peptide) and non-specific (generated from the non-cognate peptide) signals were assessed after each encoding cycle and shown in FIG. 5A-B.

The F-binder with the coding tag (50 nM) was incubated with the recording tag-peptide conjugates immobilized on the beads for 15 min at 25° C., followed by washing with (500 mM NaCl, 3 mM Na$_2$HPO$_4$, 1.1 mM KH$_2$PO$_3$ and 0.1% Tween 20, pH 7.4). The beads were incubation with 125 nM KF exo- wild type or its mutants for 10 min at 25° C. in presence of 50 nM cycle cap oligo (for the extension of non-encoded DNA), dNTPs (each at 125 uM), 50 mM Tris-HCl (pH, 7.5), 2 mM MgSO$_4$, 50 mM NaCl, 1 mM DTT, 0.1% Tween 20, and 0.1 mg/mL BSA. The samples were washed with either PBST, 0.1 M NaOH+0.1% Tween 20, and PBST at 25 C (for 2 cycle encoding); or PBST, PBST+30% formamide at 50° C. for 5 min, and PBST (for 5 cycle encoding).

After the encoding cycles, the sample were finally introduced with primer binding site for PCR and NGS by incubation of 400 uM of an capping oligo (GAAGAGTAATTAGATCGGAAGAGCACACGTCT-GAACTC/iSp18/GACTGGAGTTCAG ACGTGTGCTCTTCCGATCTAAT-TACTCTTCTAGAGATGG/3SpC3/ (for 2 cycle encoding, SEQ ID NO: 19) or GAAGAGTAATTAGATCG-GAAGAGCACACGTCTGAACTC/iSp18/GACTG-GAGTTCAG ACGTGTGCTCTTCCGATCTAAT-TACTCTTCTGGAGTTAG/3SpC3/ (for 5 cycle encoding, SEQ ID NO: 20) with 0.125 U/uL of WT Klenow fragment (3'→5' exo-), dNTPs (each at 125 uM), 50 mM Tris-HCl (pH, 7.5), 2 mM MgSO$_4$, 50 mM NaCl, 1 mM DTT, 0.1% Tween 20, and 0.1 mg/mL BSA at 25° C. for 10 min.

Figure 5A:
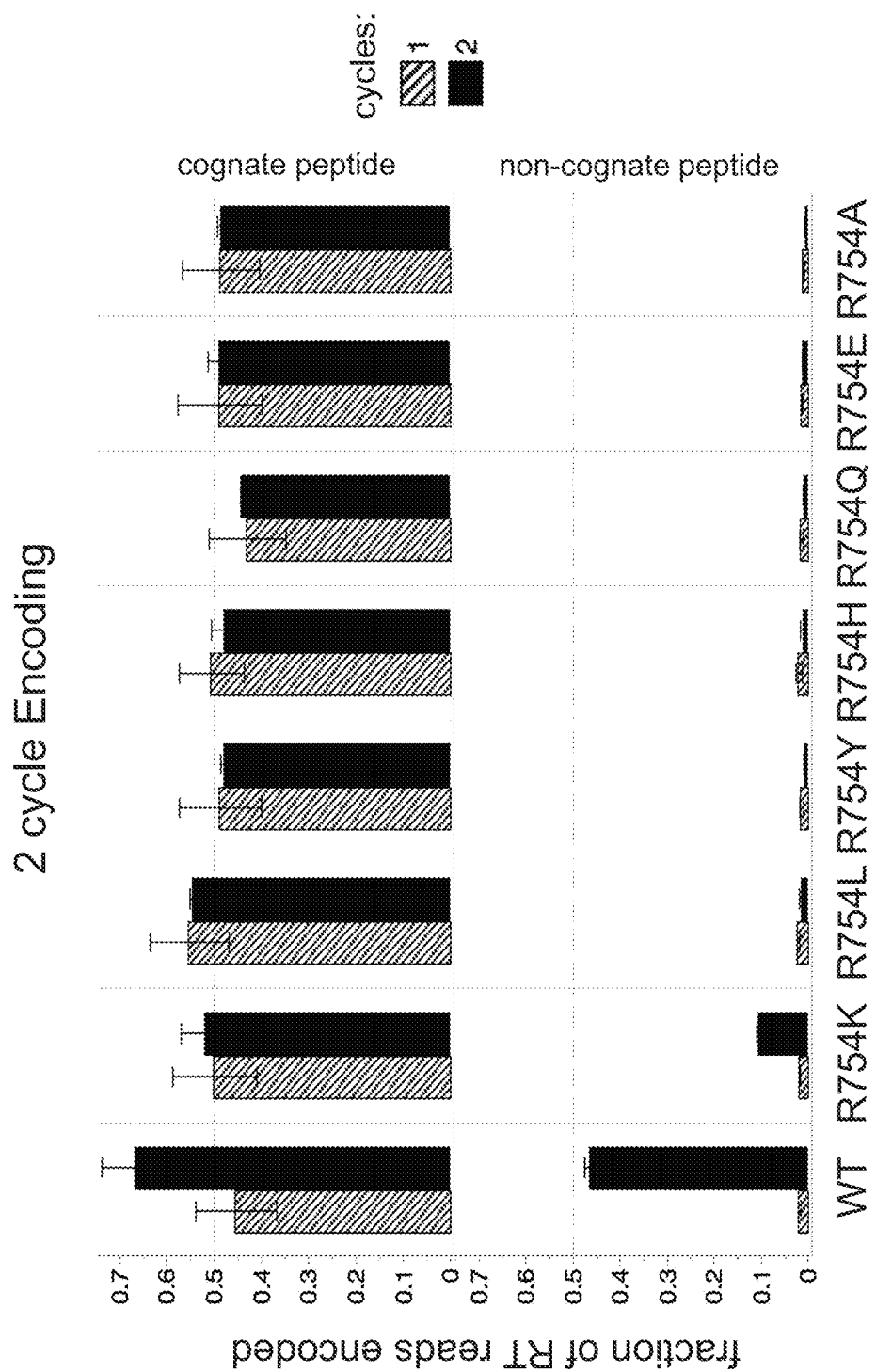
FIG. 5A-B. Exemplary multicycle encoding assay for Klenow Fragment exo-WT enzyme and its mutants. See Example 7 for details. The encoding yields were shown as fractions of recording tag (RT) reads encoded.
Figure 5B:
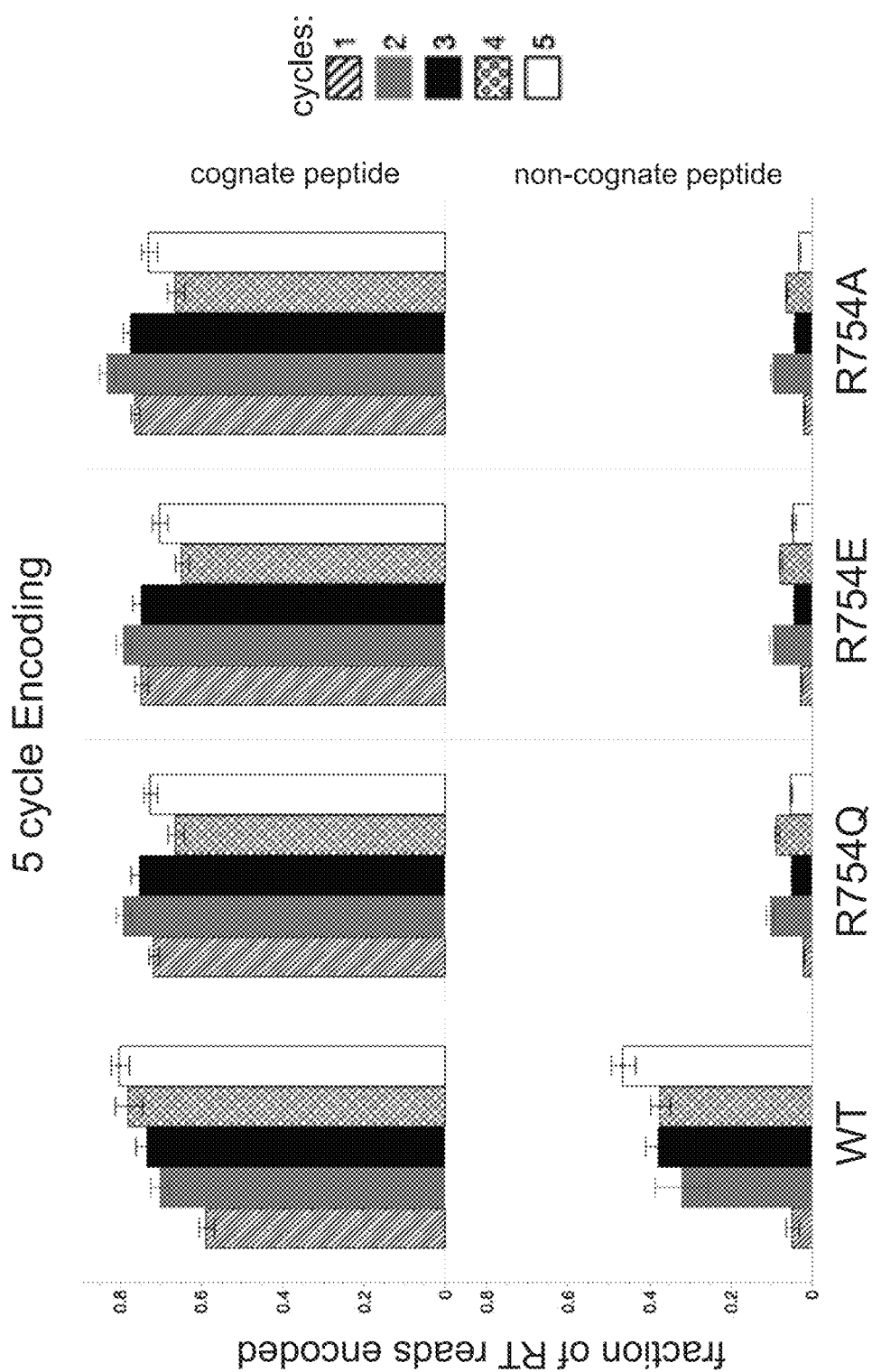

Exemplary encoding results generated by the described five cycles encoding method are shown in FIG. 5A-B. The following coding tags were used with the F-binder in the following cycles: cycle 1:

SEQ ID NO: 30
/5AmMC6//iSP18/GTCGCTCTTACC/iSP18/

GGTAAGAGCGACTGTAGTGTG/3SpC3/,;
cycle 2:

SEQ ID NO: 31
/5AmMC6//iSP18/TCGGCCATCTCT/iSP18/

AGAGATGGCCGATGGTAAGAG/3SpC3/,;
cycle 3:

SEQ ID NO: 32
/5AmMC6//iSP18/CGTGCCATAACC/iSP18/

GGTTATGGCACGTAGAGATGG/3SpC3/,;
cycle 4:

SEQ ID NO: 33
/5AmMC6//iSP18/CGCAACCTCTAC/iSP18/

GTAGAGGTTGCGTGGTTATGG/3SpC3/,;
cycle 5:

SEQ ID NO: 34
/5AmMC6//iSP18/GATTCTAACTCC/iSP18/

GGAGTTAGAATCTGTAGAGGT/3SpC3/,.

When wild type Klenow Fragment exo- enzyme was used during primer extension, a high non-specific signal generated from the non-cognate peptide was observed starting from the second cycle. The reason for this non-specific signal was an increase in the spacer region length after primer extension due to significant template independent nucleotide addition, which effectively adds an extra "A" (A-tailing) to the spacer region. Eliminating A-tailing by utilizing the KF exo- mutants R754Q, R754E or R754A generated much less non-specific signal during multi-cycle encoding, while preserving the specific signal generated from the cognate peptide (FIG. 5A-B). The ratio between the specific signal and non-specific signal produced during multi-cycle encoding was at least 5 or more.

Figure 6A:
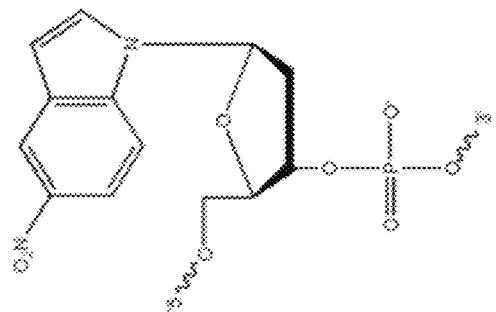

Example 8. The in Solution Primer Extension Test for Klenow Fragment Exo-DNA Polymerase (KF Exo-) Wild Type (WT) Enzyme Utilizing Polynucleotides Having an Incorporated 5-Nitroindole at the 5' End This example explores another approach to reduce or prevent template independent nucleotide addition by the DNA polymerase during the primer extension reaction, namely incorporation of a nucleic acid base analogue, such as 5-Nitroindole (FIG. 6A) at the 5' end of the polymerization template.

Figure 6B:
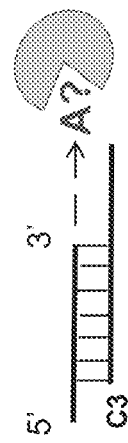
Figure 6B:
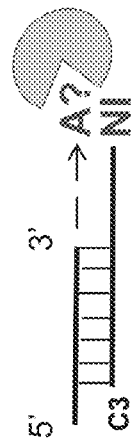
Figure 6C:
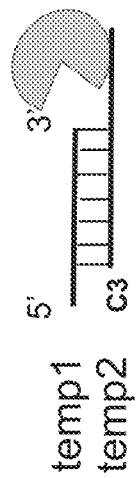
Figure 6C:
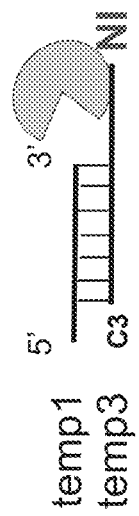

Two partially complementary oligonucleotides (temp1, SEQ ID NO: 12 and temp2, SEQ ID NO: 13) with 1:1 ratio were annealed by heating to 95° C. and slowly cooling down to perform a primer extension reaction. The temp2 oligo has a C3 terminal addition to prevent primer extension on the temp1 template (FIG. 6B). The temp3 oligonucleotide (SEQ ID NO: 23 has the same sequence as the temp2 oligo, and additionally contained an incorporated 5-Nitroindole at the 5' end. The primer extension reactions were performed on temp1-temp2 and temp1-temp3 oligo pairs (FIG. 6B-C) using different KF exo- enzyme concentrations and incubation times, and the efficiencies of template independent nucleotide addition (A-tailing) were evaluated based on gel electrophoresis (FIG. 6D-E).

In FIG. 6D, 0.5 uM of annealed dsDNA substrates were incubated with different concentrations (1-625 mU/ul) of KF exo- enzyme at 25° C. for 5 min in presence of dNTP mixture (125 uM of each dNTP), 50 mM Tris-HCl (pH, 7.5), 2 mM MgSO4, 50 mM NaCl, 1 mM DTT, 0.1% Tween 20, and 0.1 mg/mL BSA. The reactions were stopped by 90% formamide and 10 mM EDTA, and the samples were loaded in to 15% TBE-Urea gel for separation. In FIG. 6E, the same reaction conditions were used together with 125 mU/uL of KF exo- enzyme and different incubation times (from 1 to 20 min). FIG. 6D-E show the results of gel electrophoresis resolving products of primer extension reactions.

Under conditions tested, without 5-Nitroindole incorporation (left sides of FIG. 6D-E), the KF exo- enzyme shows almost 100% template independent nucleotide addition with increased concentration (higher than 125 mU/ul) or reaction time (10 min or more), which can be observed by appearance of the extended product (Ext+A, 25 nt, SEQ ID NO: 15). In contrast, with 5-Nitroindole incorporation into the template (right sides of FIG. 6D-E), the KF exo-enzyme shows only moderate template independent nucleotide addition at the highest concentration tested (625 mU/ul) or during the longest reaction time (20 min), wherein almost no template independent nucleotide addition was observed under other tested conditions, which can be observed by absence of the extended product (Ext+A, 25 nt, SEQ ID NO: 15) in the corresponding reactions (right sides of FIG. 6D-E). Thus, 5-Nitroindole incorporation at the 5' end of the polymerization template can effectively suppress template independent nucleotide addition by the DNA polymerase during the primer extension reaction.

Example 9. Reducing Template Independent Nucleotide Addition Ability by Incorporation of 5-Nitroindole to the Coding Tags in a Multi-Cycle Encoding Assay For the encoding assay described in this Example, a cognate peptide, FSGVARGDVRGGK(azide) (SEQ ID NO: 21), and a non-cognate peptide, LAESAFSG-VARGDVRGGK(azide) (SEQ ID NO: 22), conjugated to DNA recording tags (/5Phos/CGACGCTCT/iAmMC6T/ CCGATCTNNNTACACACACTAC, SEQ ID NO: 26, and /5Phos/CGACGCTCT/iAmMC6T/CCGATCTNNNCTTA-CACACTAC, SEQ ID NO: 27, respectively) were used. The recording tag-peptide conjugates were attached on the same solid support (a bead) as described in Example 2, and the F-binder described in Example 7 was used during encoding, conjugated to cycle-specific coding tags that contained an "X" moiety (see FIG. 7A). "X" represents either 5-Nitroindole (for the assay with 5-Nitroindole) or none (for the control assay).

Figure 7A:
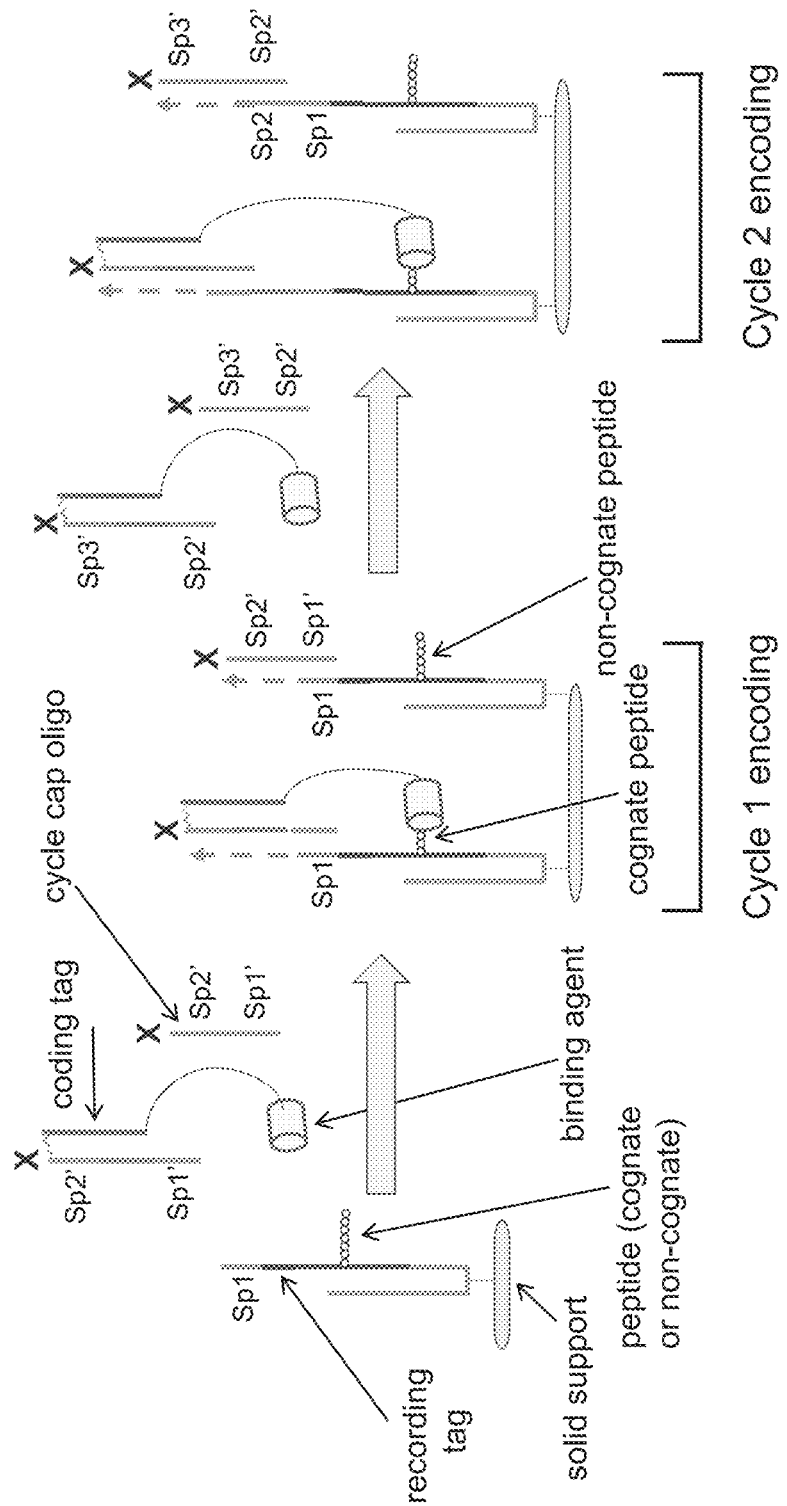
FIG. 7A-C. Exemplary reduction of template independent nucleotide addition ability by incorporation of 5-Nitroindole to the coding tags in a multi-cycle encoding assay.

For the encoding assay, the F-binder with associated coding tag (50 nM) was incubated with the recording tag-peptide conjugates immobilized on the beads for 15 min at 25° C., followed by washing with (500 mM NaCl, 3 mM $Na_2HPO_4$, 1.1 mM $KH_2PO_4$ and 0.1% Tween 20, pH 7.4) to wash away excess of unbound binding agents. The coding tags contained at the 3' end a spacer region (sp1') complementary to the sp1 spacer region of the recording tags. Then, for the extension of non-encoded DNA, the samples were incubated with 0.125 U/uL of wild type (WT) Klenow fragment (3'→5' exo-) for 5 min at 25° C. in presence of 50 nM cycle cap oligo, dNTPs (each at 125 uM), 50 mM Tris-HCl (pH=7.5), 2 mM $MgSO_4$, 50 mM NaCl, 1 mM DTT, 0.1% Tween 20, and 0.1 mg/mL BSA (FIG. 7A). The beads were washed once with 0.1 M NaOH+0.01% Tween 20 and twice with PBST. The information of the coding tag was transferred to the recording tag, thereby generating an extended recording tag. The other recording tags (conjugated to the non-cognate peptide) were extended using the cycle-capping oligo (FIG. 7A). To complete the described encoding cycle, the samples were washed with either PBST, 0.1 M NaOH+0.1% Tween 20, and PBST at 25° C. (for 2 cycles encoding); or PBST, PBST+30% formamide at 50° C. for 5 min, and PBST (for 5 cycles encoding). The cycles were repeated one more time (for 2 cycles encoding, FIG. 7B), or four more times (for 5 cycles encoding, FIG. 7C).

For next-generation sequencing (NGS), the recoding tags were capped to add a universal priming sequence. The extended recording tags of the assay were subjected to PCR amplification and analyzed by NGS. Encoding yield was obtained by calculating the percentage of recoding tags containing coding tag's barcode information that was transferred during the primer extension reaction (designated as fraction of RT reads encoded).

Figure 7B:
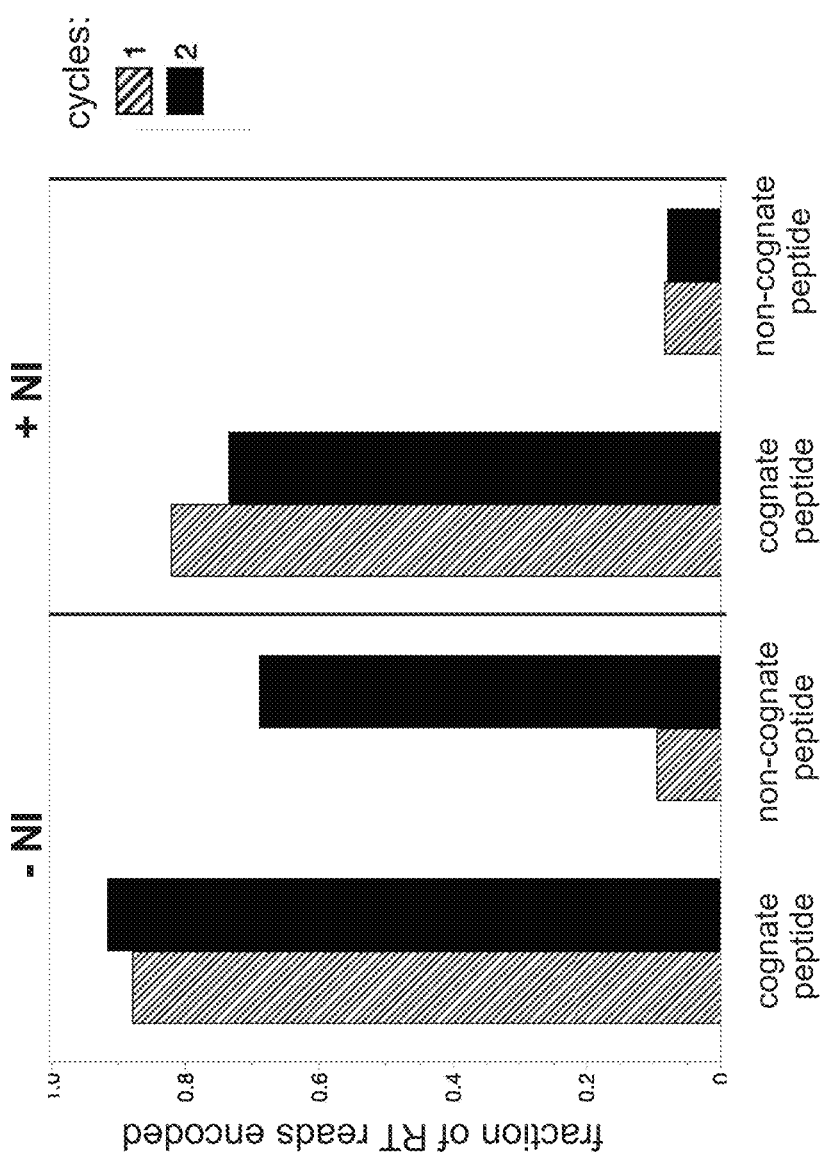
Figure 7C:
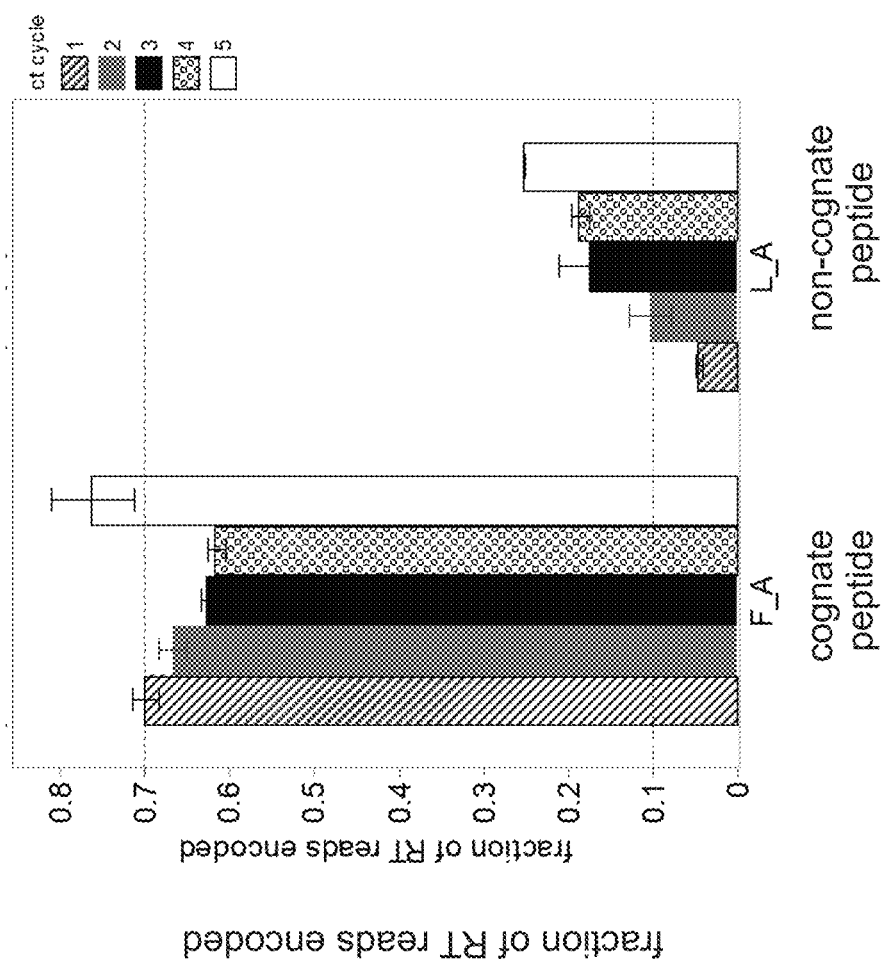

In this experiment, both specific (generated from the cognate peptide) and non-specific (generated from the non-cognate peptide) signals that reflect encoding yields were assessed after each encoding cycle and shown in FIG. 7B-C.

When wild type Klenow Fragment exo- enzyme was used during primer extension and there was no 5-Nitroindole incorporation in the coding tags, a high non-specific signal generated from the non-cognate peptide was observed starting from the second cycle (FIG. 7B, left side). The reason for this non-specific signal was an increase in the spacer region length after primer extension due to significant template independent nucleotide addition, which effectively adds an extra "A" (A-tailing) to the spacer region. Reducing A-tailing by utilizing the 5-Nitroindole incorporation in the coding tags generated much less non-specific signal during multi-cycle encoding, while preserving the specific signal generated from the cognate peptide (FIG. 7B, right side, and FIG. 7C). The ratio between the specific signal and non-specific signal produced during multi-cycle encoding was at least 5 or more for 2 cycle encoding.

Five cycle encoding was also conducted using the described method, and the encoding yields in the assay with the 5-Nitroindole incorporation in the coding tags were higher than 60% for all five cycles for the cognate peptide (specifically recognized by the binding agent), while the non-specific signals were low for the non-cognate peptide (FIG. 7C).

To calculate A-tailing yield during extension reactions with the 5-Nitroindole incorporation, the experiments were conducted similar to described in Example 6. The cycle cap oligo Sp1'-Sp2' (50 nM) with or without the 5-Nitroindole were served as a template for the primer extension reaction on the solid support. Klenow fragment (3'→5' exo-) (0.125 U/uL, MCLAB, USA) were used for extension in presence of dNTP mixture (125 uM of each dNTP), 50 mM Tris-HCl (pH, 7.5), 2 mM $MgSO_4$, 50 mM NaCl, 1 mM DTT, 0.1% Tween 20, and 0.1 mg/mL BSA at 25° C. for 5 min, followed by subsequent washes with PBST, 0.1 M NaOH+0.1% Tween-20, and PBST. After the extension, two population of products were generated: with template independent nucleotide addition (A-tailing) or without template independent nucleotide addition (no A-tailing). An end cap oligo (400 nM) with primer binding site for PCR and NGS contains a random nucleotide at the position opposite to the template independent nucleotide addition site. The end cap oligo was incubated with the extended samples in presence of Klenow fragment (3'→5' exo-) (0.125 U/uL, MCLAB, USA), dNTP mixture (125 uM of each dNTP) at 25° C. for 10 min in presence of the same extension buffer condition. As a result, the A-tailing samples were with nucleotide "A" at the template independent nucleotide addition site (most common), while the non-A-tailing sample copied the N' nucleotide at that site (FIG. 4A).

In the control experiment, to understand the nucleotide composition of the N' nucleotide, DNA with recording tags attached to the same solid surface was designed to be extendable without the previous extension (FIG. 4B). The DNA were extended in presence of 0.125 U/uL Klenow fragment (3'→5' exo-) (WT, MCLAB, USA), dNTP mixture (125 uM of each dNTP) at 25 C for 10 min with the same extension buffer condition.

To calculate the A-tailing yield, the following function has been used: $Y=(X-C)/(1-C)$. Y represent A-tailing yield, X is the fraction of "A" nucleotide among the 4 nucleotides at the template independent nucleotide addition position after the first extension reaction, and C is the fraction of "A" at the template independent nucleotide addition in the control experiment. One assumption in the calculation was that template independent nucleotide addition only insert "A", but no other nucleotides. The results of the measurements are summarized in Table 3. Three different sequences for cycle cap oligos have been tested for A-tailing. The cycle cap oligos were with or without 5NI. For the oligos without 5NI, the A-tailing % were above 66%, while for the oligos with 5NI, the number decreased to 6.1-9.5%. In conclusion, the non-template addition efficiency (A-tailing efficiency) was dramatically reduced by introduction of 5NI.

TABLE 3

The yields of A-tailing during primer extension reaction for KF exo- WT and mutant enzymes as determined by the function: Y = (X-C)/(1-C). n.d. - not determined.

| cycle cap oligo name | cycle cap DNA sequence | A tailing % for cycle cap with 5NI | A tailing % for cycle cap without 5NI |
|---|---|---|---|
| CSC_AB | (/5-NitInd/) GGTAAGAGTGTAGTGTG /3SpC3/ | 9.5% | 78.5% |
| CSC_BC | (/5-NitInd/) AGAGATGGTGGTAAGAG/ 3SpC3/ | 6.1% | 66.7% |
| CSC_EF | (/5-NitInd/) GGAGTTAGTGTAGAGGT/ 3SpC3/ | 6.9% | 72.1% |

Example 10. Exemplary Encoding that Utilizes a High Yield of Template Independent Nucleotide Addition (A-Tailing) and Shortened Spacer Region for Hybridization of the Coding Tag and the Recording Tag During the Primer Extension Reaction In this example, an alternative approach for controlling template independent nucleotide addition (A-tailing) generated by the DNA polymerase during the primer extension reaction is described. While in Examples 5-9 the yield of template independent nucleotide addition (A-tailing) was significantly reduced (below 10%) by utilizing engineered KF exo-enzyme mutants (below 3%) or by incorporation of nucleotide analogues (below 10%), in this example the yield of template independent nucleotide addition was intentionally increased to 80% or more. Such conditions effectively generate an extra "A" nucleotide during the primer extension reaction in the spacer region of extended recording tags. To utilize this, the spacer region was reduced by one nucleotide (nt), and this 7 nt spacer plus the extra "A" from A-tailing were used for hybridization of the coding tag and the recording tag during the primer extension reaction. Optimal spacer region depends on binding affinity of the binding agents utilized during encoding (the higher affinity of the binding agents—the less is the optimal spacer region length. For binding agents having binding affinity within 10-100 nM, 8 nt spacer region is used typically (see Examples 7 and 9). Therefore, a shortened spacer region length was set to 7 nt and was combined with conditions to increase the yield of template independent nucleotide addition. For binding agents having binding affinity of less than 10 nM, an optimal spacer region length may be less than 8 nt, but this may be sequence dependent.

Figure 8:
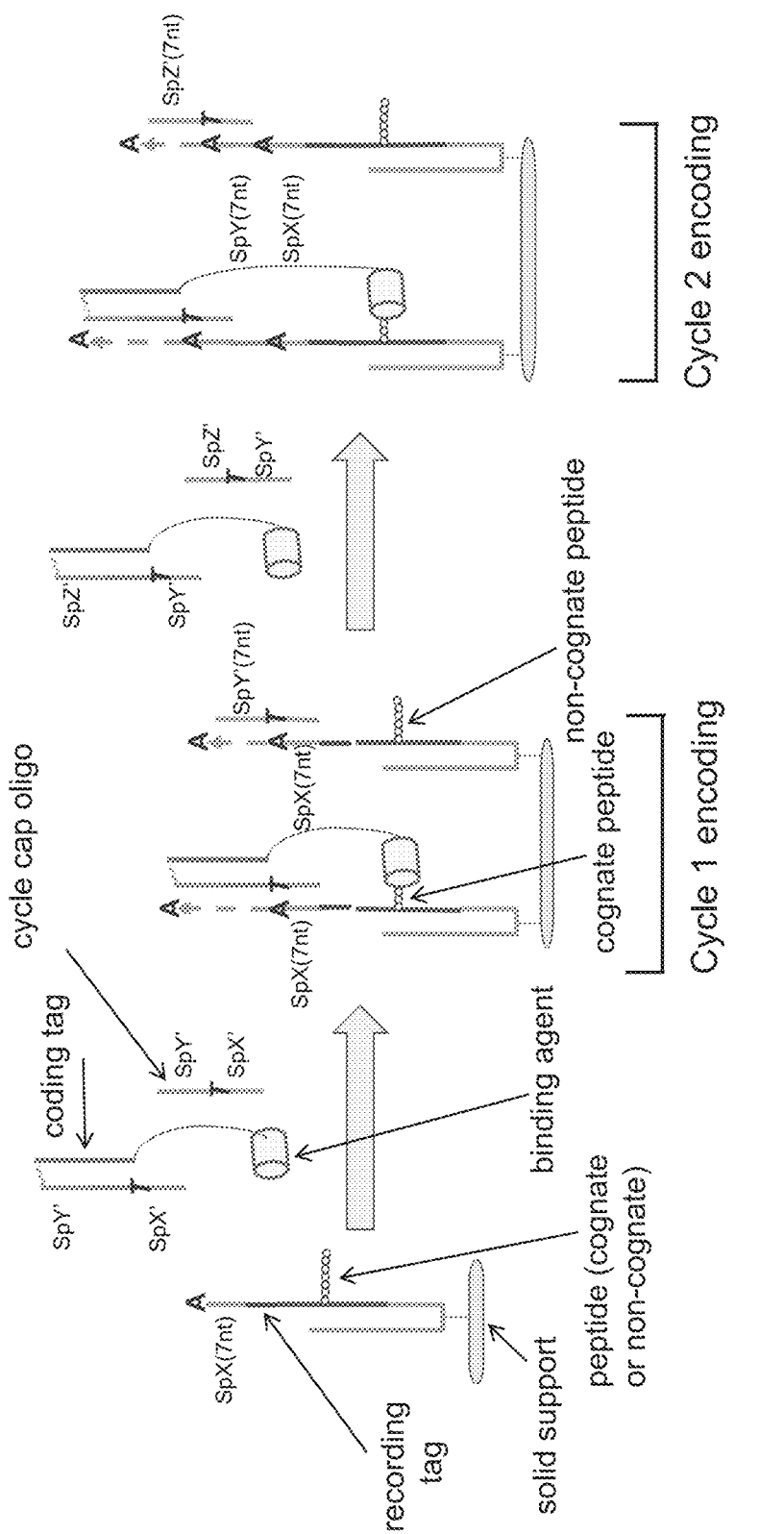
FIG. 8. Exemplary control of the optimal spacer region length during encoding using a shortened spacer region (7 nt) in combination with conditions to increase the yield of template independent nucleotide addition. Two cycles of encoding are shown, and the process can be repeated for 4 or more times (generating, e.g., five cycles encoding). Encoding conditions are provided in Example 10. The binding agent with associated coding tag is used for encoding, and cycle cap oligo is also added to cap recording tags of recording tag-peptide conjugates that failed to be extended during the current encoding cycle.

For the encoding assay described in this Example, a cognate peptide, FSGVARGDVRGGK(azide) (SEQ ID NO: 21), and a non-cognate peptide, LAESAFSG-VARGDVRGGK(azide) (SEQ ID NO: 22), conjugated to DNA recording tags (/5Phos/CGACGCTCT/iAmMC6T/ CCGATCTNNNTACTCTTAACCA, SEQ ID NO: 28, and /5Phos/CGACGCTCT/iAmMC6T/CC-GATCTNNNTGCACTTAACCA, SEQ ID NO: 29, respectively) were used. The recording tag-peptide conjugates were attached on the same solid support (a bead) as described in Example 2, and the F-binder described in Example 7 was used during encoding, conjugated to cycle-specific coding tags. The recording tag of the conjugates contained a 7 nt spX spacer region followed by "A" at the 3' end. The binding agent with associated coding tag (50 nM) was incubated with the recording tag-peptide conjugates immobilized on the beads for 15 min at 25° C., followed by washing with ((500 mM NaCl, 3 mM $Na_2HPO_4$, 1.1 mM $KH_2PO_3$ and 0.1% Tween 20, pH 7.4)_to wash away excess of unbound binding agents. The coding tags contained at the 3' end a spacer region ("T"+spX') complementary to the spX+"A" of the recording tags. Then, to allow information transfer, the samples were incubated with wild type (WT) Klenow fragment (3'→5' exo-) (0.625 U/uL) of for 10 min at 25° C. in presence of 50 nM cycle cap oligo (for the extension of non-encoded DNA), dNTPs (each at 125 uM), 50 mM Tris-HCl (pH, 7.5), 2 mM $MgSO_4$, 50 mM NaCl, 1 mM DTT, 0.1% Tween 20, and 0.1 mg/mL BSA (FIG. 8).

The described conditions favor efficient A-tailing during the extension reaction, which was measured by the approach described in Example 6 above. The calculated yields of A-tailing for different concentrations of the Klenow fragment (3'→5' exo-) (MCLAB, USA) under described conditions are shown in Table 4.

TABLE 4

Yields of A-tailing for different concentrations of the Klenow fragment (3'->5' exo-) (MCLAB, USA).

| | Klenow fragment (3'->5' exo-), U/uL | | | | |
|---|---|---|---|---|---|
| | 0.025 | 0.05 | 0.125 | 0.25 | 0.625 |
| Yield of A-tailing (%) | 35.4% | 56.8% | 71.9% | 81.9% | 85.3% |

Since the calculated A-tailing yield for Klenow fragment (3'→5' exo-) at 0.625 U/uL was about 85%, an extra "A" were expected to be inserted after the extension reaction to form a 8 nt spacer region in the recording tag to be used in the next encoding cycle. The samples were washed with either PBST, 0.1 M NaOH+0.1% Tween 20, and PBST at 25° C. (for 2 cycles encoding); or PBST, PBST+30% formamide at 50° C. for 5 min, and PBST (for 5 cycles encoding).

After the encoding cycles, the sample were finally capped by introducing with primer binding site for PCR and NGS with incubation of 400 uM of an end capping oligo with 0.125 U/uL of Klenow fragment (3'→5' exo-), dNTPs (each at 125 uM), 50 mM Tris-HCl (pH, 7.5), 2 mM MgSO$_4$, 50 mM NaCl, 1 mM DTT, 0.1% Tween 20, and 0.1 mg/mL BSA at 25° C. for 10 min.

Figure 9A:
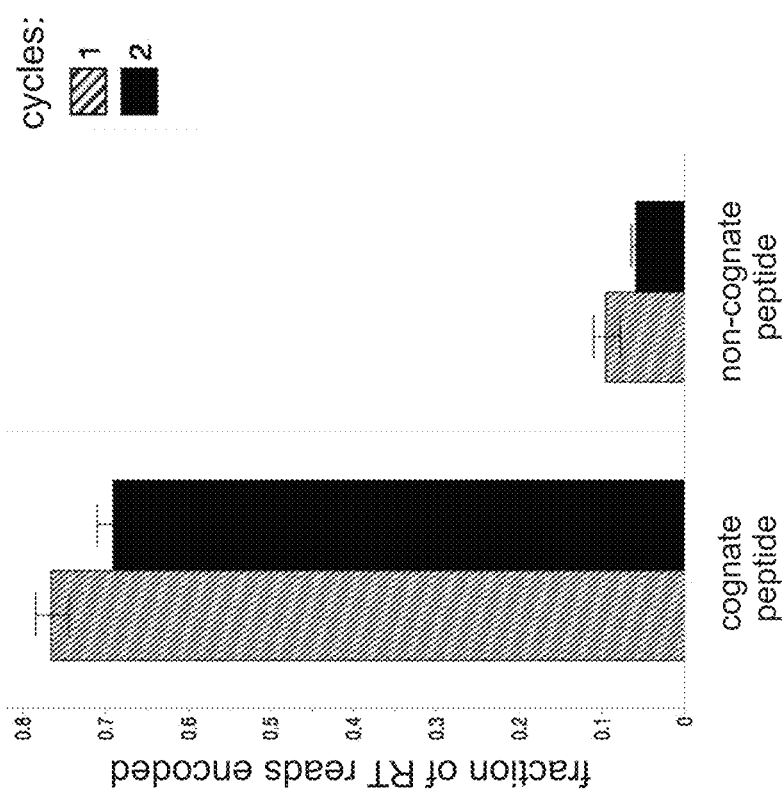
FIG. 9A-B. depicts two cycles of exemplary encoding data.
Figure 9B:
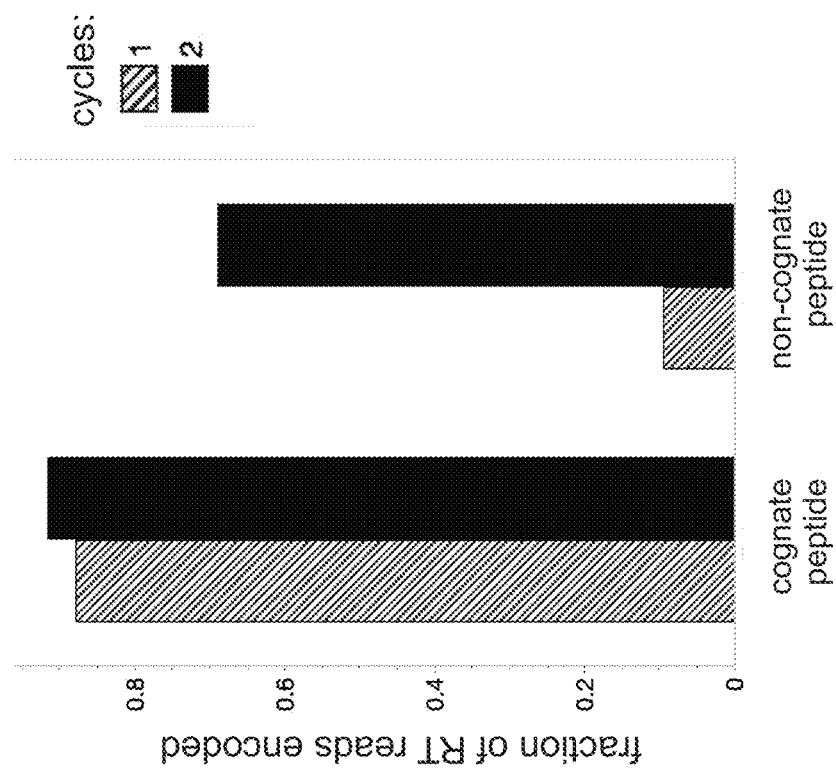

Two cycles encoding were conducted using the described method, and the encoding yields were about 70% for both cycles for the cognate peptide (specifically recognized by the binding agent), while the non-specific signals were low for the non-cognate peptide (FIG. 9A). In contrast, a similar two cycles encoding with the recording tags having 8 nt spacer region produced high non-specific signals for the non-cognate peptide at the second encoding cycle (FIG. 9B) even with reduced concentration of Klenow fragment (3'→5' exo-) (0.125 U/uL) and reduced incubation time (5 min). It means that extending the recording tag spacer region beyond optimal 8 nt length due to A-tailing generates non-specific signal likely due to non-specific nucleic acid interactions. Thus, a tight control over optimal recording tag spacer region length is required to maintain a low non-specific signal for the non-cognate peptides during multicycle encoding reactions.

Five cycle encoding was also conducted using the described method, and the encoding yields were higher than 65% for all five cycles for the cognate peptide (specifically recognized by the binding agent), while the non-specific signals were low for the non-cognate peptide (FIG. 10).

Finally, the R754A KF exo- mutant enzyme at 125 nM concentration was used during the described encoding assay instead of the Klenow fragment (3'→5' exo-) (MCLAB, USA), and the mutant enzyme had only 0.1% A-tailing yield (see also Table 2).

When the mutant enzyme was used in combination with the recording tags having 7 nt spacer region during the described encoding assay, majority of the recording tags have not been extended, and as a result, the recording tags were not sequenced, since the 7 nt spacer region does not provide sufficient length for coding tag oligo or cycle cap oligo to hybridize under the experimental conditions. As a result, much less extended recording tags were generated and the specific signal was low (data not shown).

Thus, a tight control over optimal recording tag spacer region length is required to produce a high specific signal for the cognate peptide(s) and a low non-specific signal the non-cognate peptides during multicycle encoding reactions. This tight control can be achieved either by using a shortened spacer region of the recording tags combined with efficient A-tailing (preferably, more than 80%, shown in this Example), or by using an extended spacer region of the recording tags combined with negligible A-tailing (preferably, less than 10%, shown in Example 7).

Example 11. Encoding Assay for Macromolecules Other than Polypeptides

Data shown in FIGS. 5A-B, 7B and 9A-B represent analysis of the extended recording tags and confirm successful transfer of barcode information from the coding tags to the recording tags after binding of the F-binder to the peptide macromolecules. The described techniques can be easily adopted for other types of macromolecules, such as lipid, carbohydrate or macrocycle. To perform encoding assay, such macromolecules need to be immobilized on a solid support (such as beads) and associated with nucleic acid recording tag. The encoding steps remain the same regardless of the type of the macromolecule immobilized. The association with the recording tag can be direct (such as covalent attachment) or indirect (such as association through a solid support). In the latter case, the recording tag should co-localize or be in a close proximity with the macromolecule during the encoding assay. Binding agents can be chosen to bind specifically to a component of the macromolecule. Each binding agent needs to be conjugated to corresponding nucleic acid coding tag that contains a barcode with identifying information regarding the binding agent. During encoding, the barcode information is transferred to the recording tag associated with the macromolecule, generating the extended recording tag, so that binding history of the macromolecule is recorded into the extended recording tag. The binding cycle can be repeated multiple times using different binding agents interacting with the macromolecule, either separately, or in a mixture. Below, representative methods known in the art are disclosed that can be utilized for adaptation of the disclosed encoding assay for macromolecules of different types, such as a carbohydrate, a lipid or a macrocycle.

First, binding agents that can specifically bound components of a carbohydrate, a lipid or a macrocycle are known. For example, lectins are carbohydrate-binding proteins that can selectively recognize glycan epitopes of free carbohydrates or glycoproteins, and can be utilized as specific binding agents for macromolecules that contain carbohydrates. Importantly, there are known lectins that recognize different components of carbohydrates, such as mannose-binding lectins, galactose/N-acetyl glucosamine-binding lectins, sialic acid/N-acetyl glucosamine-binding lectins, fucose-binding lectins (disclosed for example, in WO2012049285 A1). Also, lipid-binding proteins are well-known and can be utilized as binding agents (see, for example, Bernlohr D A, et al., Intracellular lipid-binding proteins and their genes. Annu Rev Nutr. 1997; 17:277-303). Lipid-binding antibodies are commonly known and can be utilized as binding agents for macromolecules that contain lipids (see, for example, Alving C R. Antibodies to lipids and liposomes: immunology and safety. J Liposome Res. 2006; 16(3):157-66). Furthermore, proteins that specifically bind macrocycles are also known (see, for example, Villar E A, et al., How proteins bind macrocycles. Nat Chem Biol. 2014 September; 10(9):723-31; Hunter™, et al., Protein recognition of macrocycles: binding of anti-HIV metallocyclams to lysozyme. Proc Natl Acad Sci USA. 2005 Feb. 15; 102(7): 2288-92).

Second, an exemplary carbohydrate detection encoding assay can be performed as follows, utilizing methods known in the art.

Approach I. Reductive amination (based on Yang S J, Zhang H. Glycan analysis by reversible reaction to hydrazide beads and mass spectrometry. Anal Chem. 2012; 84(5): 2232-2238).

(a) Generate an immobilized recording tag-attached carbohydrate conjugate. Oxidize carbohydrates with sodium periodate to generate an aldehyde. Conjugate amine terminated DNA recording tag and reduce the resulting imine using sodium cyanoborohydride to generate a carbohydrate-recording tag conjugate. Preferably, hydrazide, alkoxyamine, or similarly reactive DNA may be employed to generate more stable reaction products (e.g. hydrazones) that do not require reducing agents. Immobilize DNA-coupled carbohydrate to a solid support via the DNA recording tag as described in Example 2.

(b) Generate lectin-DNA coding tag (the binding agent-coding tag) conjugates by utilizing SpyCatcher-concanavalin A (ConA) fusion as described earlier. Coding tag contains a barcode with identifying information regarding ConA.

(c) Transfer barcode information from lectin-associated coding tag to the recording tag as described in Example 2, thus analyzing whether the carbohydrate contains a component that binds to ConA.

Approach II. Diazo coupling (based on Matsuura K, et al., Facile synthesis of stable and lectin-recognizable DNA-carbohydrate conjugates via diazo coupling. Bioconjug Chem. 2000 March-April; 11(2):202-11). In approach II, step (a) (immobilization of recording tag-attached carbohydrate conjugate) can be performed as follows. 1) Aminate carbohydrate with ammonium hydrogen carbonate in water to generate β-glycosylamines; 2) Convert amine to amide with carboxylate derivatives bearing a nitrophenyl functionality. Hydrogenate nitro groups over palladium catalyst and treat with $NaNO_2$ and HCl to provide the diazo compounds.

Steps (b) and (c) are the same as in the in approach I.

Third, an exemplary lipid detection encoding assay can be performed as follows, utilizing methods known in the art.

Approach I. Fatty acids (based on Hiroshi Miwa, High-performance liquid chromatographic determination of free fatty acids and esterified fatty acids in biological materials as their 2-nitrophenylhydrazides, Analytica Chimica Acta, Volume 465, Issues 1-2, 2002, Pages 237-255, ISSN 0003-2670).
(a) Extract fatty acids from a biological source and activate carboxylic acid with EDC/CDI chemistry. Couple amine- or hydrazide-terminated DNA recording tag to generate a recording tag-attached lipid conjugate. Immobilize DNA-coupled lipid to a solid support via the DNA recording tag as described in Example 2.

Approach II. Reactive lipids (based on X. Wei & H. Yin (2015) Covalent modification of DNA by α, β-unsaturated aldehydes derived from lipid peroxidation: Recent progress and challenges, Free Radical Research, 49:7, 905-917).
(a) Obtain a reactive lipid substrate such as malondialdehyde (MDA) or 4-hydroxynonenal (HNE); couple hydrazide-terminated DNA recording tag to reactive lipid species. Alternatively, couple amine-terminated DNA recording tag to aldehyde on reactive lipid and reduce resulting imine with sodium cyanoborohydride.

In the next step for both approaches, generate a binding agent-DNA coding tag conjugate by utilizing SpyCatcher-binding agent fusion as described earlier. Coding tag contains a barcode with identifying information regarding the binding agent. Fatty acid-binding protein (FABP), other lipid binding proteins or lipid binding antibodies can be used as a binding agent. Finally, transfer barcode information from binding agent-associated coding tag to the recording tag as described in Example 2 of the present application, thus analyzing whether the lipid contains a component that binds to the binding agent.

Forth, an exemplary macrocycle (microcystin) detection encoding assay can be performed as follows, utilizing methods known in the art, based on McElhiney J, et al, Rapid isolation of a single-chain antibody against the cyanobacterial toxin microcystin-LR by phage display and its use in the immunoaffinity concentration of microcystins from water. Appl Environ Microbiol. 2002 November; 68(11):5288-95.
(a) Generate DNA recording tag-coupled microcystin by reacting dehydroalanine of microcystin with 2-mercaptoethylamine to generate a primary amine, followed by coupling DNA recording tag to primary amine using an amine reactive DNA recording tag (e.g. NHS-DNA derivative).
(b) Generate single chain antibody-SpyCatcher binding agent that recognizes microcystin. Single chain antibody production is described in McElhiney J, et al. 2002. Couple DNA coding tag to SpyTag (the coding tag contains a barcode with identifying information regarding the single chain antibody), followed by reacting with SpyCatcher to generate the binding agent-coding tag conjugate as described earlier.
(c) Transfer barcode information from single chain antibody-associated coding tag to the recording tag as described in Example 2, thus analyzing whether the macromolecule contains microcystin.

The present disclosure is not intended to be limited in scope to the particular disclosed embodiments, which are provided, for example, to illustrate various aspects of the invention. Various modifications to the compositions and methods described will become apparent from the description and teachings herein. Such variations may be practiced without departing from the true scope and spirit of the disclosure and are intended to fall within the scope of the present disclosure. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for analyzing a macromolecule analyte, comprising the steps of:
   (a) providing the macromolecule analyte and an associated nucleic acid recording tag joined to a solid support;
   (b) contacting the macromolecule analyte with a first binding agent capable of binding to the macromolecule analyte, wherein the first binding agent comprises a first nucleic acid coding tag that comprises identifying information regarding the first binding agent;
   (c) transferring identifying information regarding the first binding agent from the first nucleic acid coding tag to the nucleic acid recording tag to generate a first order extended nucleic acid recording tag, wherein a process of transferring information comprises a primer extension reaction performed using a DNA polymerase having 5'-to-3' polymerization activity and having substantially reduced 3'-to-5' exonuclease activity, and wherein the primer extension reaction is performed under conditions to reduce or prevent template independent nucleotide addition by the polymerase during the primer extension reaction;
   (d) repeating steps (b) and (c) one or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and
   (e) analyzing extended nucleic acid recording tag obtained after extension reactions of step (d) by a nucleic acid sequencing method to obtain the identifying information regarding the first binding agent and the identifying information regarding the second or higher order binding agent, thereby analyzing the macromolecule analyte.

2. The method of claim 1, wherein step (a) comprises providing a plurality of macromolecule analytes and associated nucleic acid recording tags joined to the solid support; and each of steps (b) and (d) comprises contacting the plurality of macromolecule analytes with a first or higher order plurality of binding agents capable of binding to the macromolecule analytes, wherein the first or higher order plurality of binding agents comprise a first or higher order nucleic acid coding tag(s) that comprise(s) identifying information regarding the first or higher order plurality of binding agents.

3. The method of claim 1, wherein the macromolecule analyte is a polypeptide.

4. The method of claim 1, wherein during step (d) steps (b) and (c) are repeated four times or more.

5. The method of claim 3, further comprising modifying the N-terminal amino acid (NTAA) of the polypeptide with a chemical moiety to produce a modified NTAA.

6. The method of claim 5, wherein the first or higher order binding agent is capable of binding to the modified NTAA.

7. The method of claim 5, further comprising removing the modified NTAA to expose a new NTAA of the polypeptide.

8. The method of claim 2, wherein the plurality of macromolecule analytes are spaced apart on the solid support at an average distance >50 nm.

9. The method of claim 1, wherein the DNA polymerase is an engineered DNA polymerase having a reduced template independent nucleotide addition ability during the primer extension reaction.

10. The method of claim 9, wherein the engineered DNA polymerase comprises an amino acid sequence having at least 90% sequence identity to the amino acid sequence of SEQ ID NO: 7, and having a substitution(s) in amino acid residue(s) corresponding to position 754 of SEQ ID NO: 7, and wherein the engineered DNA polymerase has a template independent nucleotide addition ability reduced by at least 50% in comparison with a DNA polymerase having an amino acid sequence set forth in SEQ ID NO: 7.

11. The method of claim 1, wherein the first or higher order nucleic acid coding tags comprise an incorporated nucleic acid base analogue to reduce template independent nucleotide addition during primer extension reactions.

12. The method of claim 1, wherein template independent nucleotide addition during primer extension reactions is reduced by at least 50% compared to a standard condition.

13. The method of claim 1, wherein the conditions of the primer extension reaction decrease yield of template independent nucleotide addition to 10% or less.

14. The method of claim 1, further comprising attaching the macromolecule analyte to the nucleic acid recording tag joined to the solid support before step (a).

15. A method for analyzing a macromolecule analyte, comprising the steps of:
- (a) providing a macromolecule analyte and an associated nucleic acid recording tag joined to a solid support;
- (b) contacting the macromolecule analyte with a first binding agent capable of binding to the macromolecule analyte, wherein the first binding agent comprises a first nucleic acid coding tag that comprises identifying information regarding the first binding agent;
- (c) transferring identifying information regarding the first binding agent from the first nucleic acid coding tag to the nucleic acid recording tag to generate a first order extended nucleic acid recording tag, wherein a process of transferring information comprises a primer extension reaction performed by a DNA polymerase having 5'-to-3' polymerization activity and having substantially reduced 3'-to-5' exonuclease activity, and wherein the primer extension reaction is performed under conditions to increase efficiency of template independent nucleotide addition by the polymerase during the primer extension reaction;
- (d) repeating steps (b) and (c) two or more times by replacing the first binding agent with a second or higher order binding agent capable of binding to the macromolecule analyte, wherein the second or higher order binding agent comprises a second or higher order nucleic acid coding tag that comprises identifying information regarding the second or higher order binding agent; and by transferring identifying information regarding the second or higher order binding agent from the second or higher order nucleic acid coding tag to the first or higher order extended nucleic acid recording tag to generate a second or higher order extended nucleic acid recording tag; and
- (e) analyzing extended nucleic acid recording tag obtained after extension reactions of step (d) by nucleic acid sequencing method to obtain the identifying information regarding the first binding agent and the identifying information regarding the second or higher order binding agent, thereby analyzing the macromolecule analyte.

16. The method of claim 15, wherein the macromolecule analyte is a polypeptide.

17. The method of claim 15, wherein during step (d) steps (b) and (c) are repeated four times or more.

18. The method of claim 15, wherein the conditions of the primer extension reaction increase efficiency or yield of template independent nucleotide addition to 80% or higher.

19. A kit for analyzing a macromolecule analyte, comprising:
- (a) a nucleic acid recording tag configured to associate directly or indirectly with a macromolecule analyte;
- (b) one or more binding agents each comprising (i) a binding moiety configured to bind to the macromolecule analyte to be analyzed, and (ii) a nucleic acid coding tag comprising identifying information regarding the binding moiety, wherein the recording tag and the coding tag are configured to allow transfer of information between them by a primer extension reaction upon binding of the one or more binding agents to the macromolecule analyte, and the nucleic acid coding tag comprises an incorporated nucleic acid base analogue to reduce template independent nucleotide addition during primer extension reactions;

and (c) an engineered DNA polymerase configured to have 5'→3' polymerization activity, substantially reduced 3'→5' exonuclease activity, and a reduced template independent nucleotide addition ability during the primer extension reaction.

20. The kit of claim 19, wherein the macromolecule analyte comprises a polypeptide, and the kit further comprises (d) a functionalizing reagent capable of modifying an N-terminal amino acid (NTAA) of the polypeptide to generate a functionalized NTAA, wherein the binding moiety is configured to bind to the functionalized NTAA.

* * * * *